(12) United States Patent
Wang

(10) Patent No.: US 12,516,538 B2
(45) Date of Patent: Jan. 6, 2026

(54) SWIMMING POOL ROBOT AND METHOD FOR CONTROLLING SWIMMING POOL ROBOT

(71) Applicant: XINGMAI INNOVATION TECHNOLOGY (SUZHOU) CO., LTD., Suzhou (CN)

(72) Inventor: Shengle Wang, Suzhou (CN)

(73) Assignee: XINGMAI INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 19/240,758

(22) Filed: Jun. 17, 2025

(65) Prior Publication Data

US 2025/0305313 A1    Oct. 2, 2025

Related U.S. Application Data

(63) Continuation-in-part of application No. 18/946,861, filed on Nov. 13, 2024, now Pat. No. 12,371,918.
(Continued)

(30) Foreign Application Priority Data

Apr. 27, 2023    (WO) ................ PCT/CN2023/091115
Apr. 27, 2023    (WO) ................ PCT/CN2023/091116
(Continued)

(51) Int. Cl.
     *E04H 4/16*      (2006.01)
     *B63G 8/22*      (2006.01)
     *E04H 4/12*      (2006.01)

(52) U.S. Cl.
     CPC ............ *E04H 4/1654* (2013.01); *B63G 8/22* (2013.01); *E04H 4/1263* (2013.01); *B63B 2207/02* (2013.01); *B63B 2207/04* (2013.01)

(58) Field of Classification Search
CPC ....... E04H 4/1654; E04H 4/1263; B63G 8/22; B63B 2207/02; B63B 2207/04
(Continued)

(56) References Cited

U.S. PATENT DOCUMENTS 6,039,886 A     3/2000   Henkin et al.
10,704,283 B2 *   7/2020   Tryber ................. E04H 4/1263
(Continued)

FOREIGN PATENT DOCUMENTS

CN        102003090 A    4/2011
CN        104790696 A    7/2015
(Continued)

OTHER PUBLICATIONS

Machine-generated English translation of ES 2783886, generated on Aug. 5, 2025.*

*Primary Examiner* — Fred Prince
(74) *Attorney, Agent, or Firm* — Getech Law LLC; Jun Ye

(57) ABSTRACT

A swimming pool robot and a method for controlling a swimming pool robot are disclosed. The swimming pool robot includes a liquid intake portion including at least a first intake and a second intake. During a process of switching the swimming pool robot from a first motion state to a third motion state, the swimming pool robot is first switched from the first motion state to a second motion state and subsequently switched from the second motion state to the third motion state. No matter whether when the swimming pool robot is in the first motion state or when the swimming pool robot is in the third motion state, the first intake faces a bottom of a swimming pool, and/or a posture of the swimming pool robot in the first motion state is substantially identical to the posture of the swimming pool robot in the third motion state.

32 Claims, 23 Drawing Sheets

Related U.S. Application Data which is a continuation-in-part of application No. PCT/CN2024/087590, filed on Apr. 12, 2024.

(30) Foreign Application Priority Data

| | | |
|---|---|---|
| Sep. 8, 2023 | (CN) | 202311159683.0 |
| Sep. 8, 2023 | (CN) | 202322442885.8 |
| Nov. 17, 2023 | (CN) | 202311540590.2 |
| Dec. 19, 2023 | (CN) | 202323471851.8 |
| Jan. 17, 2024 | (CN) | 202410070430.4 |
| Jan. 18, 2024 | (CN) | 202410077690.4 |
| Feb. 5, 2024 | (WO) | PCT/CN2024/076021 |
| Feb. 5, 2024 | (WO) | PCT/CN2024/076025 |
| Feb. 5, 2024 | (WO) | PCT/CN2024/076033 |
| Feb. 5, 2024 | (WO) | PCT/CN2024/076040 |

(58) Field of Classification Search
USPC .............. 210/167.15, 167.16, 167.17; 15/1.7
See application file for complete search history.

(56) References Cited

U.S. PATENT DOCUMENTS

| | | |
|---|---|---|
| 11,274,462 B2 | 3/2022 | Tryber et al. |
| 11,505,960 B2 | 11/2022 | Witelson et al. |
| 11,946,282 B1 * | 4/2024 | Zhang .................. E04H 4/1263 |
| 12,221,196 B1 | 2/2025 | Liu et al. |
| 12,371,918 B2 * | 7/2025 | Wang ........................ E04H 4/16 |
| 2003/0201218 A1 * | 10/2003 | Henkin ................. E04H 4/1654 210/167.2 |
| 2012/0103365 A1 | 5/2012 | Sumonthee |
| 2017/0362844 A1 | 12/2017 | Osuna et al. |
| 2018/0142487 A1 * | 5/2018 | Durvasula ............. F04D 29/708 |
| 2024/0141667 A1 | 5/2024 | Liu et al. |
| 2024/0271445 A1 | 8/2024 | Duffaut et al. |
| 2025/0012106 A1 | 1/2025 | Winkler |

FOREIGN PATENT DOCUMENTS

| | | | |
|---|---|---|---|
| CN | 111155798 A | 5/2020 | |
| CN | 112292314 A | 1/2021 | |
| CN | 114059811 A | 2/2022 | |
| CN | 114941458 A | 8/2022 | |
| CN | 217925129 U | 11/2022 | |
| CN | 116213387 A | 6/2023 | |
| CN | 116816154 A | 9/2023 | |
| CN | 117822956 A | 4/2024 | |
| ES | 2783886 T3 * | 9/2020 | ........... E04H 4/1654 |
| JP | H0592353 U | 12/1993 | |
| KR | 102259308 B1 | 6/2021 | |
| WO | WO-9749882 A1 * | 12/1997 | ........... E04H 4/1645 |
| WO | 2019058286 A1 | 3/2019 | |

* cited by examiner controlling a cleaning device to operate in a second motion state until a first injection port is at least partially located above a liquid surface — S131 controlling a first adjusting part to be turned on to enable gas to be injected into a buoyancy cavity so that a rearward portion of the cleaning device moves toward the liquid surface until the cleaning device finishes to be switched from the second motion state to a third motion state — S132

FIG. 13

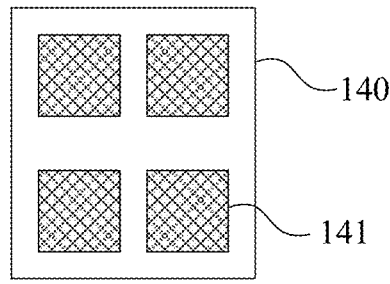

FIG. 14

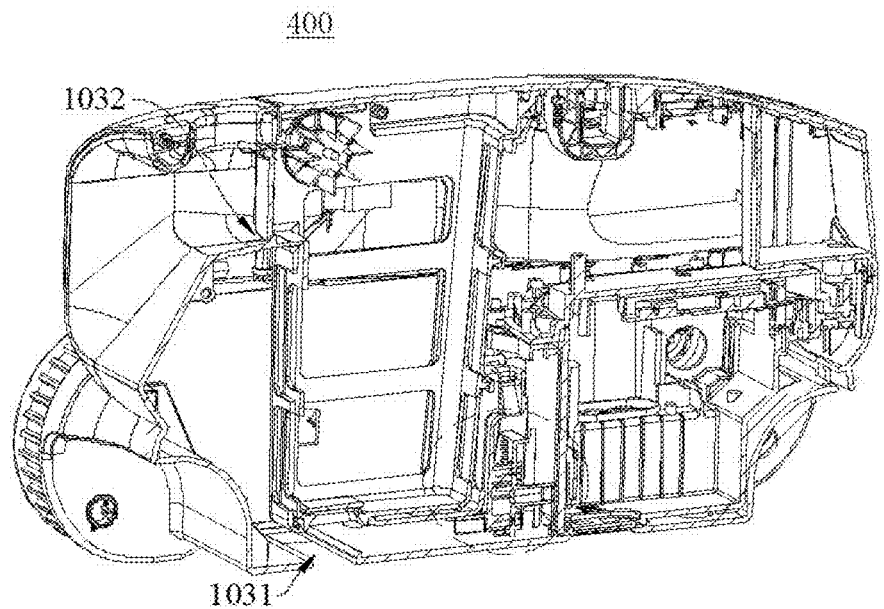

FIG. 15

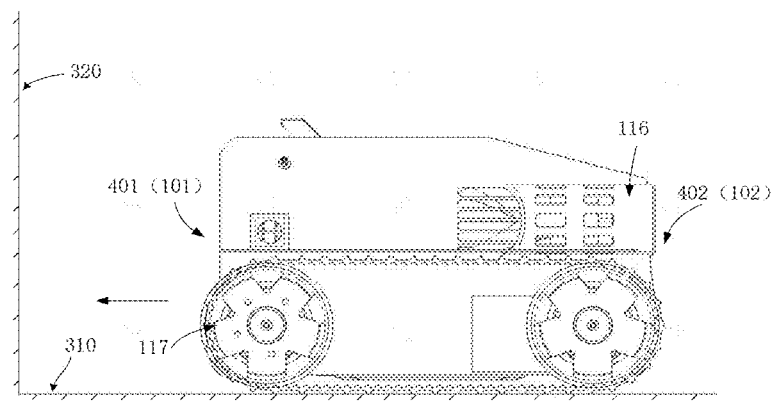
FIG. 16A
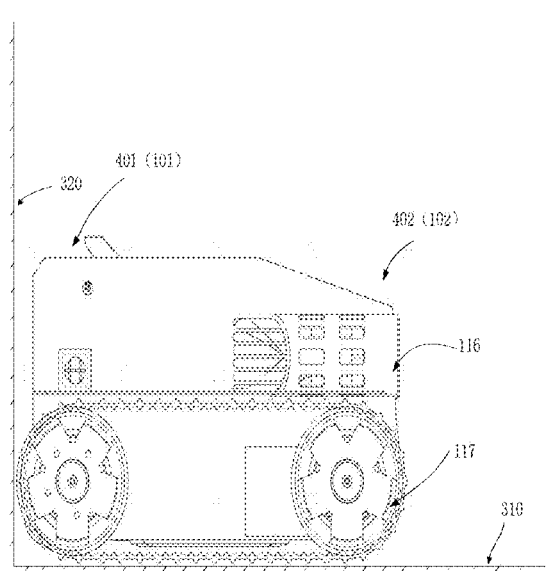 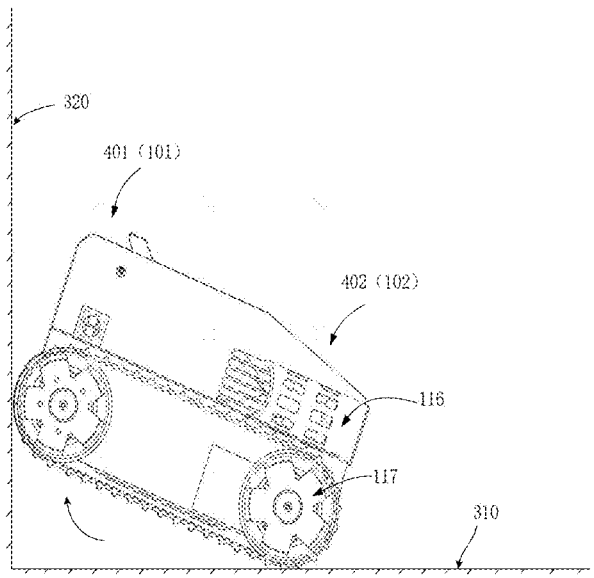
FIG. 16B              FIG. 16C

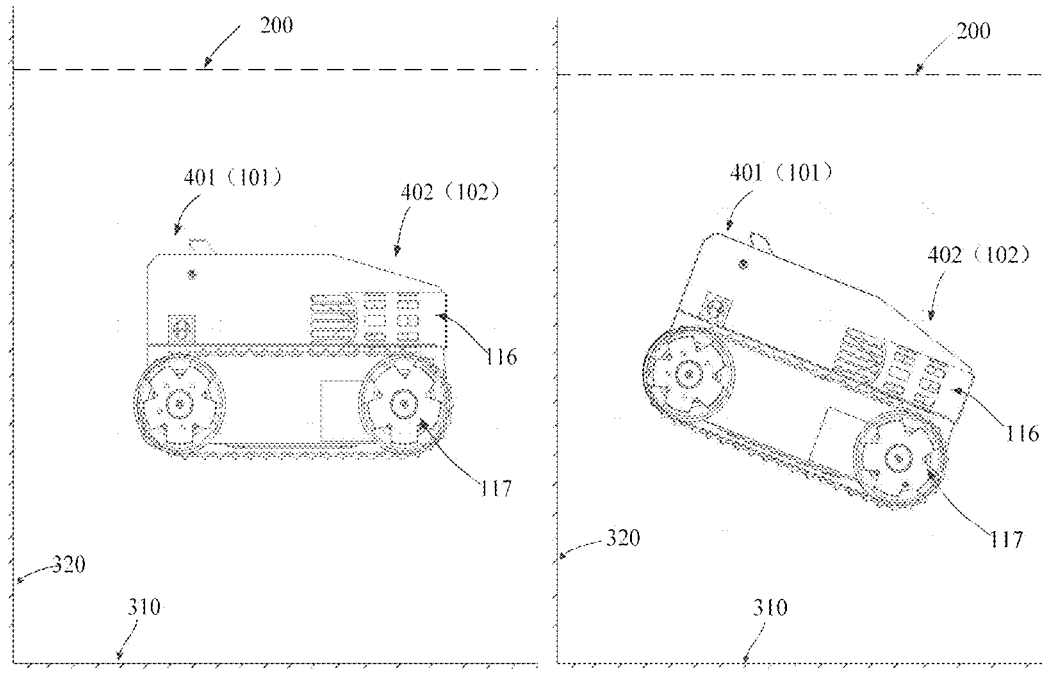
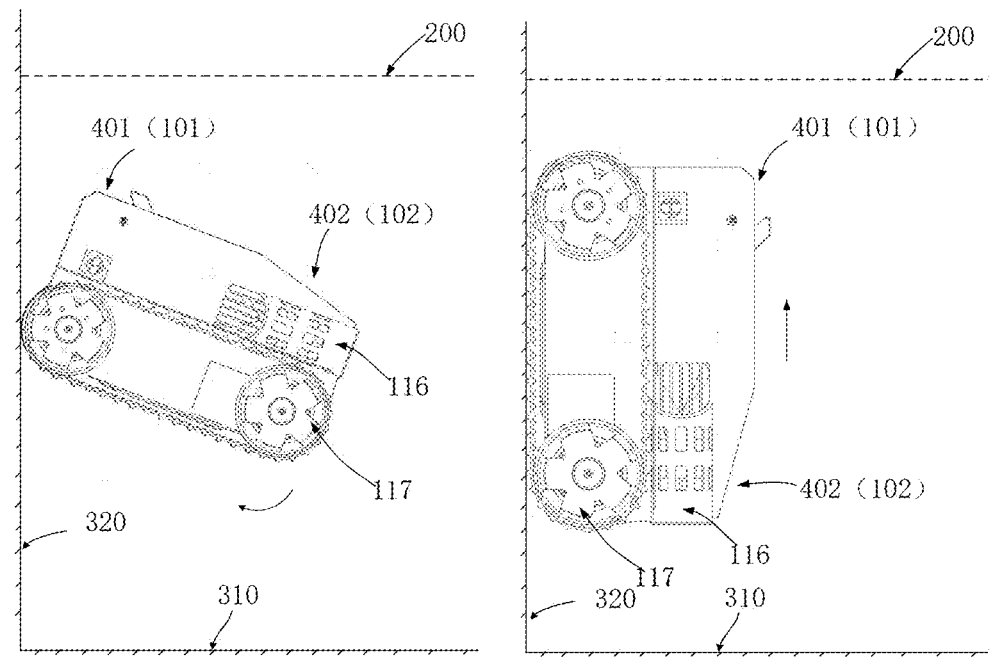
FIG. 20A  FIG. 20B  FIG. 20C  FIG. 20D

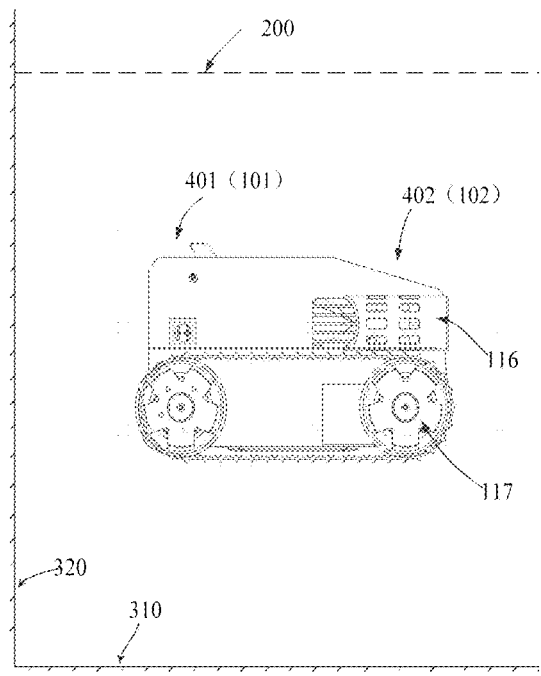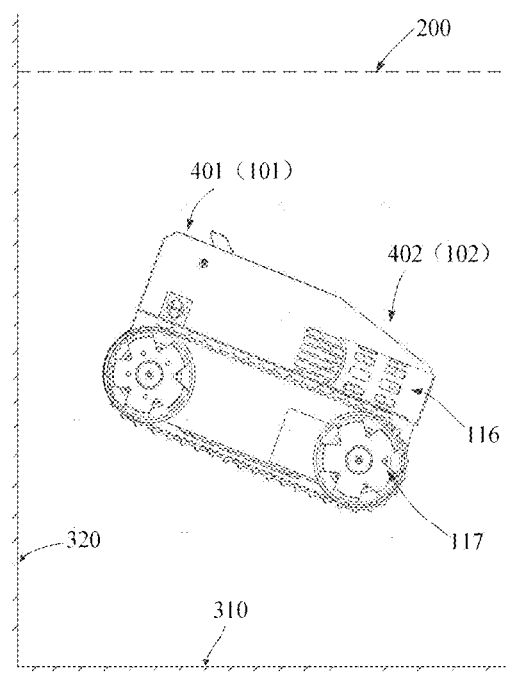
FIG. 21A  FIG. 21B
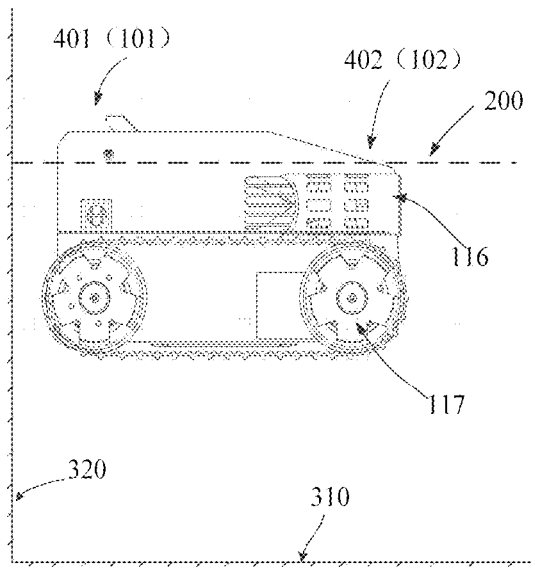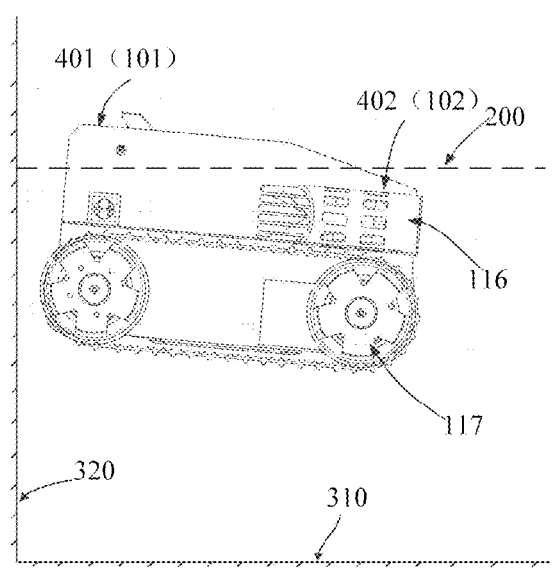
FIG. 22A  FIG. 22B

SWIMMING POOL ROBOT AND METHOD FOR CONTROLLING SWIMMING POOL ROBOT

This application is a continuation-in-part of prior U.S. patent application Ser. No. 18/946,861, filed on Nov. 13, 2024, which is a continuation-in-part application of the International patent application No. PCT/CN2024/087590, filed on Apr. 12, 2024, which claims priority to the International Patent Application No. PCT/CN2023/091116, filed on Apr. 27, 2023, in the title of "MOVING DEVICES USED IN LIQUID AND POOL CLEANING ROBOTS"; the International Patent Application No. PCT/CN2024/076040, filed on Feb. 5, 2024, in the title of "CLEANING APPARATUS"; the International Patent Application No. PCT/CN2024/076025, filed on Feb. 5, 2024, in the title of "CLEANING APPARATUS"; the International Patent Application No. PCT/CN2024/076033, filed on Feb. 5, 2024, in the title of "MOVING DEVICES USED IN LIQUID AND CLEANING APPARATUS"; the International Patent Application No. PCT/CN2024/076021, filed on Feb. 5, 2024, in the title of "CLEANING DEVICE AND CLEANING DEVICE SYSTEM"; the Chinese Patent Application No. 202311159683.0, filed on Sep. 8, 2023, in the title of "FILTER ASSEMBLY AND UNDERWATER CLEANING EQUIPMENT"; and the Chinese Patent Application No. 202311540590.2, filed on Nov. 17, 2023, in the title of "FILTER ASSEMBLY AND UNDERWATER CLEANING EQUIPMENT", the entire contents of which are hereby incorporated by reference in their entireties.

The International patent application No. PCT/CN2024/076040 claims priority to the International Patent Application No. PCT/CN2023/091116, filed on Apr. 27, 2023, in the title of "MOVING DEVICE USED IN LIQUID AND POOL CLEANING ROBOT"; the Chinese Patent Application No. 202320232759.7, filed on Feb. 16, 2023, in the title of "TRANSMISSION APPARATUS AND POOL CLEANING ROBOT"; the Chinese Patent Application No. 202311159683.0, filed on Sep. 8, 2023, in the title of "FILTER ASSEMBLY AND UNDERWATER CLEANING EQUIPMENT"; the Chinese Patent Application No. 202311540590.2, filed on Nov. 17, 2023, in the title of "FILTER ASSEMBLY AND UNDERWATER CLEANING EQUIPMENT"; and the Chinese Patent Application No. 202410070430.4, filed on Jan. 17, 2024, in the title of "POOL ROBOT AND CONTROL METHOD THEREOF, AND STORAGE MEDIUM", the entire contents of which are hereby incorporated by reference in their entireties.

The present application No. PCT/CN2024/076025 claims priority to the Chinese Patent Application No. 202311159683.0, filed on Sep. 8, 2023, in the title of "FILTER ASSEMBLY AND UNDERWATER CLEANING EQUIPMENT"; the Chinese Patent Application No. 202311540590.2, filed on Nov. 17, 2023, in the title of "FILTER ASSEMBLY AND UNDERWATER CLEANING EQUIPMENT"; and the Chinese Patent Application No. 202320298525.2, filed on Feb. 23, 2023, in the title of "POOL CLEANING ROBOT", the entire contents of which are hereby incorporated by reference in their entireties.

The present application No. PCT/CN2024/076033 claims priority to the International Patent Application No. PCT/CN2023/091116, filed on Apr. 27, 2023, in the title of "MOVING DEVICE USED IN LIQUID AND POOL CLEANING ROBOT", the entire content of which is hereby incorporated by reference in its entirety.

The present application PCT/CN2024/076021 claims priority to Chinese Patent Application No. 202320121909.7, filed on Feb. 6, 2023, in the title of "POOL CLEANING ROBOT"; the International Patent Application No. PCT/CN2023/091116, filed on Apr. 27, 2023, in the title of "MOVING DEVICE USED IN LIQUID AND POOL CLEANING ROBOT"; the Chinese Patent Application No. 202320298525.2, filed on Feb. 23, 2023, in the title of "POOL CLEANING ROBOT"; the Chinese Patent Application No. 202320232759.7, filed on Feb. 16, 2023, in the title of "TRANSMISSION APPARATUS AND POOL CLEANING ROBOT"; the International Patent Application No. PCT/CN2023/091115, filed on Apr. 27, 2023, in the title of "AUTOMATIC UNDERWATER SPREADING APPARATUS"; the Chinese Patent Application No. 202323471851.8, filed on Dec. 19, 2023, in the title of "POOL CLEANING ROBOT"; the Chinese Patent Application No. 202311159683.0, filed on Sep. 8, 2023, in the title of "FILTER ASSEMBLY AND UNDERWATER CLEANING EQUIPMENT"; the Chinese Patent Application No. 202311540590.2, filed on Nov. 17, 2023, in the title of "FILTER ASSEMBLY AND UNDERWATER CLEANING EQUIPMENT"; the Chinese Patent Application No. 202410070430.4, filed on Jan. 17, 2024, in the title of "POOL ROBOT AND CONTROL METHOD THEREFOR, AND STORAGE MEDIUM"; the and Chinese Patent Application No. 202410077690.4, filed on Jan. 18, 2024, in the title of "SOLOR SYSTEM", the entire contents of which are hereby incorporated by reference in their entireties.

TECHNICAL FIELD

The present disclosure relates to the field of robotics, and in particular to a moving apparatus, a cleaning device, a cleaning device control method.

BACKGROUND

The cleaning and maintenance of a liquid environment (e.g., a pool and a swimming pool) are important to maintaining clean water and pool sanitary. Cleaning devices on the market may be divided into three types. The first type of cleaning devices only cleans a bottom of the liquid environment. The second type of cleaning devices cleans not only the bottom of the liquid environment but also a vertical wall surface of the liquid environment that has to be located below a liquid surface. The third type of cleaning devices keeps floating above the liquid surface and only cleans the liquid surface of the liquid environment. The three types of cleaning devices have different features. However, all three types of cleaning devices fail to realize an effective position regulating in the liquid environment and regulate the depth based on an actual need to clean the bottom, the wall surface, and the liquid surface of the liquid environment in an all-round way, thereby limiting the application scope and the work efficiency of the cleaning devices.

Therefore, to improve the application scope and the work efficiency of cleaning in the liquid environment and to reduce cleaning costs, a moving apparatus used in liquid and a cleaning device that are able to flexibly switch positions above or below the liquid surface are desired.

SUMMARY OF THE DISCLOSURE

Some embodiments of the present disclosure provide a moving apparatus, a cleaning device, and a cleaning device control method to clean a liquid environment in an all-round way.

In a first aspect, to address the aforementioned technical problem, some embodiments of the present disclosure provide a swimming pool robot. The swimming pool robot includes a liquid intake portion, including at least a first intake and a second intake. The first intake is located at a bottom of the swimming pool robot, the first intake is configured for liquid to enter the swimming pool robot for the swimming pool robot to clean a bottom and/or a side wall of a swimming pool, the second intake is located at a side of the swimming pool robot, and the second intake is configured for liquid to enter the swimming pool robot for the swimming pool robot to clean a liquid surface. During a process of switching the swimming pool robot from a first motion state to a third motion state, the swimming pool robot is first switched from the first motion state to a second motion state and subsequently switched from the second motion state to the third motion state. No matter whether when the swimming pool robot is in the first motion state or when the swimming pool robot is in the third motion state, the first intake faces the bottom of the swimming pool, and/or a posture of the swimming pool robot in the first motion state is substantially identical to the posture of the swimming pool robot in the third motion state. The first motion state is defined as a state where the swimming pool robot moves on the bottom of the swimming pool or cleans the bottom of the swimming pool, the second motion state is defined as a state where the swimming pool robot moves on the side wall of the swimming pool or cleans the side wall of the swimming pool, and the third motion state is defined as a state where the swimming pool robot moves on the liquid surface, floats on the liquid surface, stops near a water line, or cleans the liquid surface.

In a second aspect, to address the aforementioned technical problem, some embodiments of the present disclosure provide a swimming pool robot. The swimming pool robot includes a liquid intake portion, a liquid outlet portion, a filter assembly at least partially disposed inside the swimming pool robot and configured to filter liquid, and a drive mechanism including a main pump. The liquid intake portion, the filter assembly, the drive mechanism, and the liquid outlet portion are in fluid communication in sequence to form a flowing path for the swimming pool robot to perform cleaning. A process of switching the swimming pool robot from moving on a bottom of a swimming pool to a liquid surface includes at least the following: the swimming pool robot rotates as a whole in a first direction, enabling the swimming pool robot to be switched from a bottom operation posture to a wall climbing posture; the swimming pool robot moves on a side wall of the swimming pool in the wall climbing posture until the swimming pool robot is near a water line or at least partially exposed above the liquid surface; and the swimming pool robot subsequently rotates as a whole in a second direction, enabling the swimming pool robot to be switched from the wall climbing posture to a surface operation posture. The bottom operation posture of the swimming pool robot is substantially identical to the surface operation posture of the swimming pool robot, and the first direction is opposite to the second direction.

In a third aspect, to address the aforementioned technical problem, some embodiments of the present disclosure provide a method for controlling a swimming pool robot. The swimming pool robot includes a mode switching member. The mode switching member includes: a buoyancy cavity configured to accommodate at least gas; a pump at least configured for external gas to enter the buoyancy cavity, to increase a volume of the gas in the buoyancy cavity; and a first injection port communicating with the buoyancy cavity to at least allow the external gas to enter the buoyancy cavity. The method includes at least the following: controlling the swimming pool robot to be switched from a bottom operation posture to a wall climbing posture; controlling the swimming pool robot to move on a side wall of a swimming pool in the wall climbing posture until the first injection port is near a liquid surface or at least partially exposed above the liquid surface; and controlling the pump to operate, where the external gas enters the buoyancy cavity through the first injection port under an action of the pump, to increase the volume of the gas in the buoyancy cavity, enabling the swimming pool robot to rotate from the wall climbing posture to a surface operation posture. The bottom operation posture of the swimming pool robot is substantially identical to the surface operation posture of the swimming pool robot.

BRIEF DESCRIPTION OF THE DRAWINGS

FIG. 13 is a flowchart of a cleaning device control method according to some embodiments of the present disclosure.

FIG. 14 is a structural block view of a computer-readable storage medium according to some embodiments of the present disclosure.

FIG. 15 is a cross-sectional view of a cleaning device according to some embodiments of the present disclosure.

FIG. 16A is a side elevational view of a moving apparatus in a first motion state according to some embodiments of the present disclosure.

FIG. 16B is a side elevational view of a forward portion of a moving apparatus abutting against or touching a side wall during the moving apparatus switching from a first motion state through a second motion state to a third motion state according to some embodiments of the present disclosure.

FIG. 16C is a side elevational view of a moving apparatus rotating from a first motion state to a second motion state during the moving apparatus switching from the first motion state through the second motion state to a third motion state according to some embodiments of the present disclosure.

FIG. 20A is a side elevational view of a moving apparatus underwater during the moving apparatus switching from underwater to a second motion state according to some embodiments of the present disclosure.

FIG. 20B is a side elevational view of a rearward portion of a moving apparatus moving downward earlier than a forward portion of the moving apparatus to realize a tilting state of the moving apparatus during the moving apparatus switching from underwater to a second motion state according to some embodiments of the present disclosure.

FIG. 20C is a side elevational view of a forward portion of a moving apparatus abutting against or touching a side wall during the moving apparatus switching from underwater to a second motion state according to some embodiments of the present disclosure.

FIG. 20D is a side elevational view of a moving apparatus moving upward on a side wall in a second motion state during the moving apparatus switching from underwater to the second motion state according to some embodiments of the present disclosure.

FIG. 21A is a side elevational view of a moving apparatus in a substantially horizontal state underwater according to some embodiments of the present disclosure.

FIG. 21B is a side elevational view of a moving apparatus in a tilting state underwater according to some embodiments of the present disclosure.

FIG. 22A is a side elevational view of a way of a moving apparatus in a substantially horizontal state according to some embodiments of the present disclosure.

FIG. 22B is a side elevational view of another way of a moving apparatus in a substantially horizontal state according to some embodiments of the present disclosure.

DETAILED DESCRIPTION

The following illustrates, in a detailed and comprehensive way, the technical solutions provided by some embodiments of the present disclosure in conjunction with the drawings. Obviously, the embodiments described below are merely some, but not all, embodiments of the present disclosure. Any other embodiment that is obtained, without a creative work, by an ordinary skilled in the art based on the embodiments of the present disclosure falls within the scope of the present disclosure.

To be noted that, terms described in the embodiments of the present disclosure, such as "first", "second", and etc., are for descriptive purposes only and may not be understood as indicating or implying the relative importance or implicitly specifying the number of technical features indicated. Thus, a feature defined by the "first" or "second" may, either explicitly or implicitly, indicate that at least one such feature is provided.

Reference to an "embodiment" herein implies that a particular feature, structure, or characteristic described in such embodiment may be included in at least one embodiment of the present disclosure. The "embodiment" appeared anywhere in the specification may neither necessarily refer to the same embodiment, nor refer to a separate or alternative embodiment that is mutually exclusive of other embodiments. It is understood by any ordinary skilled in the art, both explicitly and implicitly, that the embodiments described herein may be combined with other embodiments.

So far, the cleaning device currently on the market fails to effectively regulate positions in a liquid environment. In other words, cleaning device may not regulate the depth, based on an actual need, to clean the liquid environment (e.g., a bottom, a wall surface, a liquid surface, and etc.) in an all-round way, thereby limiting the application scope and the work efficiency of the cleaning device. Some embodiments of the present disclosure provide a moving apparatus used in liquid. The moving apparatus used in liquid is able to flexibly switch positions above or below the liquid surface, thereby enabling the cleaning device that includes the moving apparatus to clean the liquid environment in the all-round way, improving the application scope and the cleaning efficiency in the liquid environment, and reducing costs of cleaning the liquid environment. In some embodiments, the cleaning device may be a pool robot, a swimming pool robot, an underwater cleaning device, and etc., which is not limited herein.

Figure 1:
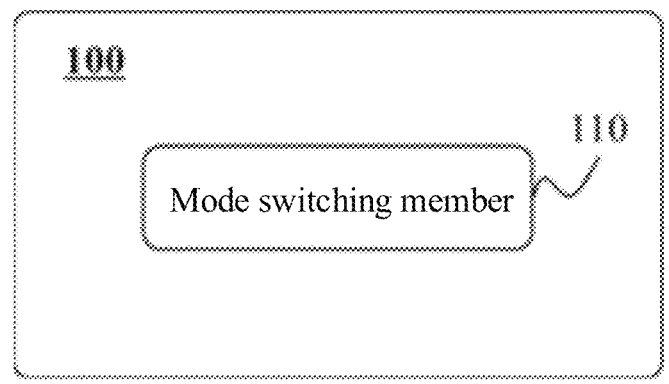
FIG. 1 is a simplified schematic view of a moving apparatus used in liquid according to some embodiments of the present disclosure.
Figure 2:
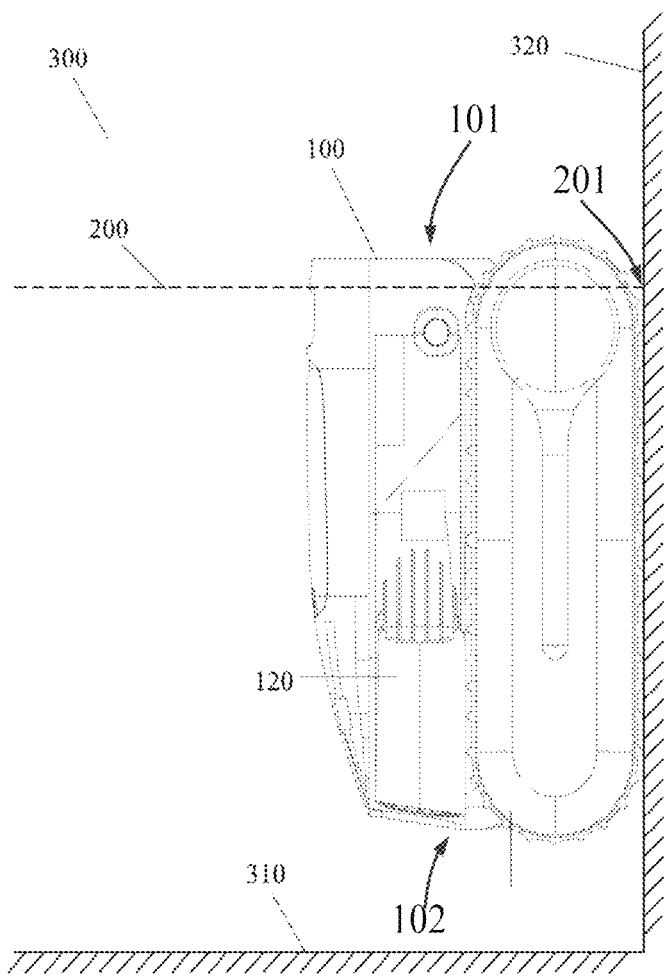
FIG. 2 is a first side elevational view of a moving apparatus used in liquid according to some embodiments of the present disclosure.

FIG. 1 is a simplified schematic view of a moving apparatus used in liquid according to some embodiments of the present disclosure. FIG. 2 is a first side elevational view of a moving apparatus used in liquid according to some embodiments of the present disclosure. A moving apparatus 100 used in liquid is configured to move within a target region 300 that contains liquid and switch positions above or below a liquid surface 200. The target region 300 may be a region in which the moving apparatus 100 moves and liquid is contained. For example, the target region 300 may be a pool, a swimming pool, an oil well, or a sewer, and etc., which is not limited herein. To be noted that, as illustrated in FIG. 2, the moving apparatus 100 used in liquid is further configured to, in addition to moving within the target region 300 that contains liquid, move on a bottom 310 of the target region 300 or a side wall 320 of the target region 300.

Figure 3:
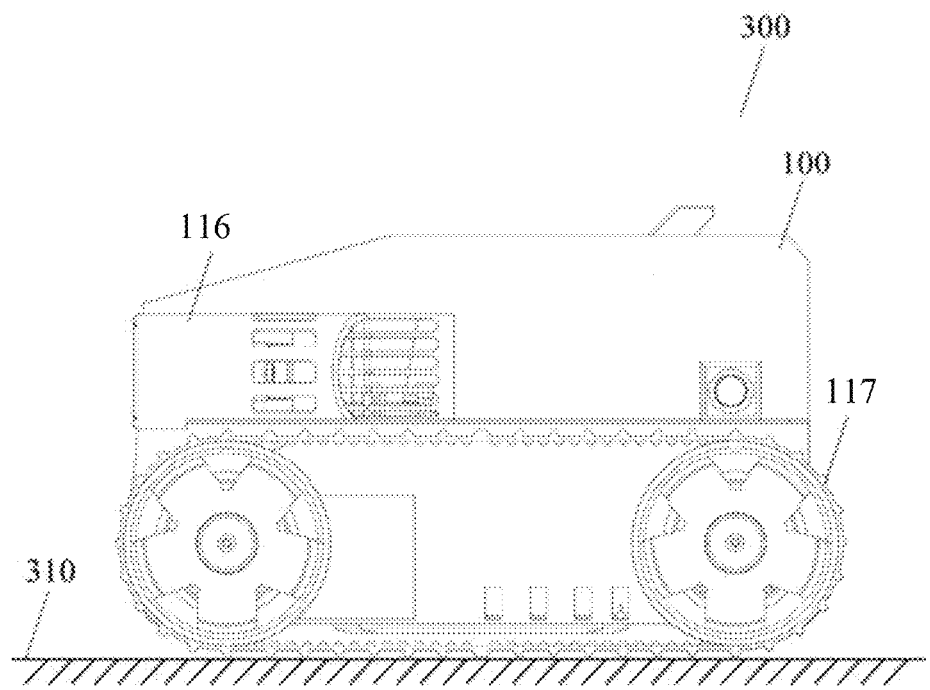
FIG. 3 is a second side elevational view of a moving apparatus used in liquid according to some embodiments of the present disclosure.
Figure 4:
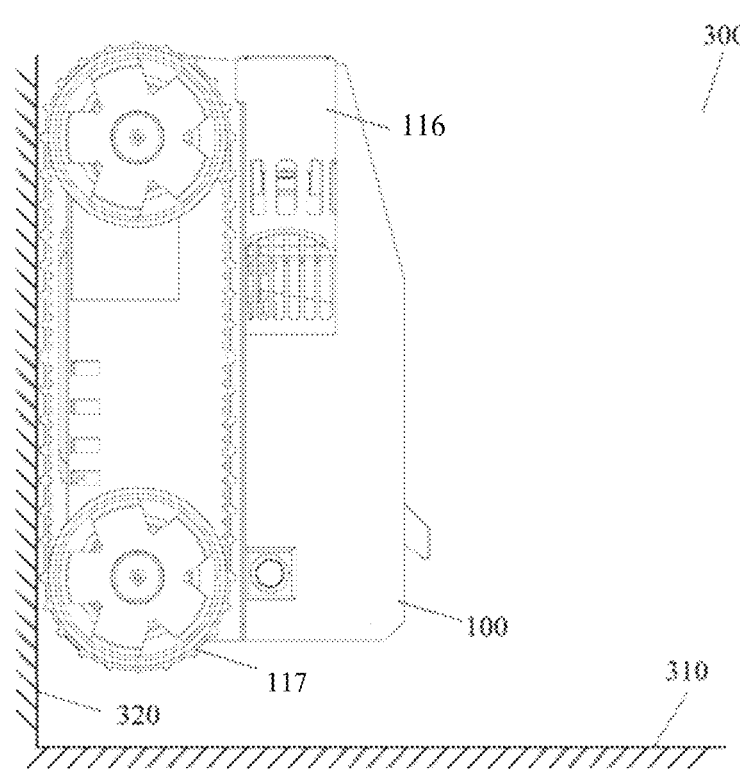
FIG. 4 is a third side elevational view of a moving apparatus used in liquid according to some embodiments of the present disclosure.
Figure 5:
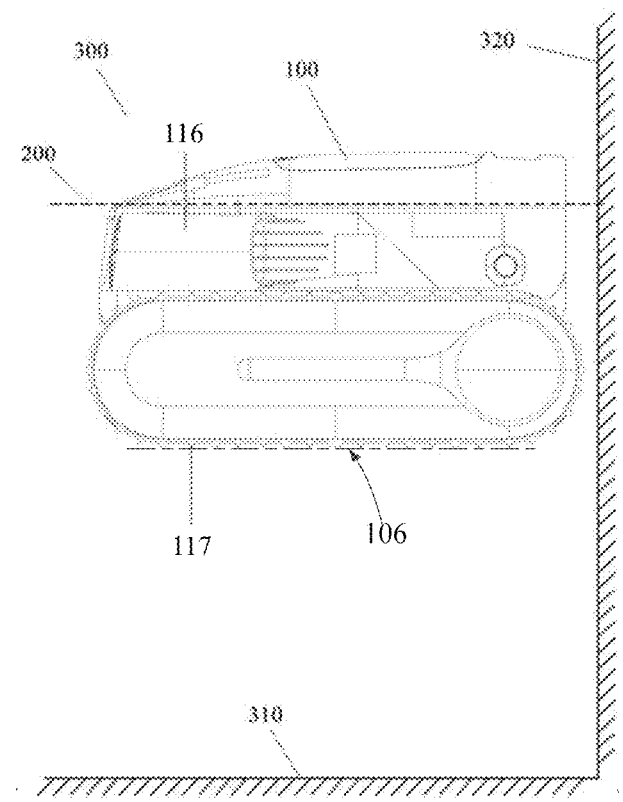
FIG. 5 is a fourth side elevational view of a moving apparatus used in liquid according to some embodiments of the present disclosure.

The moving apparatus 100 used in liquid includes a mode switching member 110. The mode switching member 110 is configured to enable the moving apparatus 100 to perform a position-and-posture switching between a second motion state and a third motion state. To be noted that, as illustrated in FIG. 16A or FIG. 3, a second side elevational view of the moving apparatus used in liquid is provided. A first motion state is defined by a state where the moving apparatus 100 moves on the bottom 310 or a state where an angle between the bottom 310 and an overall direction 106 of the moving apparatus 100 is less than 90° and the moving apparatus 100 is far from the liquid surface 200. The moving apparatus 100 being far from the liquid surface 200 may be referred to as the moving apparatus 100 performing a bottom cleaning or performing an action underwater, and etc. As illustrated in FIG. 2, or FIG. 4, a third side elevational view of the moving apparatus used in liquid is provided. The second motion state is defined by a state where the moving apparatus 100 moves on the side wall 320 or a state where an overall direction 106 of the moving apparatus 100 is substantially parallel to the side wall 320. As illustrated in FIG. 5, a fourth side elevational view of the moving apparatus used in liquid is provided, or FIG. 16G or FIG. 22A or FIG. 22B. The third motion state is defined by a state where the moving apparatus 100 moves on or above the liquid surface 200, or a state where the moving apparatus 100 is at least partially exposed above the liquid surface 200, or a state where the moving apparatus 100 is entirely located below the liquid surface 200 and close to the liquid surface 200. The moving apparatus 100 being close to the liquid surface 200 may be referred to as a distance between the moving apparatus 100 and the liquid surface 200 being less than a threshold value and the moving apparatus 100 being able to perform a liquid surface cleaning task, and etc. The overall direction 106 of the moving apparatus 100 mentioned above is defined by a direction of a plane where a moving mechanism of the moving apparatus 100 is in contact with a to-be-cleaned surface, for example, the moving mechanism is a track or a wheel. That is, as illustrated in FIG. 5, the overall direction 106 of the moving apparatus 100 is defined by the plane that is shared by a bottom of the track or the wheel on both sides of the moving mechanism of the cleaning device 400 or the moving apparatus 100. Optionally, in a case that the moving apparatus 100 includes a first wheel, a second wheel, and a track that wraps around an outside of both the first wheel and the second wheel, the overall direction 106 of the moving apparatus 100 may also be defined by an extended direction along a line connecting a rotation center of the first wheel and a rotation center of the second wheel. The first motion state may include a process of cleaning the bottom 310 or a process of processing the liquid in the pool, and etc. The second motion state may include a process of cleaning the side wall 320 or a process of cleaning a liquid line 201, and etc. The third motion state may include a process of moving on or above the liquid surface 200 or a process of cleaning the liquid surface 200. The process of cleaning the liquid surface 200 may be referred to as a process where garbage floating on the liquid surface 200 enters an interior of the moving apparatus 100 or the cleaning device 400 through an intake port of the moving apparatus 100 or the cleaning device 400.

In this way, the mode switching member 110 is configured to enable the moving apparatus 100 to perform the position-and-posture switching above or below the liquid surface 200, which further enables the cleaning device 400 that includes the moving apparatus 100 to flexibly perform the position-and-posture switching above or below the liquid surface 200. Specifically, the mode switching member 110 enables the moving apparatus 100 to move to be on/above the liquid surface 200 through performing the position-and-posture switching above or below the liquid surface 200, thereby enabling the cleaning device 400 that includes the moving apparatus 100 to be switched to the third motion state and to perform the liquid surface cleaning of the liquid environment. The mode switching member 110 enables the moving apparatus 100 to be switched to the second motion state through performing the position-and-posture switching above or below the liquid surface 200, which further enables the cleaning device 400 to clean the pool wall or the liquid line 201, and etc., thereby allowing the cleaning device 400 to clean the liquid environment in the all-round way, improving the application scope and the cleaning efficiency in the liquid environment, and reducing the costs of cleaning the liquid environment.

The moving apparatus 100 may be constructed in various ways. The following is illustrated by taking an example of performing the liquid surface cleaning. When the intake port is provided on a side surface of a forward portion 101 of the moving apparatus 100 or a forward portion of a cleaning device body, as illustrated in FIG. 22A, the third motion state is referred to as a state where the moving apparatus 100 is in a substantially horizontal direction or a state where the forward portion 101 of the moving apparatus 100 tilts slightly upward and a rearward portion 102 of the moving apparatus 100 tilts slightly downward (may be referred to as a first tilting state, as illustrated in FIG. 22B). In this case, the intake port is at least partially located below the liquid surface 200. When the intake port is provided at a bottom of the moving apparatus 100 or a bottom of the cleaning device body, the intake port may be identical to an intake port for performing the bottom cleaning. That is, an intake port includes the first intake port (i.e., a first intake 1031 below) and the second intake port (i.e., a second intake 1032 below). The first intake port is configured to perform the bottom cleaning and the second intake port is configured to perform the liquid surface cleaning. The third motion state is referred to as a state where the side surface of the forward portion 101 of the moving apparatus 100 obviously is exposed above the liquid surface 200 and the second intake port is at least partially exposed above the liquid surface 200 or is immediately beside the liquid surface 200. In this case, in order to maintain the balance of the moving apparatus 100 or the cleaning device body, the rearward portion 102 of the moving apparatus 100 or a rearward portion of the cleaning device body is located below the liquid surface 200 (may be referred to as a second tilting state) and the moving apparatus 100 or the cleaning device body is tilted to a greater extent than being in the first tilting state. When the second intake port is provided at an intersection or transition between the forward portion 101 and the bottom of the moving apparatus 100 or between the forward portion of the cleaning device body and the bottom of the cleaning device body, the third motion state is referred to as a state where the intersection or transition is at least partially exposed above the liquid surface 200 so that the second intake port is at least partially exposed above the liquid surface 200 or is immediately beside the liquid surface 200. In this case, the rearward portion 102 of the moving apparatus 100 is below the forward portion 101 of the moving apparatus 100, the rearward portion 102 of the moving apparatus 100 is entirely located underwater or the side surface of the rearward portion 102 is at least partially exposed above the liquid surface 200.

Figure 16F:
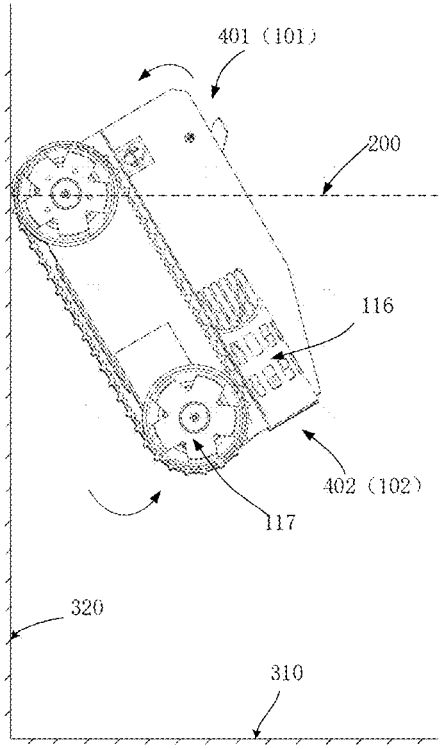
FIG. 16F is a side elevational view of a moving apparatus rotating from a second motion state to a third motion state during the moving apparatus switching from a first motion state through the second motion state to the third motion state according to some embodiments of the present disclosure.
Figure 16G:
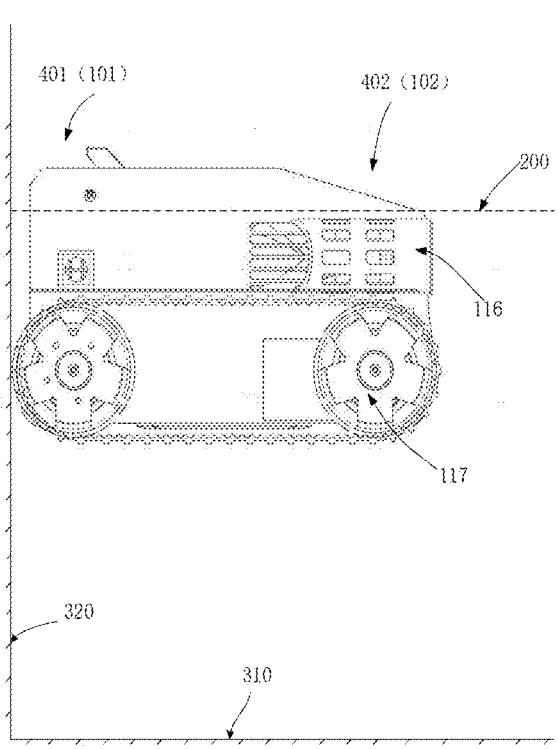
FIG. 16G is a side elevational view of a moving apparatus finishing to switch to a third motion state during the moving apparatus switching from a first motion state through a second motion state to the third motion state according to some embodiments of the present disclosure.
Figure 17A:
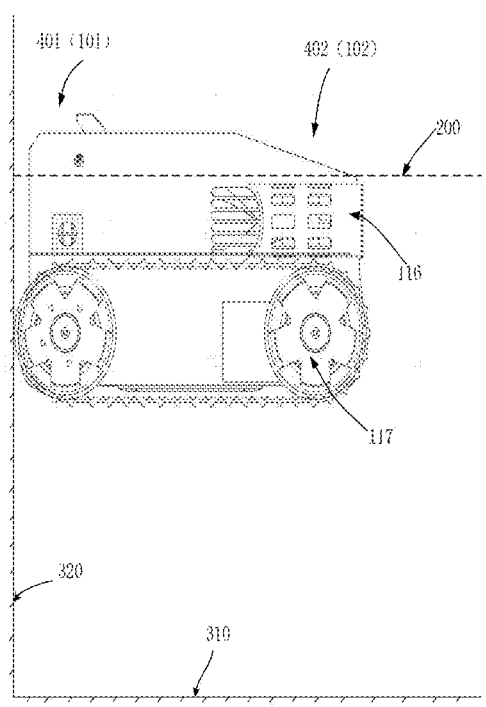
FIG. 17A is a side elevational view of a forward portion of a moving apparatus abutting against or touching a side wall during the moving apparatus switching from a third motion state through a second motion state to a first motion state according to some embodiments of the present disclosure.
Figure 17B:
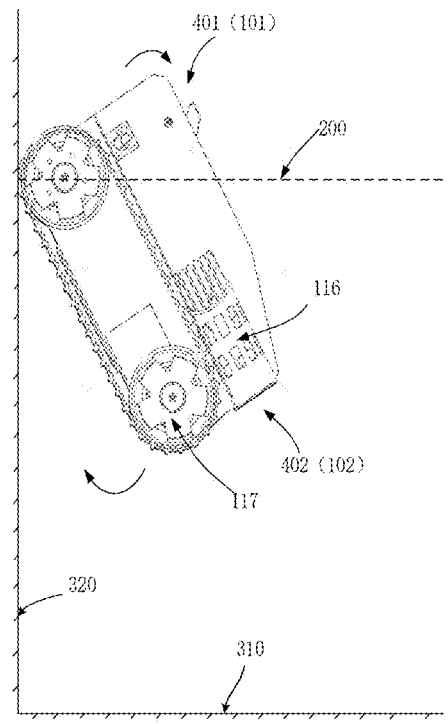
FIG. 17B is a side elevational view of a moving apparatus rotating from a third motion state to a second motion state during the moving apparatus switching from the third motion state through the second motion state to a first motion state according to some embodiments of the present disclosure.

A process of the moving apparatus 100 switching from the second motion state to the third motion state may be referred to as a process of the moving apparatus 100 rotating around a first virtual axis substantially in a first direction. The first virtual axis is located at an interior of the forward portion 101 of the moving apparatus 100. In this way, a distance that the forward portion 101 of the moving apparatus 100 rotates is less than a distance that the rearward portion 102 of the moving apparatus 100 rotates. For example, as illustrated in FIGS. 16F and 16G, when the moving apparatus 100 needs to switch from the second motion state to the third motion state, the moving apparatus 100 starts to rotate in a way that the overall direction 106 of the moving apparatus 100 is transitioning from being substantially parallel to the side wall 320 to being substantially parallel to the liquid surface 200. For example, as illustrated in FIG. 16F, the forward portion 101 of the moving apparatus 100 rotates in a counter-clockwise direction toward the side wall 320 and the rearward portion 102 of the moving apparatus 100 rotates in the counter-clockwise direction away from the side wall 320 toward the liquid surface 200, until the moving apparatus 100 switches to the third motion state where a top portion of the moving apparatus 100 faces upward and the bottom of the moving apparatus 100 faces down. In this case, a distance that the forward portion 101 of the moving apparatus 100 rotates is less than a distance that the rearward portion 102 of the moving apparatus 100 rotates. During a process of the moving apparatus 100 switching from the third motion state to the second motion state, in response to the forward portion 101 of the moving apparatus 100 being in contact with side wall 320, the moving apparatus 100 rotates around a second virtual axis in a second direction. The second virtual axis is located at the interior of the forward portion 101 of the moving apparatus 100. In this way, a distance that the rearward portion 102 of the moving apparatus 100 rotates is greater than a distance that the forward portion 101 of the moving apparatus 100 rotates. For example, as illustrated in FIGS. 17A and 17B, when the moving apparatus 100 needs to switch from the third motion state to the second motion state, the forward portion 101 of the moving apparatus 100 abuts against or touches the side wall 320 and the moving apparatus 100 starts to rotate in a way that the overall direction 106 of the moving apparatus 100 is transitioning from being substantially parallel to the liquid surface 200 to being substantially parallel to the side wall 320. For example, as illustrated in FIG. 17B, the forward portion 101 of the moving apparatus 100 rotates in a clockwise direction away from the side wall 320 and the rearward portion 102 of the moving apparatus 100 rotates in the clockwise direction towards the side wall 320 and moves downward, until the moving apparatus 100 switches to the second motion state where the forward portion 101 of the moving apparatus 100 faces upward and the rearward portion 102 of the moving apparatus 100 faces down. In this case, a distance that the rearward portion 102 of the moving apparatus 100 rotates is greater than a distance that the forward portion 101 of the moving apparatus 100 rotates. The first direction is in opposite to the second direction. One of the first direction and the second direction is the clockwise direction and the other one of the first direction and the second direction is the counter-clockwise direction.

In one embodiment, the mode switching member 110 is further configured to regulate a force applied on the moving apparatus 100 along a vertical direction. That is, when the moving apparatus 100 is in the second motion state, the mode switching member 110 is configured to regulate the force applied on the moving apparatus 100 along the vertical direction, which enables the moving apparatus 100 to be switched from the second motion state to the third motion state. When the moving apparatus 100 is in the third motion state, the mode switching member 110 is configured to regulate the force applied on the moving apparatus 100 along the vertical direction, which enables the moving apparatus 100 to be switched from the third motion state to the second motion state or to be switched from the third motion state directly to the first motion state. In other words, the mode switching member 110 is configured to regulate the force applied on the moving apparatus 100 along the vertical direction, which enables the moving apparatus 100 to perform the position-and-posture switching above or below the liquid surface 200.

To be noted that, as illustrated in FIG. 2, the vertical direction may be referred to as a vertical direction of the target region 300, for example, a vertical direction of the pool, i.e., a gravity direction. The horizontal direction may be referred to as a horizontal direction of the target region 300, for example, a horizontal direction of the pool, i.e., a direction perpendicular to the gravity direction.

In one embodiment, the force applied on the moving apparatus 100 along the vertical direction may include a buoyancy force applied on the moving apparatus 100 along the vertical direction. The mode switching member 110 is further configured to regulate a magnitude of the buoyancy force applied on the moving apparatus 100 along the vertical direction. Since a gravity of the moving apparatus 100 remains substantially unchanged, in response to the magnitude of the buoyancy force applied on the moving apparatus 100 along the vertical direction being regulated, the moving apparatus 100 may be enabled to perform the position-and-posture switching between the second motion state and the third motion state or between the first motion state and the third motion state, thereby being further enabled to be perform the position-and-posture switching above or below the liquid surface 200. That is, when the moving apparatus 100 is in the second motion state, the mode switching member 110 regulates the buoyancy force applied on the moving apparatus 100 along the vertical direction to increase, and the moving apparatus 100 may thus be switched from the second motion state to the third motion state as the moving apparatus 100 continues moving, thereby enabling the moving apparatus 100 to perform the position-and-posture switching from being below the liquid surface 200 to above the liquid surface 200. When the moving apparatus 100 is in the third motion state, the mode switching member 110 regulates the buoyancy force applied on the moving apparatus 100 along the vertical direction to decrease, and the moving apparatus 100 may thus be switched from the third motion state to the second motion state or the first motion state as the moving apparatus 100 continuing moving, thereby enabling the moving apparatus 100 to perform the position-and-posture switching from being above the liquid surface 200 to below the liquid surface 200.

To be noted that, the mode switching member 110 that defines a rigid cavity may increase or decrease the gravity of the mode switching member 110 through regulating a volume of liquid in the rigid cavity, which further increases or decreases the buoyancy force applied on the moving apparatus 100 along the vertical direction. In other words, for the moving apparatus 100 that includes the mode switching member 110 defining the rigid cavity, although the gravity of the moving apparatus 100 is regulated, the position-and-posture switching of the moving apparatus 100 above or below the liquid surface 200 is essentially performed by means of the mode switching member 110 regulating the magnitude of buoyancy force applied on the moving apparatus 100 along the vertical direction.

Figure 6:
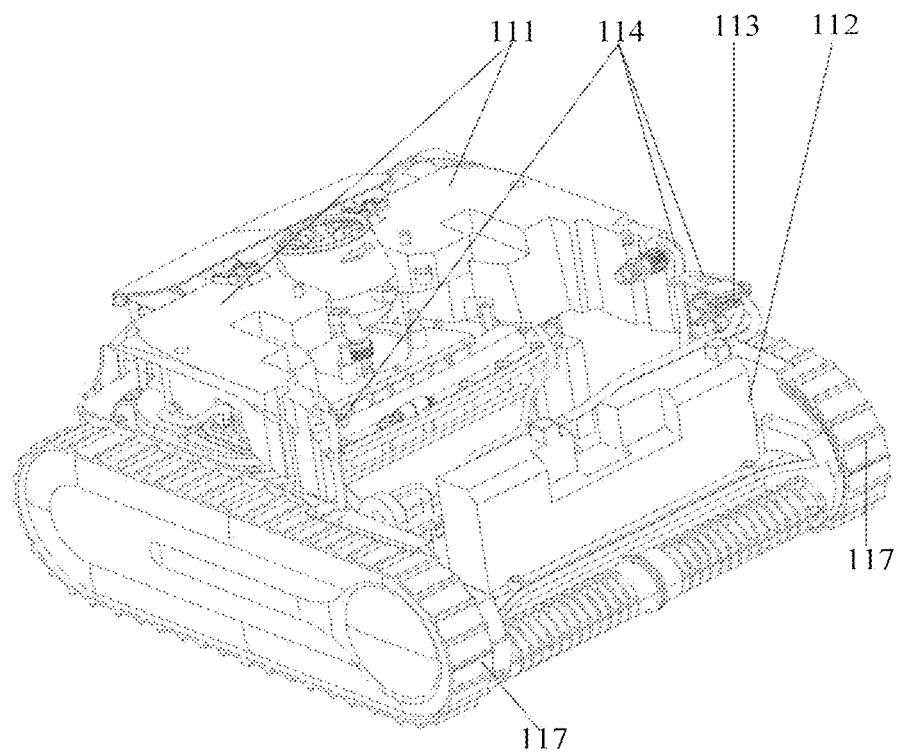
FIG. 6 is a first front elevational view of a moving apparatus used in liquid according to some embodiments of the present disclosure.

In one embodiment, as illustrated in FIG. 6, a first front elevational view of the moving apparatus used in liquid is provided. The mode switching member 110 includes a buoyancy cavity 111, a first regulating member 112, and at least one first injection port 113. The buoyancy cavity 111 is configured to accommodate gas or liquid. The first regulating member 112 is configured to regulate a volume of the gas or liquid in the buoyancy cavity 111. The at least one first injection port 113 is connected to the buoyancy cavity 111 to enable or allow external gas or liquid to enter the buoyancy cavity 111. After the first injection port 113 of the moving apparatus 100 is exposed above the liquid surface 200, the first regulating member 112 is turned on to enable gas to be injected into the buoyancy cavity 111 through the first injection port 113, as illustrated in FIG. 16F, so that the rearward portion 102 of the moving apparatus 100 moves toward the liquid surface 200, which enables the moving apparatus 100 to be switched from the second motion state to the third motion state. A change in the volume of the gas or liquid in the buoyancy cavity 111 may lead to a change in the magnitude of the buoyancy force applied on the moving apparatus 100 along the vertical direction, which enables the moving apparatus 100 to be switched from the second motion state to the third motion state and to perform the position-and-posture switching above or below the liquid surface 200. It should be noted that, as illustrated in FIGS. 3 and 5, or as illustrated in FIGS. 16A and 16G, a position-and-posture of the moving apparatus 100 in the third motion state is substantially identical to a position-and-posture of the moving apparatus 100 in the first motion state. As illustrated in FIGS. 22A and 22B, the moving apparatus 100 is in a substantially horizontal state.

Figure 7:
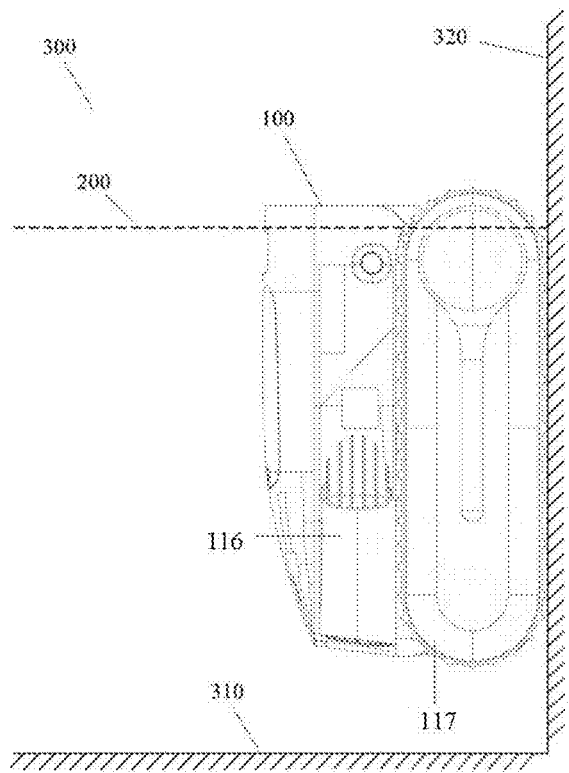
FIG. 7 is a fifth side elevational view of a moving apparatus used in liquid according to some embodiments of the present disclosure.
Figure 16D:
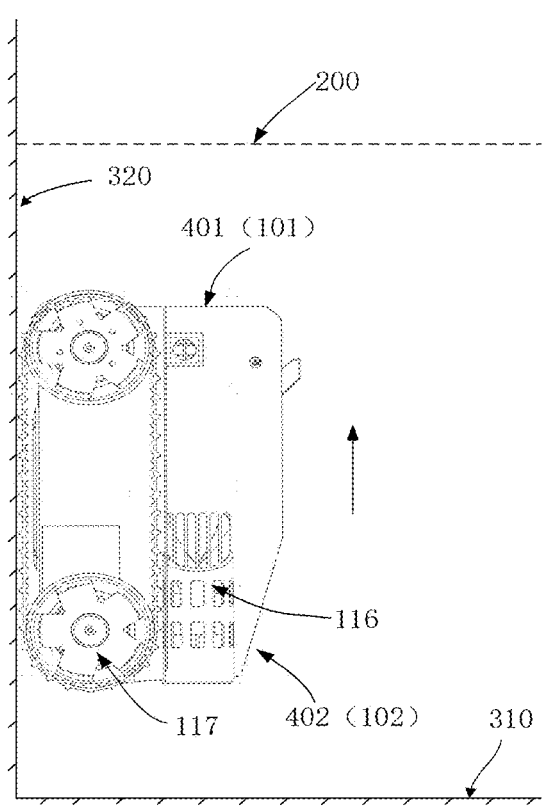
FIG. 16D is a side elevational view of a moving apparatus in a second motion state during the moving apparatus switching from a first motion state through the second motion state to a third motion state according to some embodiments of the present disclosure.
Figure 16E:
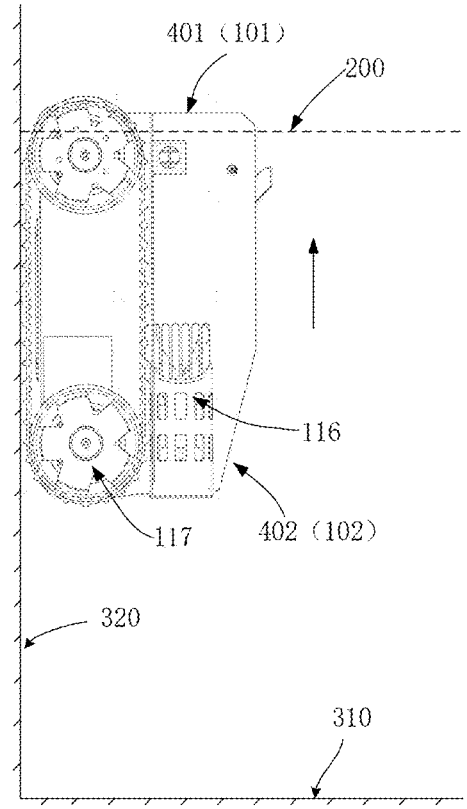
FIG. 16E is a side elevational view of a state of a moving apparatus moving upward to a liquid line during the moving apparatus switching from a first motion state through a second motion state to a third motion state according to some embodiments of the present disclosure.

That is, as illustrated in FIG. 16D or FIG. 4 or FIG. 2, when the moving apparatus 100 moves upward along the side wall 320 or moves upward along a direction substantially parallel to the side wall 320, the moving apparatus 100 is in the second motion state. As illustrated in FIG. 16E or FIG. 7, a fifth side elevational view of the moving apparatus used in liquid is provided. As the moving apparatus 100 continues climbing upward along the side wall 320 or along a direction substantially parallel to the side wall 320, in response to the forward portion 101 of the moving apparatus 100 reaching the liquid line 201, the first injection port 113 is exposed above the liquid surface 200 and then the first regulating member 112 regulates the volume of gas to be injected into the buoyancy cavity 111 through the first injection port 113. In this way, the volume of gas in the buoyancy cavity 111 increases, thereby enabling the buoyancy force applied on the moving apparatus 100 to be increased. Since the forward portion 101 of the moving apparatus 100 is at least partially exposed above the liquid surface 200, the rearward portion 102 of the moving apparatus 100 floats upward. As illustrated in FIG. 5 or FIG. 16F, the moving apparatus 110 begins transitioning from a vertical state to a substantially horizontal state until the rearward portion 102 of the moving apparatus 100 at least partially is exposed above the liquid surface 200, as illustrated in FIG. 5 or FIG. 16G. In this case, the moving apparatus 100 is in the third motion state to perform the liquid surface cleaning and the moving apparatus 100 finishes the position-and-posture switching from the second motion state to the third motion state.

As illustrated in FIG. 6, the first injection port 113 may be provided at the forward portion 101 of the moving apparatus 100. To increase the buoyancy force applied on the moving apparatus 100, the gas injected into the buoyancy cavity 111 needs to enter the buoyancy cavity 111 through the first injection port 113 and thus, the gas may enter the buoyancy cavity 111 only when the first injection port 113 is exposed above the liquid surface 200. Therefore, the first injection port 113 is provided at the forward portion 101 of the moving apparatus 100, which enables the first injection port 113 to be exposed above the liquid surface 200 first when the moving apparatus 100 is in the second motion state, thereby allowing gas to be injected into the buoyancy cavity 111 more promptly to realize the position-and-posture switching of the moving apparatus 100 from the second motion state to the third motion state when the moving apparatus 100 needs to perform the position-and-posture switching.

In one embodiment, the first injection port 113 may be provided on the buoyancy cavity 111 or may be provided independent of the buoyancy cavity 111. In another embodiment, the first injection port 113 may be provided on a housing of the moving apparatus 100, which facilitates the first injection port 113 to be connected to an external environment (e.g., external liquid or external gas), thereby realizing an exchange of the gas and/or the liquid. In an embodiment, the first injection port 113 is located inside the forward portion 401 of the cleaning device 400. At least one connecting port is provided at a front side wall of the forward portion 401 of the cleaning device 400 and is connected between the external environment and an interior of the cleaning device 400. In this way, the external gas may enter into the cleaning device 400 through the at least one connecting port and then injects into the buoyancy cavity 111 through the first injection port 113. The gas inside the buoyancy cavity 111 may also exit the cleaning device 400 through the first injection port 113 and the at least one connecting port.

In some embodiments, as illustrated in FIG. 3 or FIG. 16A, the moving apparatus 100 further includes the first motion state that performs an underwater cleaning task and etc. The moving apparatus 100 may be switched from the first motion state through the second motion state to the third motion state or may be switched from the third motion state through the second motion state to the first motion state. In other words, the moving apparatus 100 may perform the position-and-posture switching among the first motion state, the second motion state, and the third motion state.

Figure 10:
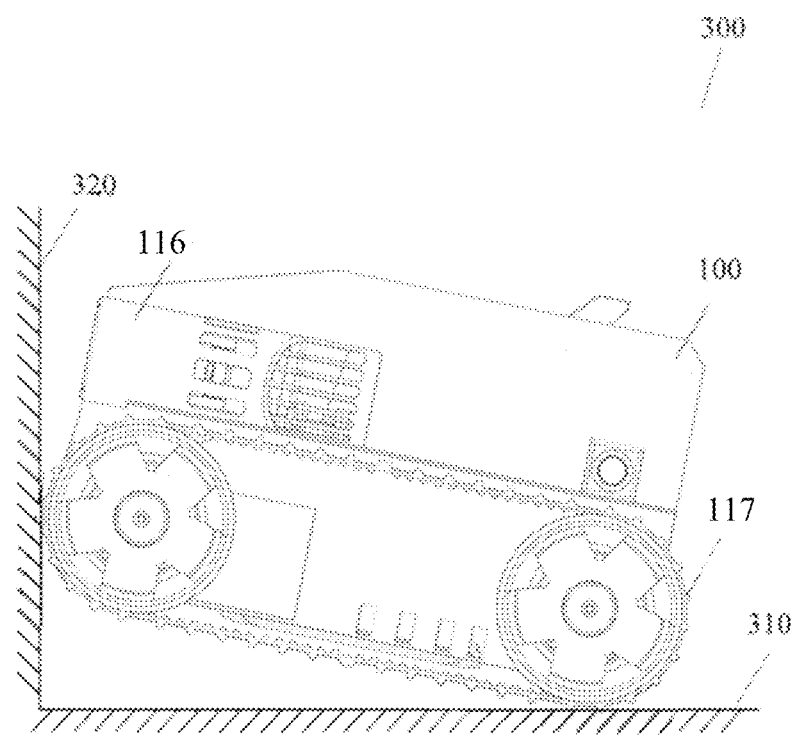
FIG. 10 is a sixth side elevational view of a moving apparatus used in liquid according to some embodiments of the present disclosure.

That is, as illustrated in FIG. 3, when the moving apparatus 100 moves on the bottom 310 or when the angle between the bottom 310 and the overall direction of the moving apparatus 100 is less than 90° and the moving apparatus 100 moves far from the liquid surface 200, the moving apparatus 100 is in the first motion state. After the moving apparatus 100 finishes the bottom cleaning, as illustrated in FIG. 10 or FIG. 16C, the moving apparatus 100 moves to abut against or touch the side wall 320 and then rotates to move onto the side wall 320; then, as illustrated in FIG. 2 or FIG. 16D, the moving apparatus 100 moves upward along a direction substantially parallel to the side wall 320 and the moving apparatus 100 is in the second motion state, i.e., the moving apparatus 100 is performing the position-and-posture switching from the first motion state to the second motion state. Then, as illustrated in FIG. 7, the moving apparatus 100 moves along the side wall 320 to the liquid line 201 and the first injection port 113 is exposed above the liquid surface 200. As illustrated in FIG. 5, the first regulating member 112 regulates the volume of gas to be injected into the buoyancy cavity 111 through the first injection port 113. In this way, the volume of gas in the buoyancy cavity 111 increases, thereby enabling the buoyancy force applied on the moving apparatus 100 to be increased. Since the forward portion 101 of the moving apparatus 100 has at least been partially exposed above the liquid surface 200, the rearward portion 102 of the moving apparatus 100 floats upward. That is, the moving apparatus 100 begins transitioning from the vertical state to the substantially horizontal state until the rearward portion 102 of the moving apparatus 100 is at least partially exposed above the liquid surface 200 or the rearward portion 102 of the moving apparatus 100 at least moves a certain distance in a direction toward the liquid surface 200 with respect to a position which the rearward portion 102 of the moving apparatus 100 is located on when the moving apparatus 100 is in the second motion state, i.e., the moving apparatus 100 is in the third motion state to perform the liquid surface cleaning. That is, the moving apparatus 100 finishes the position-and-posture switching from the second motion state to the third motion state.

After the liquid surface cleaning is finished, the moving apparatus 100 may move to any liquid line. In this case, the forward portion 101 of the moving apparatus 100 substantially abuts against or touches the liquid line 201 at the side wall 320 and the rearward portion 102 is far from the liquid line 201 at the side wall 320. Then, the first regulating member 112 regulates the volume of gas in the buoyancy cavity 111 to be discharged through the first injection port 113, which reduces the buoyancy force applied on the moving apparatus 100 and results in the moving apparatus 100 to move downward. At this time, a main pump 118 and/or the moving mechanism is in operation, the moving apparatus 100 begins switching from the horizontal state to the vertical state, thereby finishing the position-and-posture switching from the third motion state to the second motion state. To be noted that, during a process of the first regulating member 112 regulating the volume of gas in the buoyancy cavity 111 to be discharged through the first injection port 113, the gas located at a part of the buoyancy cavity 111 that is far from the first injection port 113 may generally be discharged earlier than the gas located at a part of the buoyancy cavity 111 that is close to the first injection port 113. That is, a part of the moving apparatus 100 that is far from the first injection port 113 first moves downward until the moving apparatus 100 finishes to be switched to the second motion state, and then a part of the moving apparatus 100 which the first injection port 113 is located on moves downward, thereby facilitating a regulation to the volume of gas in the buoyancy cavity 111. Subsequently, the moving apparatus 100 may move downward along the side wall 320 or along a direction substantially parallel to the side wall 320 until the moving apparatus 100 abuts against or touches the bottom 310. Lastly, the moving apparatus 100 moves on the bottom 310, thereby finishing the position-and-posture switching from the second motion state to the first motion state. Alternatively, the moving apparatus 100 may start using the first regulating member 112 to regulate the volume of gas in the buoyancy cavity 111 to be discharged through the first injection port 113 at anywhere on or above the liquid surface 200. The volume of gas in the buoyancy cavity 111 decreases so that the buoyancy force applied on the moving apparatus 100 decreases, which enables the moving apparatus 100 to start to move downward. Until the moving apparatus 100 moves to a preset depth or directly moves to the bottom 310, the moving apparatus 100 finishes the position-and-posture switching from the third motion state to the first motion state. Regarding the process above, it is to be ensured as much as possible that, the part of the moving apparatus 100 which the first injection port 113 is located on submerges below the liquid surface 200 at the end of the process.

In one embodiment, the buoyancy cavity 111 further accommodates a chemical agent. The chemical agent may also be received in an accommodating chamber for chemical agent that is connected to the buoyancy cavity 111. The chemical agent may be configured to generate gas in response to a first preset trigger manner. The buoyancy cavity 111 is flexible. A volume of the buoyancy cavity 111 may vary in accordance with a change in the volume of gas in the buoyancy cavity 111. When the moving apparatus 100 is in the second motion state, the chemical agent generate gas in response to the first preset trigger manner, which increases the volume of gas in the buoyancy cavity 111 that is under an empty state and further increases the volume of the buoyancy cavity 111. In this way, the buoyancy force applied on the moving apparatus 100 is increased and the moving apparatus 100 may be switched from the first motion state or the second motion state to the third motion state, thereby enabling the moving apparatus 100 to perform the position-and-posture switching from being below the liquid surface 200 to above the liquid surface 200. When the moving apparatus 100 is in the third motion state, the gas in the buoyancy cavity 111 restores the chemical agent in response to a second preset trigger manner, which decreases the volume of gas in the buoyancy cavity 111 filled with gas and further decreases the volume of the buoyancy cavity 111. In this way, the buoyancy force applied on the moving apparatus 100 is decreased and the moving apparatus 100 may be switched from the third motion state to the first motion state or the second motion state, thereby enabling the moving apparatus 100 to perform the position-and-posture switching from being above the liquid surface 200 to below the liquid surface 200.

In some embodiments, the buoyancy cavity 111 is flexible and the volume of the buoyancy cavity 111 may vary in accordance with the change in the volume of gas in the buoyancy cavity 111. The first regulating member 112 is a pump (e.g., a pneumatic pump, a hydraulic pump or an electric pump, and etc.). The pump may drive gas to be injected into/discharged from the buoyancy cavity 111, which increases/decreases the volume of gas in the buoyancy cavity 111 and further increases/decreases the volume of the buoyancy cavity 111, thereby performing the regulation to the volume of gas in the buoyancy cavity 111. When the moving apparatus 100 is in the second motion state, the pump drives the gas to be injected into the buoyancy cavity 111 through the first injection port 113, which increases the volume of gas in the buoyancy cavity 111 that is under the empty state and further increases the volume of the buoyancy cavity 111. In this way, the buoyancy force applied on the moving apparatus 100 is increased and the moving apparatus 100 may be switched from the second motion state to the third motion state, thereby enabling the moving apparatus 100 to perform the position-and-posture switching from being below the liquid surface 200 to above the liquid surface 200. When the moving apparatus 100 is in the third motion state, the pump drives the gas to be discharged through the first injection port 113, which decreases the volume of gas in the buoyancy cavity 111 and further decreases the volume of the buoyancy cavity 111. In this way, the buoyancy force applied on the moving apparatus 100 is decreased and the moving apparatus 100 may be switched from the third motion state to the second motion state or may be switched from the third motion state directly to the first motion state.

To be noted that, the gas driven by the pump may come from a gas tank provided on the moving apparatus 100 or may be external gas. When the gas driven by the pump comes from the gas tank, the moving apparatus 100 allows the gas to be injected into the buoyancy cavity 111 through the first injection port 113 either on or below the liquid surface 200. In this way, the moving apparatus 100 may be directly switched from the first motion state to the third motion state, or may be switched from the first motion state through the second motion state to the third motion state. When the gas driven by the pump is the external gas, the gas may be injected through the first injection port 113 only when the first injection port 113 is exposed above the liquid surface 200. In addition, the buoyancy cavity 111 whose volume varies in accordance with the change in the volume of gas therein is made of a flexible material, including but not limited to, a polyvinyl alcohol resin, a polyethylene terephthalate or a rubber, and etc.

In one embodiment, as illustrated in FIG. 6, the mode switching member 110 further includes a first connection duct 114. That is, the mode switching member 110 includes the buoyancy cavity 111, the first regulating member 112, the at least one first injection port 113, and the first connection duct 114. The first connection duct 114 is configured to transmit gas or liquid. The first connection duct 114 may be connected to one or more of: the buoyancy cavity 111, the first regulating member 112, and the first injection port 113. As illustrated in FIG. 6, the moving apparatus 100 includes at least two buoyancy cavities 111, the first regulating member 112, the first injection port 113, and the first connection duct 114. The buoyancy cavity 111 may be connected to the first regulating member 112 through the first connection duct 114. The first regulating member 112 may be connected to the first injection port 113 through the first connection duct 114.

In some embodiments, the buoyancy cavity 111 is rigid. The moving apparatus 100 may further include a discharging port 119. The first regulating member 112 is a pump. When the moving apparatus 100 is in the third motion state, the pump drives the gas in the buoyancy cavity 111 to discharge through the first injection port 113 and a negative pressure is generated in the buoyancy cavity 111 due to a decrease in pressure within the buoyancy cavity 111. The negative pressure drives the liquid to be injected into the buoyancy cavity 111 through the discharging port 119. Thus, in response to the gas being discharged and the liquid being injected, a weight of the buoyancy cavity 111 increases and the buoyancy force applied on the moving apparatus 100 decreases, which enables the moving apparatus 100 to be switched from the third motion state to the second motion state or the first motion state, thereby performing the position-and-posture switching from being on or above the liquid surface 200 to below the liquid surface 200. When the moving apparatus 100 is in the second motion state, the pump drives gas to be injected into the buoyancy cavity 111 through the first injection port 113 and further drives the liquid in the buoyancy cavity 111 to discharge through the discharging port 119. Thus, in response to the gas being injected and the liquid being discharged, the weight of the buoyancy cavity 111 decreases and the buoyancy force applied on the moving apparatus 100 increases, which enables the moving apparatus 100 to be switched from the second motion state to the third motion state, thereby performing the position-and-posture switching from being below the liquid surface 200 to above the liquid surface 200.

Specifically, as illustrated in FIG. 16A, when the moving apparatus 100 is moving on the bottom 310, or the moving apparatus 100 is moving in a state where an angle between the bottom 310 and the overall direction 106 of the moving apparatus 100 is less than 90° and the moving apparatus 100 is far from the liquid surface 200, the moving apparatus 100 is in the first motion state. In this case, the top portion of the moving apparatus 100 faces upward, the bottom of the moving apparatus 100 faces downward or toward the bottom 310, and the moving apparatus 100 may perform the bottom cleaning. During a process of the moving apparatus 100 moving on the bottom 310 or performing the bottom cleaning, the main pump 118 remains being turned on to generate a third driving force (please refer to the content below) that enables the moving apparatus 100 to closely abut against or touch the bottom 310. After the moving apparatus 100 has finished the underwater cleaning, as illustrated in FIG. 16B, the moving apparatus 100 moves toward the side wall 320 until the forward portion 101 of the moving apparatus 100 abuts against or touches the side wall 320. As illustrated in FIG. 16C, the moving apparatus 100 rotates to move onto the side wall 320 until the overall direction 106 of the moving apparatus 100 is substantially parallel to the side wall 320 and the moving apparatus 100 switches to the second motion state. During the process of the moving apparatus 100 rotating to the side wall 320, after the forward portion 101 of the moving apparatus 100 abuts against or touches the side wall 320, in a case that the forward portion 101 of the moving apparatus 100 successfully rotates onto the side wall 320 within a preset duration the main pump 118 does not need to be turned off and may remain in operation. However, in a case that the forward portion 101 of the moving apparatus 100 fails to rotate onto the side wall 320 within the preset duration, for example, a sensor detects that a posture of the moving apparatus 100 remains unchanged within the preset duration, the moving apparatus 100 is considered to be stuck on the bottom 310 or to be stuck at an intersection between the side wall 320 and the bottom 310, as a result of the third driving force generated by the main pump 118 in operation. The third driving force causes the moving apparatus 100 to closely abut against or touch the bottom 310, which results in the forward portion 101 of the moving apparatus failing to rotate to move upward and the moving apparatus 100 thus remaining to be stuck. In this case, the main pump 118 is controlled to be turned off temporarily so that the third driving force that causes the moving apparatus 100 to closely abut against or touch the bottom 310 is cancelled, thereby ensuring the forward portion 101 of the moving apparatus 100 to successfully rotate upward onto the side wall 320. Once the moving apparatus 100 rotates to a state where an included angle between the bottom 310 and the overall direction 106 of the moving apparatus 100 is a first preset angle, the main pump 118 is controlled to be turned on to generate the third driving force, which ensures the moving apparatus 100 to be able to rotate from the bottom 310 to the side wall 320 and then to closely abut against or touch the side wall 320, thereby allowing the moving apparatus 100 to switch to the second motion state. Alternatively, after the forward portion 101 of the moving apparatus 100 abuts against or touches the side wall 320, instead of detecting the posture of the moving apparatus 100 by the sensor, the main pump 118 is directly controlled to be temporarily turned off, allowing the forward portion 101 of the moving apparatus 100 to successfully rotate upward onto the side wall 320. Then, once the moving apparatus 100 rotates to a state where an included angle between the bottom 310 and the overall direction 106 of the moving apparatus 100 is the first preset angle, the main pump 118 is controlled to be turned on again to generate the third driving force, which ensures the moving apparatus 100 to closely abut against or touch the side wall 320, thereby allowing the moving apparatus 100 to switch to the second motion state. As illustrated in FIG. 16D, the moving apparatus 100 has finished the position-and-posture switching from the first motion state to the second motion state. When the moving apparatus 100 is in the second motion state, the forward portion 101 of the moving apparatus 100 or the forward portion 401 of the cleaning device 400 faces upward, the rearward portion 102 of the moving apparatus 100 or the rearward portion 402 of the cleaning device 400 faces down, and the rearward portion 402 of the cleaning device 400 may be close to or be away from the bottom 310 along a height direction of the side wall 320. When the moving apparatus 100 is in the second motion state, the moving apparatus 100 may perform the side wall cleaning. During the process of the moving apparatus 100 moving on the side wall 320 or performing the side wall cleaning, the main pump 118 remains being turned on. After the moving apparatus 100 has finished the side wall cleaning, as illustrated in FIG. 16E, the moving apparatus 100 moves upward along the side wall 320 toward the liquid line 201 until the forward portion 101 of the moving apparatus 100 is exposed above the liquid surface 200, thereby enabling the first injection port 113 provided on or at or in the forward portion 101 of the moving apparatus 100 to be at least partially exposed above the liquid surface 200. that is, the forward portion 101 of the moving apparatus 100 is provided with the first injection port 113.

When the moving apparatus 100 is in the first motion state or the second motion state, the buoyancy cavity 111 is almost filled with liquid, or most part of the buoyancy cavity 111 is filled with liquid and the rest of the buoyancy cavity 111 is filled with gas, which facilitates the cleaning device 400 to be located below the liquid surface 200. The first injection port 113 is provided on or at or in the forward portion 101 of the moving apparatus 100 or the forward portion 401 of the cleaning device 400. A part of the buoyancy cavity 111 that is close to the first injection port 113 is provided on the forward portion 101 of the moving apparatus 100 or the forward portion 401 of the cleaning device 400. A part of the buoyancy cavity 111 that is far from the first injection port 113 is provided on the rearward portion 102 of the moving apparatus 100 or the rearward portion 402 of the cleaning device 400. When the moving apparatus 100 is moving on the side wall 320, the first intake port for performing the bottom cleaning continuously takes in liquid, a main pump inlet 1181 of the main pump 118 continuously discharges liquid, the liquid discharged from the main pump inlet 1181 applied a third driving force on the moving apparatus 100 to drive the moving apparatus 100 to abut against or touch the side wall 320.

As illustrated in FIG. 16E, the moving apparatus 100 remains abutting against or touching the side wall 320. When the first injection port 113 is at least partially exposed above the liquid surface 200, the first regulating member 112 is turned on. In a case that the first regulating member 112 is a pump, an electric motor of the pump rotates in a positive direction. The pump drives the external gas to be injected into the buoyancy cavity 111 through the first injection port 113 and the liquid in the buoyancy cavity 111 to be discharged through the discharging port 119, which allows the volume of gas in the buoyancy cavity 111 to be increased. The liquid located at a part of the buoyancy cavity 111 that is close to the first injection port 113 may generally be discharged earlier than the liquid located at a part of the buoyancy cavity 111 that is far from the first injection port 113. The part of the buoyancy cavity 111 that is close to the first injection port 113 is filled with gas earlier than the part of the buoyancy cavity 111 that is far from the first injection port 113, which allows a buoyancy force applied on the part of the buoyancy cavity 111 that is close to the first injection port 113 to be increased, so that the moving apparatus 100 is driven by such buoyancy force to start to rotate. However, due to the third driving force generated by the main pump 118 in operation, during a process of the moving apparatus 100 rotating, a point or location where the forward portion 101 of the moving apparatus 100 abuts against or touches the side wall 320 changes. In this way, the forward portion 101 of the moving apparatus 100 rotates toward the side wall 320 and the rearward portion 102 of the moving apparatus 100 rotates away from the side wall 320 and moves upward to the liquid surface 200.

As illustrated in FIG. 16F, in a case that the side wall 320 is a vertical plane, the moving apparatus 101 starts to rotate so that the overall direction 106 of the moving apparatus 101 is transitioning from being substantially perpendicular to the liquid surface 200 to being substantially parallel to the liquid surface 200; alternatively, the moving apparatus 101 starts to rotate so that the overall direction 106 of the moving apparatus 101 is transitioning from being substantially parallel to the side wall 320 to being substantially parallel to the liquid surface 200; alternatively, the moving apparatus 101 rotates from a state where the moving apparatus 100 abuts against or touches the side wall 320 to a substantially horizontal state. For example, as illustrated in FIG. 16F, the forward portion 101 of the moving apparatus 100 rotates toward the side wall 320 in the counter-clockwise direction. The rearward portion 102 of the moving apparatus 100 rotates in the counter-clockwise direction away from the side wall 320 and moves upward toward the liquid surface 200. At this time, the rearward portion 102 of the moving apparatus 100 moves upward until the rearward portion 102 of the moving apparatus 100 is at least partially exposed above the liquid surface 200 or the rearward portion 102 of the moving apparatus 100 at least moves a certain distance in a direction toward the liquid surface 200 with respect to a position which the rearward portion 102 of the moving apparatus 100 is located on when the moving apparatus 100 is in the second motion state, i.e., the moving apparatus 100 is in the third motion state. As illustrated in FIG. 16G, the moving apparatus 100 has finished the position-and-posture switching from the second motion state to the third motion state. When the moving apparatus 100 is in the third motion state, the top portion of the moving apparatus 100 faces upward or faces away from the bottom 310, and the bottom of the moving apparatus 100 faces downward or faces toward the bottom 310, and the moving apparatus 100 is in a substantially horizontal state. As illustrated in FIGS. 22A and 22B, under an actual application scenario, due to various factors, the forward portion 101 of the moving apparatus 100 is slightly tilted upward and the rearward portion 102 of the moving apparatus 100 is slightly tilted downward. In a case that an angle between the overall direction 106 of the moving apparatus 100 and the liquid surface 200 is less than or equal to 30°, the moving apparatus 100 is considered to be in the substantially horizontal state. As illustrated in FIG. 3 or 5 or 16A or 16G or 22A or 22B, the position-and-posture of the moving apparatus 100 in the first motion state is substantially identical to the position-and-posture of the moving apparatus 100 in the third motion state, i.e., the moving apparatus 100 is in the substantially horizontal state. After the moving apparatus 100 finishes switching from the second motion state to the third motion state, the moving apparatus 100 may stop near the liquid line without performing the liquid surface cleaning, thereby allowing a user to lift the moving apparatus 100 out of the liquid from the liquid surface 200 near the liquid line. Alternatively, the moving apparatus 100 may also remain still near the liquid line and wait for other instructions from the user, for example, to clean the liquid surface 200, or to switch to the second motion state, or to switch to the first motion state, etc.

When the moving apparatus 100 is performing the liquid surface cleaning or moving on the liquid surface, the main pump 118 remains being turned on. After the liquid surface cleaning is finished, the moving apparatus 100 may move to any liquid line. In this case, the forward portion 101 of the moving apparatus 100 substantially abuts against or touches the liquid line 201 at the side wall 320 and the rearward portion 102 is far from the liquid line 201 at the side wall 320. When the moving apparatus 100 is in the third motion state, the buoyancy cavity 111 is almost filled with gas or most part of the buoyancy cavity 111 is filled with gas, which facilitates the moving apparatus 100 to remain in the third motion state. As illustrated in FIG. 17A, the first regulating member 112 is configured to regulate the volume of gas in the buoyancy cavity 111. For example, in a case that the first regulating member 112 is a pump, the pump rotates in a negative direction to drive the gas in the buoyancy cavity 111 to be discharged through the first injection port 113 and the liquid to be drawn into the buoyancy cavity 111 through the discharging port 119 of the buoyancy cavity 111. The gas located at a part of the buoyancy cavity 111 that is far from the first injection port 113 may generally be discharged earlier than the gas located at a part of the buoyancy cavity 111 that is close to the first injection port 113. As the volume of gas in the buoyancy cavity 111 decreases, the part of the buoyancy cavity 111 that is far from the first injection port 113 is filled with liquid earlier than the part of the buoyancy cavity 111 that is close to the first injection port 113. In this way, a gravity of the rearward portion 102 of the moving apparatus 100 increases earlier than a gravity of the forward portion 101 of the moving apparatus 100. Under an action of the increased gravity of the rearward portion 102 of the moving apparatus 100, the moving apparatus 100 starts to rotate. However, due to the third driving force generated by the main pump 118 in operation, during a process of the moving apparatus 100 rotating, a point or location where the forward portion 101 of the moving apparatus 100 abuts against or touches the side wall 320 changes. In this case, the rearward portion 102 of the moving apparatus 100 moves downward first until the moving apparatus 100 finishes the position-and-posture switching to the second motion state. Then, a part of the moving apparatus 100 which the first injection port 113 is located on moves downward.

Figure 17C:
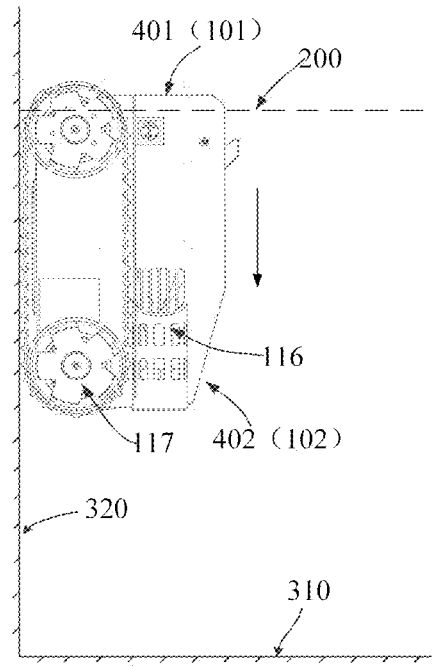
FIG. 17C is a side elevational view of a moving apparatus in a second motion state during the moving apparatus switching from a third motion state through the second motion state to a first motion state according to some embodiments of the present disclosure.
Figure 17D:
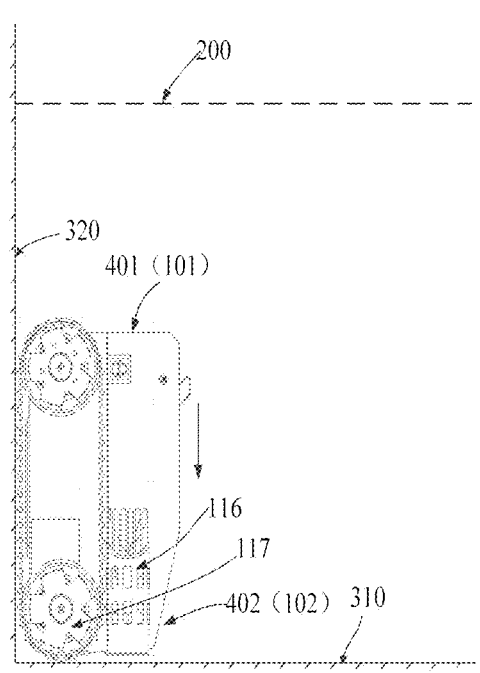
FIG. 17D is a side elevational view of a rearward portion of a moving apparatus abutting against or touching a bottom during the moving apparatus switching from a third motion state through a second motion state to a first motion state according to some embodiments of the present disclosure.
Figure 17E:
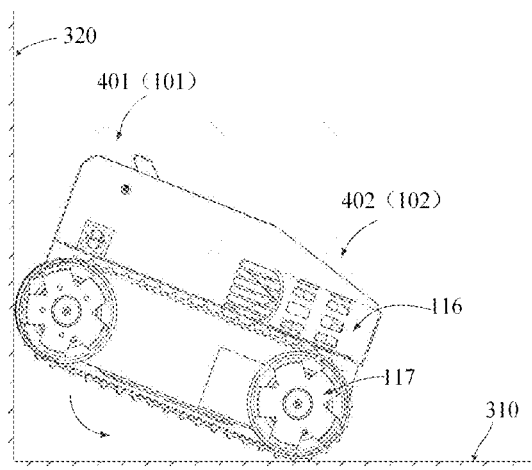
FIG. 17E is a side elevational view of a moving apparatus rotating from a second motion state to a first motion state during the moving apparatus switching from a third motion state through the second motion state to the first motion state according to some embodiments of the present disclosure.
Figure 17F:
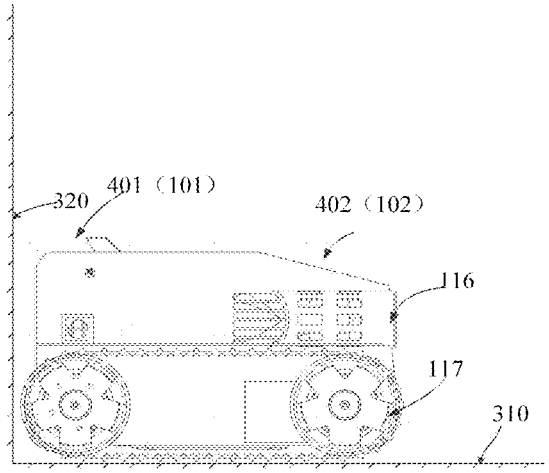
FIG. 17F is a side elevational view of a moving apparatus finishing to switch to a first motion state during the moving apparatus switching from a third motion state through a second motion state to the first motion state according to some embodiments of the present disclosure.

As illustrated in FIG. 17B, in a case that the side wall 320 is a vertical plane, the moving apparatus 101 starts to rotate so that the overall direction 106 of the moving apparatus 101 is transitioning from being substantially parallel to the liquid surface 200 to being substantially perpendicular to the liquid surface 200; alternatively, the moving apparatus 101 starts to rotate so that the overall direction 106 of the moving apparatus 101 is transitioning from being substantially parallel to the liquid surface 200 to being substantially parallel to the side wall 320; alternatively, the moving apparatus 101 rotates from the substantially horizontal state to a state where the overall direction 106 of the moving apparatus 100 abuts against or touches the side wall 320. For example, as illustrated in FIG. 17B, the rearward portion 102 of the moving apparatus 100 rotates toward the side wall 320 in the clockwise direction. The forward portion 101 of the moving apparatus 100 rotates in the clockwise direction away from the side wall 320. The rearward portion 102 moves downward earlier than the forward portion 101 until the moving apparatus 100 finishes the position-and-posture switching to the second motion state. As illustrated in FIG. 17C, the overall direction 106 of the moving apparatus 100 is substantially perpendicular to the liquid surface 200, or the overall direction 106 of the moving apparatus 100 is substantially parallel to the side wall 320, or the overall direction 106 of the moving apparatus 100 abuts against or touches the side wall 320, i.e., the moving apparatus 100 finishes the position-and-posture switching from the third motion state to the second motion state. As illustrated in FIG. 17D, as the moving apparatus 100 is moving downward, the moving apparatus 100 may move downward along the side wall 320 or in a direction substantially parallel to the side wall 320 until the rearward portion 102 of the moving apparatus 100 abuts against or touches the bottom 310. During the process of the moving apparatus 100 moving downward, the forward portion 101 of the moving apparatus 100 faces upward, the rearward portion 102 of the moving apparatus 100 faces downward, and the moving apparatus 100 moves backward on the side wall 320. Subsequently, as illustrated in FIG. 17E, the moving apparatus 100 rotates so that the overall direction 106 of the moving apparatus 100 is transitioning from being perpendicular to the liquid surface 200 or being substantially parallel to the side wall 320 to being substantially parallel to the liquid surface 200, i.e., the moving apparatus 100 is in the substantially horizontal state. During the process of the moving apparatus 100 rotating, after the rearward portion 102 of the moving apparatus 100 abuts against or touches the bottom 310, in a case that the rearward portion 102 of the moving apparatus 100 successfully rotates downward onto the bottom 310 within a preset duration, the main pump 118 does not need to be turned off and may remain in operation. However, in a case that the rearward portion 102 of the moving apparatus 100 fails to rotate downward onto the bottom 310 within the preset duration, for example, a sensor detects that a posture of the moving apparatus 100 remains unchanged within the preset duration, the moving apparatus 100 is considered to be stuck on the side wall 320 or to be stuck at an intersection between the side wall 320 and the bottom 310, as a result of the third driving force generated by the main pump 118 in operation. The third driving force causes the moving apparatus 100 to closely abut against or touch the side wall 320, which results in the rearward portion 102 of the moving apparatus failing to rotate downward and the moving apparatus 100 thus remaining to be stuck. In this case, the main pump 118 is controlled to be turned off temporarily so that the third driving force that causes the moving apparatus 100 to closely abut against or touch the side wall 320 is cancelled, thereby ensuring the rearward portion 102 of the moving apparatus 100 to successfully rotate downward onto the bottom 310. Once the moving apparatus 100 rotates to a state where an included angle between the side wall 320 and the overall direction 106 of the moving apparatus 100 is a second preset angle, the main pump 118 is controlled to be turned on again to generate the third driving force, which ensures the moving apparatus 100 to rotate from the side wall 320 to the bottom 310 and then to closely abut against or touch the bottom 310, thereby allowing the moving apparatus 100 to switch to the first motion state. Alternatively, after the rearward portion 102 of the moving apparatus 100 abuts against or touches the bottom 310, instead of detecting the posture of the moving apparatus 100 by the sensor, the main pump 118 is directly controlled to be temporarily turned off, allowing the rearward portion 102 of the moving apparatus 100 to successfully rotate downward onto the bottom 310. Then, once the moving apparatus 100 rotates to a state where an included angle between the side wall 320 and the overall direction 106 of the moving apparatus 100 is the second preset angle, the main pump 118 is controlled to be turned on again to generate the third driving force, which ensures the moving apparatus 100 to closely abut against or touch the bottom 310, thereby allowing the moving apparatus 100 to switch to the first motion state. As illustrated in FIG. 17F, the moving apparatus 100 finishes the position-and-posture switching from the second motion state to the first motion state.

Figure 18:
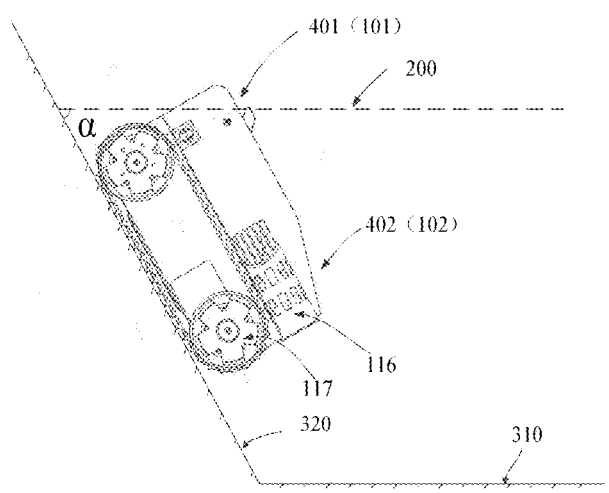
FIG. 18 is a side elevational view of a moving apparatus moving on an inclined side wall according to some embodiments of the present disclosure.

However, under the actual application scenario, the side wall 320 may not be a vertical plane in many cases. In a case that the side wall 320 is a curved surface or an arc surface or an inclined surface, when the moving apparatus 100 is moving on the side wall 320, an included angle $\alpha$ is formed between the overall direction 106 of the moving apparatus 100 and the liquid surface 200. As illustrated in FIG. 18, in a case that the side wall 320 is an inclined surface, an included angle $\alpha$ is formed between the overall direction 106 of the moving apparatus 100 and the liquid surface 200. Similarly, in a case that the moving apparatus 100 is moving on a curved surface or an arc surface, an included angle $\alpha$ is formed between the overall direction 106 of the moving apparatus 100 and the liquid surface 200. In the aforementioned embodiments, during a process of the moving apparatus 100 switching from the second motion state to the third motion state, when the moving apparatus 100 is rotating from the side wall 320 to the liquid surface 200, the included angle $\alpha$ between the overall direction 106 of the moving apparatus 100 and the liquid surface 200 decreases gradually until the included angle $\alpha$ becomes substantially 0°, or the overall direction 106 of the moving apparatus 100 is parallel to the liquid surface 200, or the moving apparatus 100 is in the substantially horizontal state, thereby realizing the position-and-posture switching of the moving apparatus 100 from the second motion state to the third motion state. However, during a process of the moving apparatus 100 switching from the third motion state to the second motion state, when the moving apparatus 100 is rotating from the liquid surface 200 to the side wall 320, the included angle α between the overall direction 106 of the moving apparatus 100 and the liquid surface 200 increases gradually until the overall direction 106 of the moving apparatus 100 touches or abuts against the side wall 320, thereby realizing the position-and-posture switching of the moving apparatus 100 from the third motion state to the second motion state. It is to be noted that, when the pump rotates in the positive direction, gas is injected into the buoyancy cavity 111 and the liquid in the buoyancy cavity 111 is discharged; when the pump rotates in the negative direction, the gas in the buoyancy cavity 111 is discharged and liquid is injected into the buoyancy cavity 111. One of the positive direction and the negative direction is the clockwise direction and the other one of the positive direction and the negative direction is the counter-clockwise direction. In an embodiment, the moving apparatus 100 or the cleaning device 400 further includes a detection assembly. The detection assembly is configured to detect whether the bottom 310, the side wall 320, or the intersection between the bottom 310 and the side wall 320 are curved surfaces or flat surfaces, so as to determine a cleaning path for the moving apparatus 100 to clean the bottom 310 or the side wall 320.

Besides, it is to be noted that, in the aforementioned embodiments, during a process of the moving apparatus 100 rotating to switch from the second motion state to the third motion state, when a point or location where the forward portion 101 of the moving apparatus 100 abuts against or touches the side wall 320 is changing, the moving apparatus 100 may perform a rotation action only and the moving mechanism of the moving apparatus 100 may be not in operation; alternatively, the moving apparatus 100 may move slightly upward while rotating and the moving mechanism is in operation. In this case, the moving mechanism is configured to assist the main pump 118 to further ensure the forward portion 101 of the moving apparatus 100 to remain abutting against or touching the side wall 320. During a process of the moving apparatus 100 rotating to switch from the third motion state to the second motion state, when the point or location where the forward portion 101 of the moving apparatus 100 abuts against or touches the side wall 320 is changing, the moving apparatus 100 may perform a rotation action only and the moving mechanism of the moving apparatus 100 may be not in operation; alternatively, the moving apparatus 100 may move slightly downward while rotating and the moving mechanism is configured to assist the main pump 118 to further ensure the forward portion 101 of the moving apparatus 100 to remain abutting against or touching the side wall 320. A main driving force that enables the forward portion 101 of the moving apparatus 100 to abut against or touch the side wall 320 is the third driving force generated by the main pump 118. In one embodiment, in a case that the moving mechanism includes a track, when the moving apparatus 100 switches among the first motion state, the second motion state, and the third motion state, the forward portion 101 of the moving apparatus 100 abutting against or touching the side wall 320 may refer to a forward portion of the track abutting against or touching the side wall 320; and the rearward portion 102 of the moving apparatus 100 abutting against or touching the bottom 310 may refer to a rearward portion of the track abutting against or touching the bottom 310.

Figure 19A:
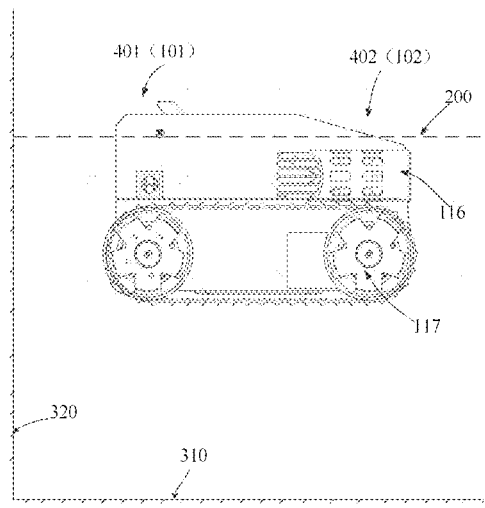
FIG. 19A is a side elevational view of a moving apparatus in a third motion state during the moving apparatus switching from the third motion state directly to a first motion state according to some embodiments of the present disclosure.
Figure 19B:
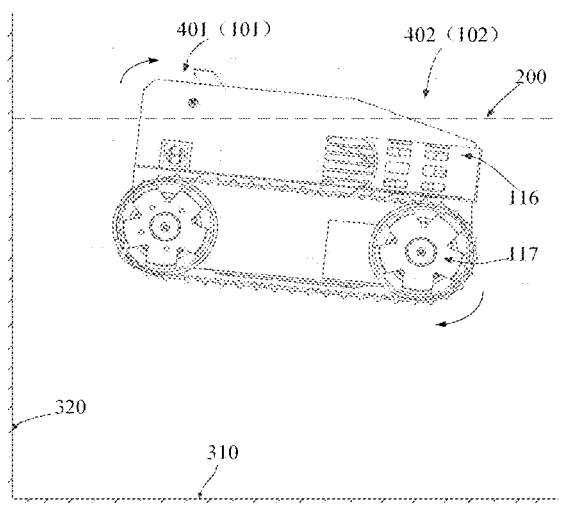
FIG. 19B is a side elevational view of a rearward portion of a moving apparatus rotating downward earlier than a forward portion of the moving apparatus during the moving apparatus switching from a third motion state directly to a first motion state according to some embodiments of the present disclosure.
Figures 19C, 19D:
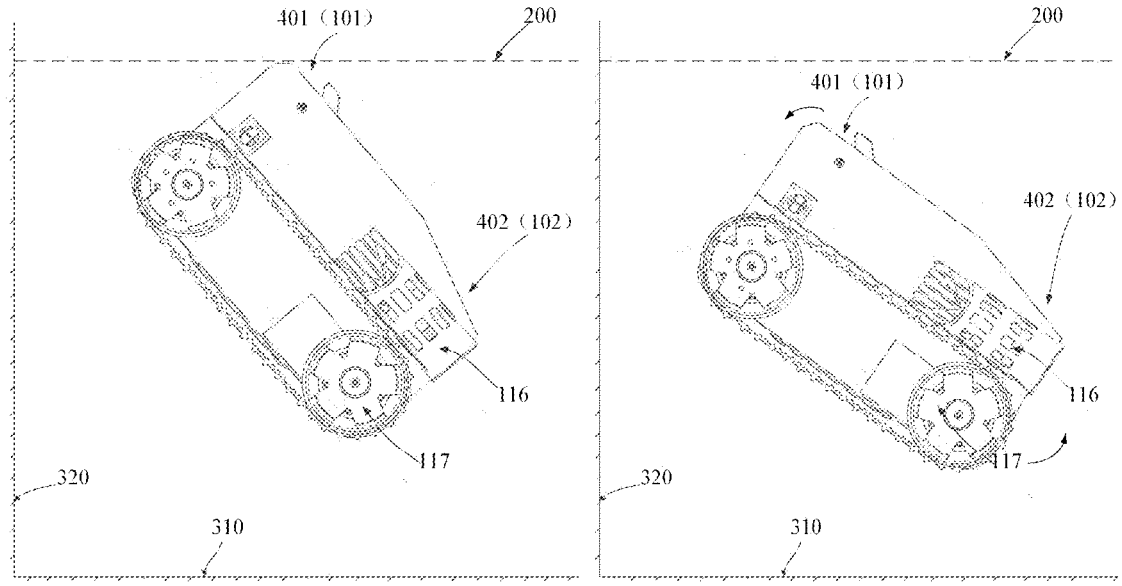
FIG. 19C is a side elevational view of a moving apparatus completely submerging below a liquid surface during the moving apparatus switching from a third motion state directly to a first motion state according to some embodiments of the present disclosure.
FIG. 19D is a side elevational view of a moving apparatus moving downward in a tilting state underwater during the moving apparatus switching from a third motion state directly to a first motion state according to some embodiments of the present disclosure.
Figures 19E, 19F:
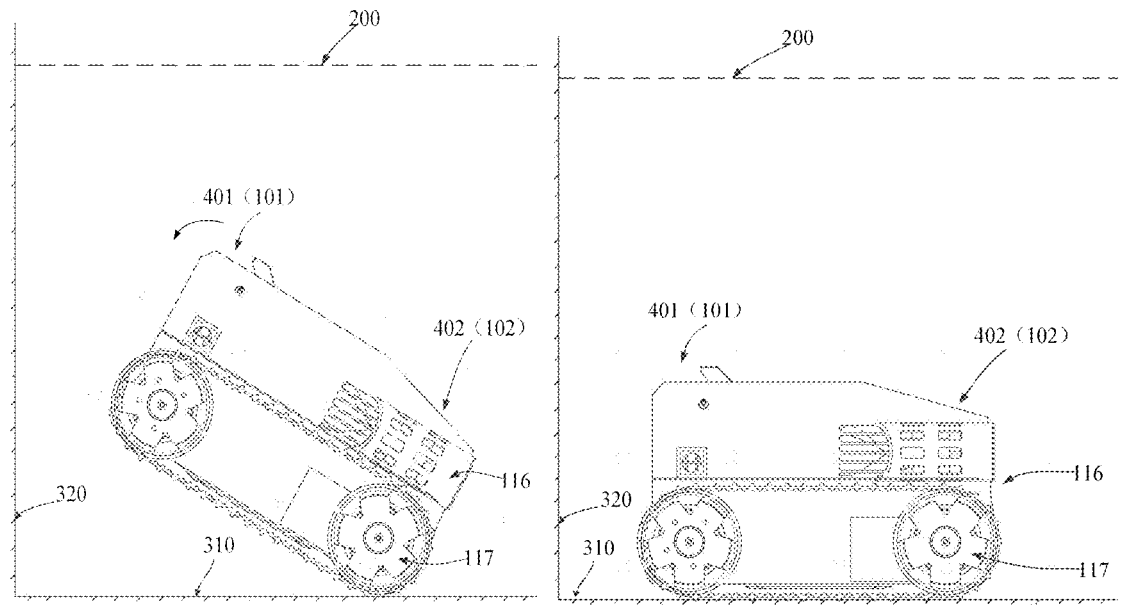
FIG. 19E is a side elevational view of a rearward portion of a moving apparatus abutting against or touching a bottom earlier than a forward portion of the moving apparatus during the moving apparatus switching from a third motion state directly to a first motion state according to some embodiments of the present disclosure.
FIG. 19F is a side elevational view of a moving apparatus finishing to switch to a first motion state during the moving apparatus switching from a third motion state directly to the first motion state according to some embodiments of the present disclosure.

In the aforementioned embodiments, the moving apparatus 100 needs to switch from the third motion state to the first motion state through the second motion state. In another embodiment, as illustrated in FIGS. 19A-19F, the moving apparatus 100 directly switches from the third motion state to the first motion state without through the second motion state. Specifically, as illustrated in FIG. 19A, the moving apparatus 100 is in the third motion state, i.e., the moving apparatus 100 is in the substantially horizontal state. In this case, the buoyancy cavity 111 is almost filled with gas or most part of the buoyancy cavity 111 is filled with gas. The first regulating member 112 is configured to regulate the volume of gas in the buoyancy cavity 111. For example, in a case that the first regulating member 112 is a pump that rotates in the negative direction, the pump drives the gas in the buoyancy cavity 111 to be discharged through the first injection port 113 and liquid to be injected into the buoyancy cavity 111 through the discharging port 119. In this way, the volume of gas in the buoyancy cavity 111 decreases and the buoyancy force applied on the buoyance cavity 111 decreases. As illustrated in FIG. 19B, during a process of the gas in the buoyancy cavity 111 being discharged, the gas located at a part of the buoyancy cavity 111 that is far from the first injection port 113 may generally be discharged earlier than the gas located at a part of the buoyancy cavity 111 that is close to the first injection port 113, and the part of the buoyancy cavity 111 that is far from the first injection port 113 may generally be filled with liquid earlier than the part of the buoyancy cavity 111 that is close to the first injection port 113. In this way, the gravity of the part of the buoyancy cavity 111 that is far from the first injection port 113 may increase earlier than the gravity of the part of the buoyancy cavity 111 that is close to the first injection port 113, thus the rearward portion 102 of the moving apparatus 100 moves downward earlier than the forward portion 101 of the moving apparatus 100 which the first injection port 113 is located on. During a process of the rearward portion 102 of the moving apparatus first moving downward, the first injection port 113 is at least partially exposed above the liquid surface 200, which enables the gas in the buoyancy cavity 111 to remain being discharged and the buoyancy force applied on the moving apparatus 100 to be gradually decreased, thereby facilitating the buoyancy force regulation applied on the buoyancy cavity 111 that enables the moving apparatus 100 to rotate from a state where the overall direction 106 of the moving apparatus 100 is substantially parallel to the liquid surface 200 to a state where the included angle α is formed between overall direction of the moving apparatus 100 and the liquid surface 200, or to rotate from the substantially horizontal state to a tilting state, i.e., the forward portion 101 of the moving apparatus 100 is tilted upward and the rearward portion 102 of the moving apparatus 100 is tilted downward. As illustrated in FIGS. 19B and 19C, the rearward portion 102 of the moving apparatus 100 rotates in the clockwise direction toward the bottom 310 and moves downward first, then the forward portion 101 of the moving apparatus 100 rotates in the clockwise direction toward the bottom 310 and moves downward, until the moving apparatus 100 completely submerges below the liquid surface 200. Subsequently, as illustrated in FIG. 19D, the first injection port 113 may continue to discharge gas underwater, which further decreases the buoyancy force applied on the buoyancy cavity 111, thereby causing a difference between the gravity of the forward portion 101 of the moving apparatus 100 and the gravity of the rearward portion 102 of the moving apparatus 100 to be smaller and smaller. During a process of the moving apparatus 100 moving downward, the moving apparatus 100 rotates slightly to regulate the posture, which enables a difference between the forward portion 101 of the moving apparatus 100 and the rearward portion 102 of the moving apparatus 100 along the height direction of the side wall 320 to decrease. As illustrated in FIG. 19D, the forward portion 101 of the moving apparatus 100 rotates downward in the counter-clockwise direction and the rearward portion 102 of the moving apparatus 100 slightly rotates upward in the counter-clockwise direction. During the entire process of the moving apparatus 100 moving downward, the gas in the buoyancy cavity 113 is continuously discharged through the first injection port 113, liquid is continuously injected into the buoyancy cavity 111 through the discharging port 119, and an included angle remains between the overall direction 106 of the moving apparatus 100 and the liquid surface 200, i.e., the moving apparatus 100 is in the tilting state. As illustrated in FIG. 19E, the forward portion 101 of the moving apparatus 100 is above the rearward portion 102 of the moving apparatus 100 until the moving mechanism located at the rearward portion 102 of the moving apparatus 100 abuts against or touches the bottom 310. The forward portion 101 of the moving apparatus 100 is driven by the gravity of the moving apparatus 100 to rotate downward until the forward portion 101 of the moving apparatus 100 touches or abuts against the bottom 310. As illustrated in FIG. 19F, the moving apparatus 100 is in the substantially horizontal state, or the overall direction 106 of the moving apparatus 100 is substantially parallel to the liquid surface 200, or the overall direction 106 of the moving apparatus 100 abuts against or touches the bottom 310, thereby realizing the switching of the moving apparatus 100 from the third motion state directly to the first motion state. During a process of the moving apparatus 100 switching from the third motion state directly to the first motion state, a driving force applied on the moving apparatus 100 is mainly generated through an action of the first regulating member 112 and the main pump 118 may remain being turned on. In this case, the third driving force has a partial force in the vertical direction, which may further assist the moving apparatus 100 to move downward more quickly to switch to the first motion state. Alternatively, the main pump 118 may not be turned on and in this case, the moving apparatus 100 mainly relies on the action of the first regulating member 112 to move downward.

As illustrated in FIG. 19C, when the moving apparatus 100 completely submerges underwater, the first injection port 113 may alternatively not discharge gas. In this case, during a process of the moving apparatus 100 moving downward underwater, the tilting state of the moving apparatus 100 remains substantially the same until the moving mechanism located at the rearward portion 102 of the moving apparatus 100 abuts against or touches the bottom 310. The forward portion 101 of the moving apparatus 100 is driven by the gravity of the moving apparatus 100 to rotate toward the bottom 310, until the forward portion 101 of the moving apparatus 100 touches or abuts against the bottom 310 and the moving apparatus 100 is in the substantially horizontal state. In this way, the moving apparatus 100 finishes switching from the third motion state directly to the first motion state. However, in a case that the main pump 118 remains being turned on during the process of the moving apparatus 100 moving downward, the third driving force generated by the main pump 118 may also enable the posture of the moving apparatus 100 to be slightly regulated, but in general, the moving apparatus 100 still moves downward in the tilting state that the forward portion 101 of the moving apparatus 100 is tilted upward and the rearward portion 102 of the moving apparatus 100 is tilted downward. The moving apparatus 100 may further be switched from below to above the liquid surface 200. As illustrated in FIG. 20A, the moving apparatus 100 is in the substantially horizontal state underwater. In a case that the moving apparatus 100 needs to be switched from below to above the liquid surface 200, as illustrated in FIG. 20B, the first regulating member 112 is configured to regulate the gas in the buoyancy cavity 111 to be discharged through the first injection port 113, and then liquid is injected into the buoyancy cavity 111 through the discharging port 119 of the buoyancy cavity 111, thereby enabling the moving apparatus 100 to rotate. The rearward portion 102 of the moving apparatus 100 moves downward earlier than the forward portion 101 of the moving apparatus 100, which regulates the posture of the moving apparatus 100 to be the tilting state. As illustrated in FIG. 20C, the moving apparatus 100 moves under the tilting state until the forward portion 101 of the moving apparatus 100 touches or abuts against the side wall 320. Alternatively, in a case that the moving apparatus 100 is in the tilting state at first underwater, as illustrated in FIG. 20C, the moving apparatus 100 moves under the tilting state until the forward portion 101 of the moving apparatus 100 touches or abuts against the side wall 320. Then, as illustrated in FIG. 20D, the moving apparatus 100 is moving onto the side wall 320 until the moving apparatus 100 is substantially parallel to the side wall 320, i.e., the moving apparatus 100 is in the second motion state. Afterwards, the moving apparatus 100 is switched from the second motion state to the third motion state in the same way as the aforementioned embodiments. As illustrated in FIG. 16E, the moving apparatus 100 is moving along the side wall 320 toward the liquid line 201 until the forward portion 101 of the moving apparatus 100 is exposed above the liquid surface 200, which enables the first injection port 113 located at the forward portion 101 of the moving apparatus 100 to be at least partially exposed above the liquid surface 200. As illustrated in FIG. 16F, the moving apparatus 100 rotates from the side wall 320 to the liquid surface 200, which realizes the position-and-posture switching of the moving apparatus 100 from the second motion state to the third motion state. In this way, the moving apparatus 100 is in the substantially horizontal state, the moving apparatus 100 finishes switching from below to above the liquid surface 200. As illustrated in FIG. 20D, after the moving apparatus 100 is switched to the second motion state, the moving apparatus 100 may be switched from underwater to the bottom 310 in the same way as the aforementioned embodiments. As illustrated in FIG. 17D, the moving apparatus 100 first moves downward until the rearward portion 102 of the moving apparatus 100 abuts against or touches the bottom 310. Then, as illustrated in FIG. 17E, the moving apparatus 100 rotates until the moving apparatus 100 is substantially parallel to the bottom 310, thereby finishing the position-and-posture switching of the moving apparatus 100 from the second motion state to the first motion state underwater.

In a case that the moving apparatus 100 is underwater, the moving apparatus 100 may be switched to the bottom 310 without through the second motion state. As illustrated in FIG. 21A, in a case that the moving apparatus 100 is in the substantially horizontal state at first, the first regulating member 112 is configured to regulate the gas in the buoyancy cavity 111 to be discharged through the first injection port 113, and then liquid is injected into the buoyancy cavity 111 through the discharging port 119 of the buoyancy cavity 111, thereby enabling the moving apparatus 100 to rotate. The rearward portion 102 of the moving apparatus 100 moves downward earlier than the forward portion 101 of the moving apparatus 100, which regulates the posture of the moving apparatus 100 to be the tilting state. Alternatively, as illustrated in FIG. 21B, in a case that the moving apparatus 100 is in the tilting state at first underwater, the moving apparatus 100 may be switched from underwater to the bottom 310 in the same way as the aforementioned embodiments. As illustrated in FIG. 19D and FIG. 19E, the moving apparatus 100 remains the tilting state while moving downward until the moving mechanism located at the rearward portion 102 of the moving apparatus 100 abuts against or touches the bottom 310 first. Then, the forward portion 101 of the moving apparatus 100 rotates toward the bottom 310, until the forward portion 101 of the moving apparatus 100 abuts against or touches the bottom 310 and the moving apparatus 100 is in the substantially horizontal direction, thereby finishing switching the moving apparatus 100 from underwater to the bottom 310.

In a case that the moving apparatus 100 is moving underwater or moving on or above the liquid surface 200, the moving mechanism of the moving apparatus 100 does not contact either the bottom 310 or the side wall 320. In this case, a driving force for the moving apparatus 100 to move underwater or to move above or on the liquid surface 200 mainly is generated by a second propeller 116 (please refer to the content below) and the moving mechanism may not in operation. However, to avoid an obstacle in front or behind the moving apparatus 100, the moving mechanism may be in operation. In this way, when the moving apparatus 100 encounters the obstacle, the moving mechanism is configured to help the moving apparatus 100 bypass the obstacle. For example, when the obstacle is a step, the moving mechanism may move onto the step to enable the moving apparatus 100 to avoid the step or climb over the step. Afterward, the moving apparatus 100 may continue moving underwater or moving above or on the liquid surface 200 due to the driving force generated by the second propeller 116. Thus, in a case that the moving apparatus 100 performs the liquid surface cleaning, even when the moving mechanism is floating underwater or floating on or above the liquid surface 200, the moving mechanism may still operate to perform an obstacle avoidance. In a case that the moving apparatus 100 abuts against or touches the bottom 310 or the side wall 320, even when the moving apparatus 100 is performing the liquid surface cleaning or is moving, the driving force is still provided by the moving mechanism to allow the moving apparatus 100 to move forward or backward. For example, in a case that the depth of liquid in the pool is small and the moving apparatus 100 is performing the liquid surface cleaning, the moving mechanism may remain abutting against or touching a bottom of the pool. In this case, the driving force for the moving apparatus 100 to perform the liquid surface cleaning comes primarily from the moving mechanism, rather than the second propeller 116.

In a case that the mode switching member 110 includes the buoyancy cavity 111, the first regulating member 112, and the at least one first injection port 113, the main pump 118 remains being turned on when the moving apparatus 100 performs the bottom cleaning, the side wall cleaning, and the liquid surface cleaning. During a process of the moving apparatus 100 rotating to switch between the second motion state and the third motion state, the main pump 118 remains being turned on to enable the forward portion 101 of the moving apparatus 100 to abut against or touch the side wall 320, thereby facilitating the rearward portion 102 of the moving apparatus 100 to rotate upward or rotate downward. During a process of the moving apparatus 100 rotating to switch between the first motion state and the second motion state, the main pump 118 may be temporarily turned off or may be not turned off. During a process of the moving apparatus 100 switching from the third motion state directly to the first motion state, the main pump 118 may either remain being turned on or be turned off. After the moving apparatus 100 finishes performing the cleaning task, the moving apparatus 100 may return to any liquid line and the main pump 118 is controlled to be turned off before the moving apparatus 100 is turned off or turned to a standby mode. The main pump 118 is turned off before the process of the moving apparatus 100 getting out of the liquid.

Figure 12:
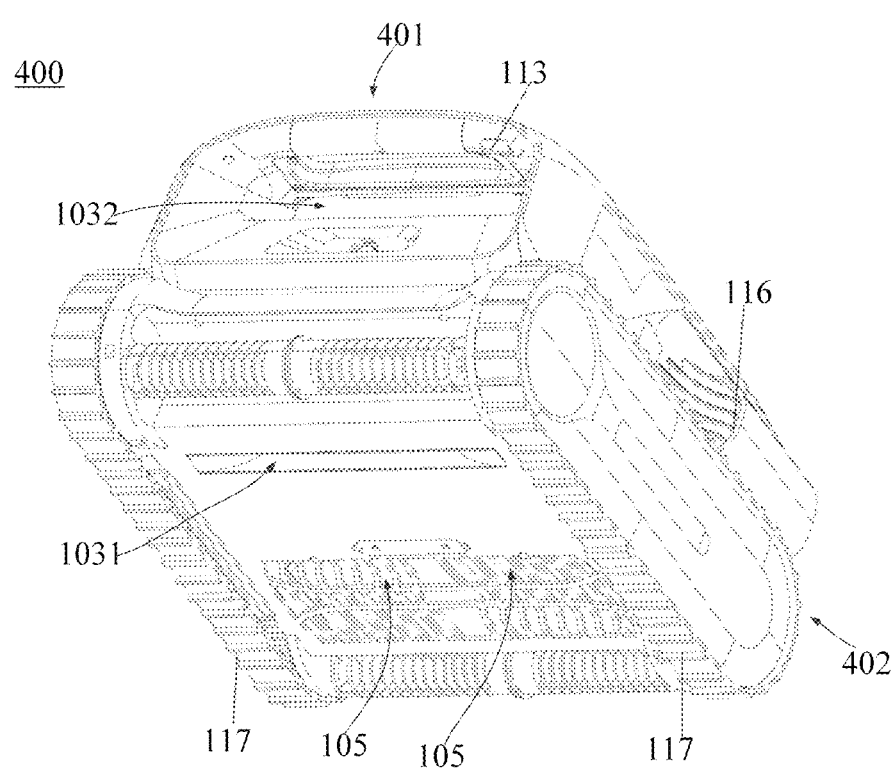
FIG. 12 is a schematic structural view of a cleaning device according to some embodiments of the present disclosure.
Figure 27A:
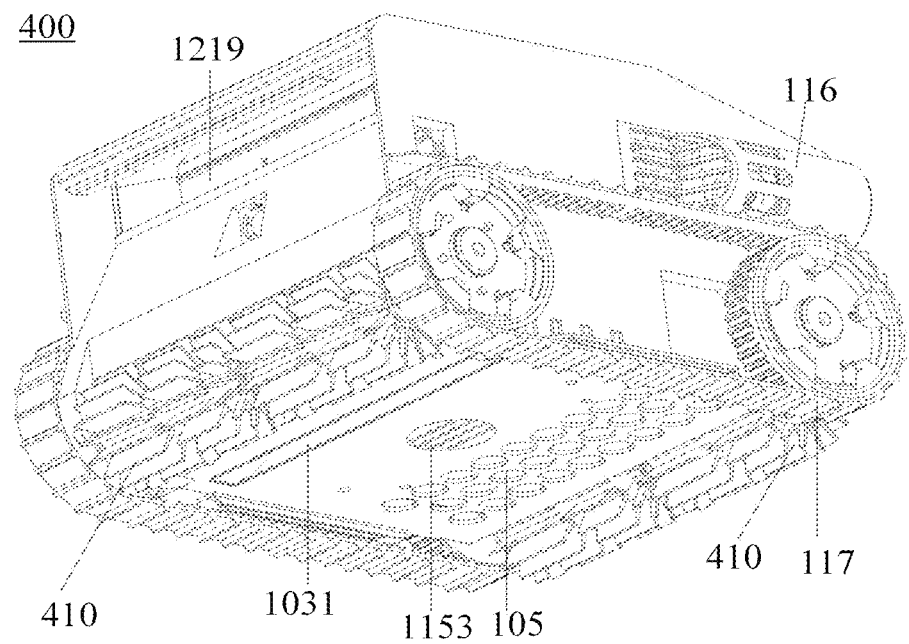
FIG. 27A is a schematic view of a cleaning device according to an embodiment of the present disclosure.

In one embodiment, as illustrated in FIG. 12 and FIG. 27A, at least one first fluid discharging port 105 is provided on the bottom of the cleaning device 400. The at least one first fluid discharging port 105 is connected to the discharging port 119 of the buoyancy cavity 111. After the liquid in the buoyancy cavity 111 is discharged from the buoyancy cavity 111 through the discharging port 119, the liquid first enters the interior of the cleaning device 400 and then exits the cleaning device 400 through the at least one first fluid discharging port 105 located on the bottom of the cleaning device 400. The at least one first fluid discharging port 105 is further configured to discharge the liquid inside the cleaning device 400 when the cleaning device 400 is taken out of liquid from the liquid surface 200 or below the liquid. For example, as illustrated in FIG. 12, more than one first fluid discharging port 105 is provided on the rearward portion 402 of the cleaning device 400 and is located behind the first intake 1031 for performing the bottom cleaning. Alternatively, the at least one first fluid discharging port 105 is provided on the forward portion 401 of the cleaning device 400 in front of the first intake 1031.

Figure 23A:
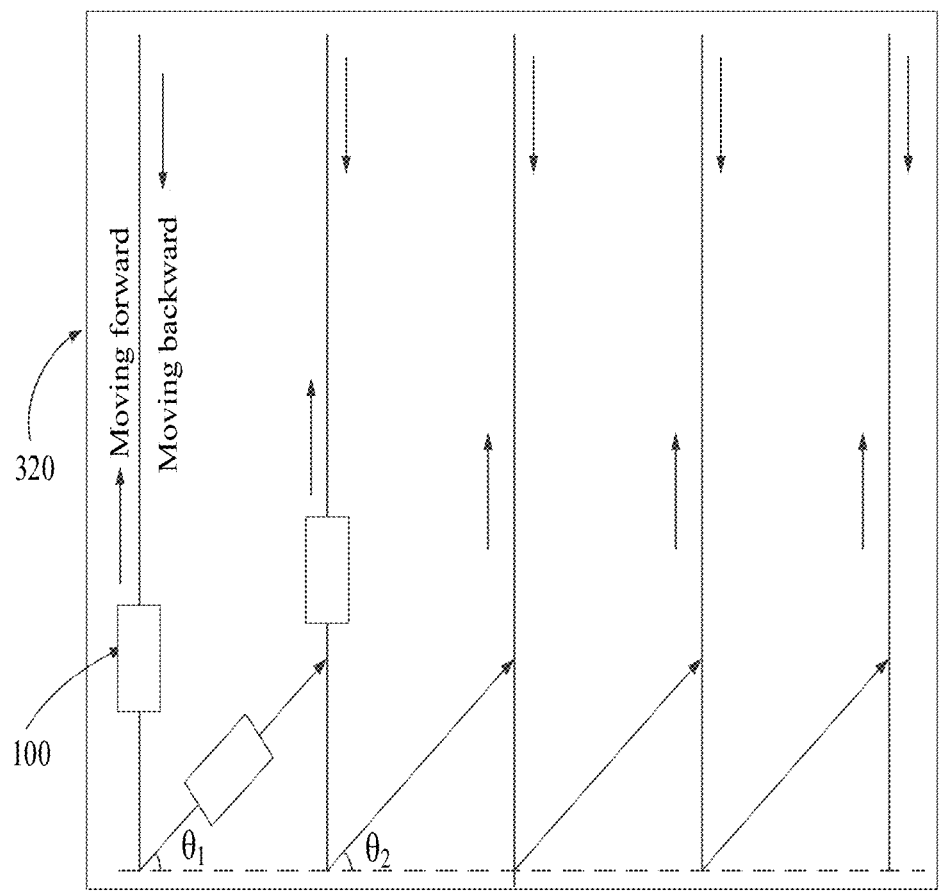
FIG. 23A is a schematic view of a cleaning path of a moving apparatus cleaning a side wall according to some embodiments of the present disclosure.

In one embodiment, the moving apparatus 100 may have multiple cleaning paths for cleaning the side wall 320. For example, after the moving apparatus 100 is switched from the first motion state to the second motion state, as illustrated in FIG. 23A, the moving apparatus 100 moves upward on the side wall 320 along a first path until the forward portion 101 of the moving apparatus 100 is close to or slightly above the liquid line, in order to clean an area which the first path is located on. Then, the moving apparatus 100 move backward along the first path until the rearward portion 102 of the moving apparatus 100 is adjacent to or close to the bottom 310. Then, the moving apparatus 100 move upward at an angle along a direction that diverges from the first path for a certain distance. For example, the moving apparatus 100 moves upward in a way that an included angle $\theta_1$ is formed between the overall direction 106 of the moving apparatus 100 and the liquid surface 200 and the posture of the moving apparatus 100 is regulated to be substantially parallel to the side wall 320 and on a second path. Then, the moving apparatus 100 moves upward along the second path until the forward portion 101 of the moving apparatus 100 is close to or slightly above the liquid line, in order to clean an area which the second path is located on. Then, the moving apparatus 100 moves backward along the second path until the rearward portion 102 of the moving apparatus 100 is adjacent to or close to the bottom 310. Then, the moving apparatus 100 further move upwards at an angle along a direction that diverges from the second path for a certain distance. For example, the moving apparatus 100 moves upward in a way that an included angle $\theta_2$ is formed between the overall direction 106 of the moving apparatus 100 and the liquid surface 200 and the posture of the moving apparatus 100 is regulated to be substantially parallel to the side wall 320 on a third path. Then, the moving apparatus 100 moves upwards along the third path to perform the cleaning, and so on. In this way, the moving apparatus 100 is generally moving in a direction that resembles a reversed letter "N" to clean the side wall 320. For any adjacent two paths which the moving apparatus 100 moves along, when the moving apparatus 100 moves upward at an angle along a direction that diverges from a previous path to a next path, the included angle $\theta_1$ and the included angle $\theta_2$ may be the same or may be different.

Figure 23B:
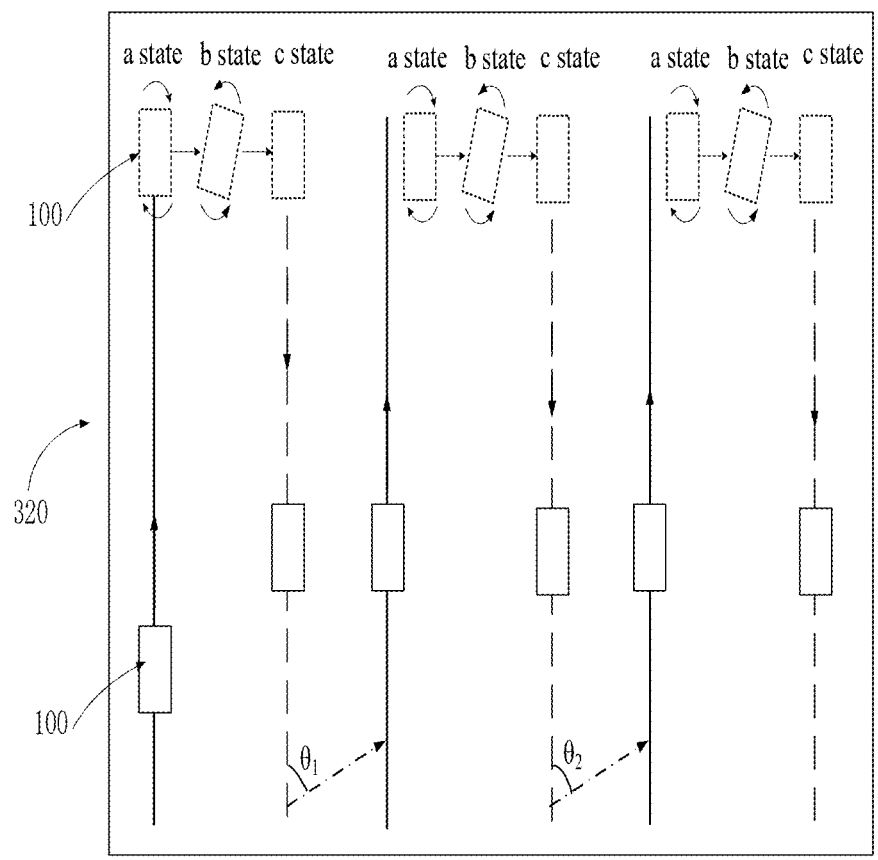
FIG. 23B is a schematic view of another cleaning path of a moving apparatus cleaning a side wall according to some embodiments of the present disclosure.

Alternatively, as illustrated in FIG. 23B, different from the embodiment illustrated in FIG. 23A: after the moving apparatus 100 finishes cleaning along the first path, the moving apparatus 100 may, instead of moving backward along the first path until being adjacent to or close to the bottom 310, wiggle to move away from the first path until the posture of the moving apparatus 100 is regulated to be parallel to the side wall 320. Then, the moving apparatus 100 further moves downward until the rearward portion 102 of the moving apparatus 100 is adjacent to or close to the bottom 310. As illustrated in FIG. 23B, after the moving apparatus 100 finishes cleaning the first path, the forward portion 101 of the moving apparatus 100 first wiggles in the clockwise direction, then wiggles in the counter-clockwise direction, so on and so forth, until the moving apparatus 100 is substantially parallel to the side wall 320 and far from the first path. Afterwards, the moving apparatus 100 further moves backward until the moving apparatus 100 is adjacent to or close to the bottom 310.

Figure 24:
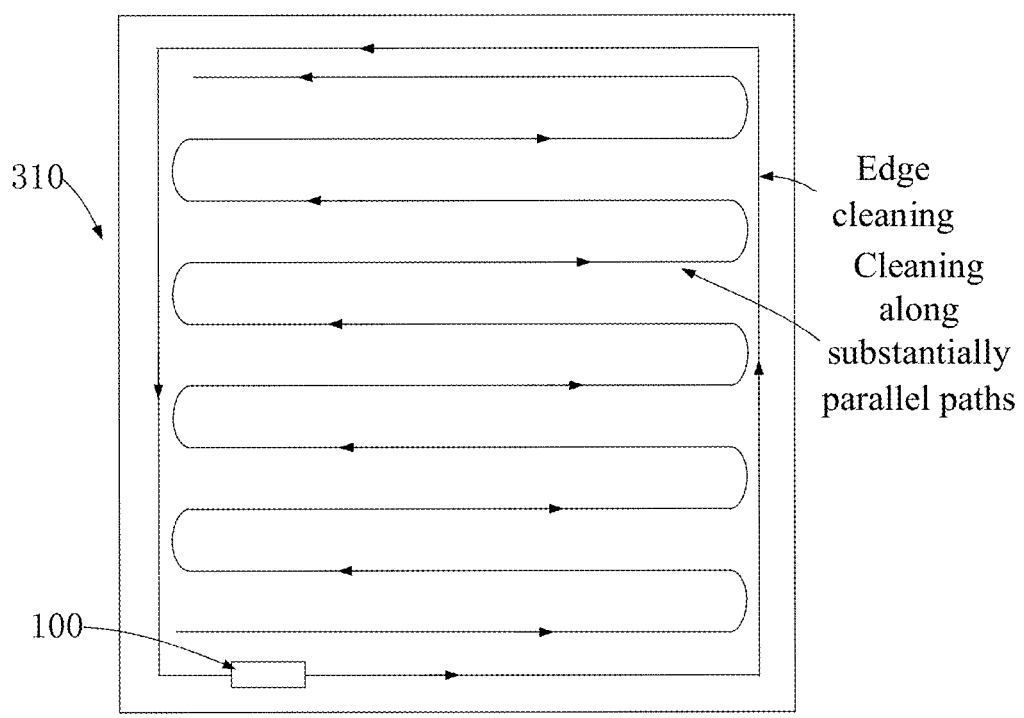
FIG. 24 is a schematic view of a cleaning path of a moving apparatus cleaning a bottom according to some embodiments of the present disclosure.

In one embodiment, the moving apparatus 100 may perform the bottom cleaning or the liquid surface cleaning along multiple cleaning paths. For example, as illustrated in FIG. 24, when the moving apparatus 100 is cleaning the bottom 310, the moving apparatus 100 may first perform an edge cleaning along edges of bottom 310, and then perform a cleaning along substantially parallel paths (i.e. the moving apparatus 100 first cleans along a fourth path towards the right, then take a turn to clean along a fifth path towards the left once the moving apparatus 100 reaches the edge of the bottom 310, so on and so forth, where the fourth path and the fifth path are substantially parallel); alternatively, the moving apparatus 100 may first perform the cleaning along substantially parallel paths and then perform the edge cleaning along the edges of the bottom 310 or perform cleaning an area at the edge of the pool. The moving apparatus 100 may perform the liquid surface cleaning along the same cleaning path as performing the bottom cleaning, which will not be repeated herein.

To be noted that, the volume of the buoyancy cavity 111 remains unchanged, that is, the buoyancy cavity 111 is made of a rigid material, including but not limited to, a glass, a ceramic, a phenolic plastic, a polyurethane plastic, an epoxy plastic, or an unsaturated polyester plastic, and etc. A structure of the buoyancy cavity 111 is not limited herein. For example, the buoyancy cavity 111 may have a single-layer structure or a two-layer structure that includes an inner layer and an outer layer. The inner layer may be made of a flexible material and is configured to accommodate liquid and/or gas. The outer layer is a rigid accommodating shell and is configured to provide protection and stability to the inner layer.

Figure 25A:
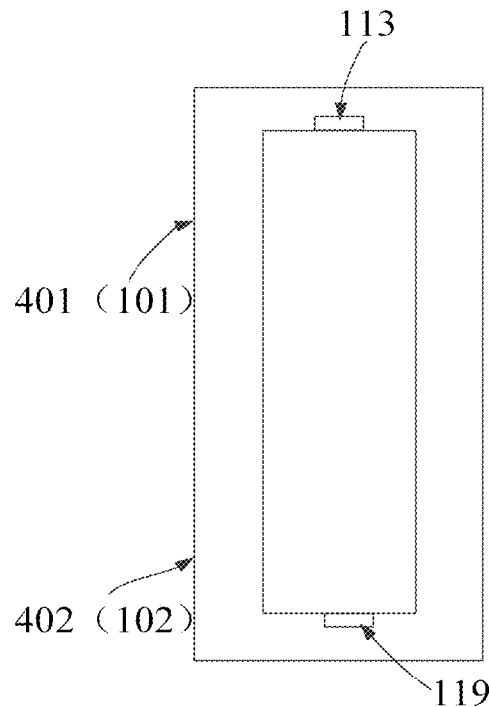
FIG. 25A is a schematic view of a moving apparatus according to an embodiment of the present disclosure.

In one embodiment, the buoyancy cavity 111 may be provided at the front of the moving apparatus 100, or the buoyancy cavity 111 may be provided at the back or middle, etc., of the moving apparatus 100, which is not limited herein. In one embodiment, the number of the buoyancy cavity 111 provided at the moving apparatus 100 may be one, two, three, or more, which is not limited herein. In one embodiment, the number of the buoyancy cavity 111 is one and the buoyancy cavity 111 is provided at the center of the moving apparatus 100, which maintains the stability of the moving apparatus 100 when the volume of gas or liquid in the buoyancy cavity 111 changes. Alternatively, as illustrated in FIG. 25A, the number of the buoyancy cavity 111 is one. A forward portion of the buoyancy cavity 111 is provided at the forward portion 101 of the moving apparatus 100 or the forward portion 401 of the cleaning device 400. A rearward portion of the buoyancy cavity 111 is provided at the rearward portion 102 of the moving apparatus 100 or the rearward portion 402 of the moving apparatus 400. The buoyancy cavity 111 includes the first injection port 113 and the discharging port 119. The first injection port 113 is configured to inject gas into the buoyancy cavity 111 or to discharge the gas in the buoyance cavity 111. The discharging port 119 is configured to discharge the liquid in the buoyancy cavity 111 or to inject liquid into the buoyancy cavity 111, which changes the volume of gas in the buoyancy cavity 111 and further changes the buoyancy force applied on the buoyancy cavity 111 or the moving apparatus 100, thereby enabling the moving apparatus 100 to move upward or downward.

In one embodiment, the number of the buoyancy cavity 111 is more than one. The more than one buoyancy cavity 111 may include at least two side buoyancy cavities provided at the different sides of the moving apparatus 100. The first regulating member 112 may be configured to respectively regulate the volume of gas/liquid in the at least two side buoyancy cavities, thereby regulating the buoyancy force applied on each side buoyancy cavity. The at least two side buoyancy cavities may or may not be connected to one another, which is not limited herein. The more than one buoyancy cavity 111 may be regulated independent of one another, which allows different buoyancy forces to be applied on different parts of the moving apparatus 100, thereby regulating the moving apparatus 100 to have various postures. For example, in response to the moving apparatus 100 climbing upward in the second motion state and reaching the liquid line 201, the first regulating member 112 regulates the volume of liquid or the volume of gas in the buoyancy cavity 111 at both sides of the moving apparatus 100, which enables different buoyancy forces to be applied on both sides of the moving apparatus 100, thereby allowing one side of the moving apparatus 100 to at least partially be exposed above the liquid surface 200 and the other side of the moving apparatus 100 to submerge below the liquid surface 200. In this way, through a cooperation among the moving mechanism and/or the pump, etc., the moving apparatus 100 may move horizontally along the liquid line 201 at the side wall 320.

In one embodiment, the at least two side buoyancy cavities are respectively provided at two opposite sides of the moving apparatus 100. The first regulating member 112 may be configured to regulates the volume of gas/liquid in the at least two side buoyancy cavities, which regulates a difference between forces applied on the at least two side buoyancy cavities in the vertical direction, thereby enabling the moving apparatus 100 to perform the position-and-posture switching from the second motion state to the third motion state. When the at least two side buoyancy cavities are provided at the both sides of the moving apparatus 100, the at least two side buoyancy cavities are provided substantially in symmetry on the both sides of the moving apparatus 100. A symmetrical arrangement may facilitate the stability of the moving apparatus 100 when the at least two side buoyancy cavities applies the buoyancy force on the moving apparatus and avoid the moving apparatus 100 from flipping over or deflecting on or below the liquid surface 200 due to the uneven buoyancy force applied on the moving apparatus 100.

In one embodiment, the number of the buoyancy cavity 111 is more than one. The more than one buoyancy cavity 111 includes at least two connected buoyancy cavities that are connected to one another. Each connected buoyancy cavity is connected to another connected buoyancy cavity through the first injection port 113 thereof. When the more than one connected buoyancy cavity is connected to one another, the first regulating member 112 may be arranged at the discharging port of the first one of the at least two connected buoyancy cavities or may be arranged at the discharging port of the last one of the at least two connected buoyancy cavities. When the more than one connected buoyancy cavity is not connected to one another, the liquid/gas in an inner chamber of the more than one connected buoyancy cavity is not connected to one another. Thus, the first regulating member 112 is provided at the discharging port of each connected buoyancy cavity to control the more than one connected buoyancy cavity respectively. The more than one connected buoyancy cavity may also be provided with one single first regulating member 112 to control the more than one connected buoyancy cavity synchronously.

Figure 25B:
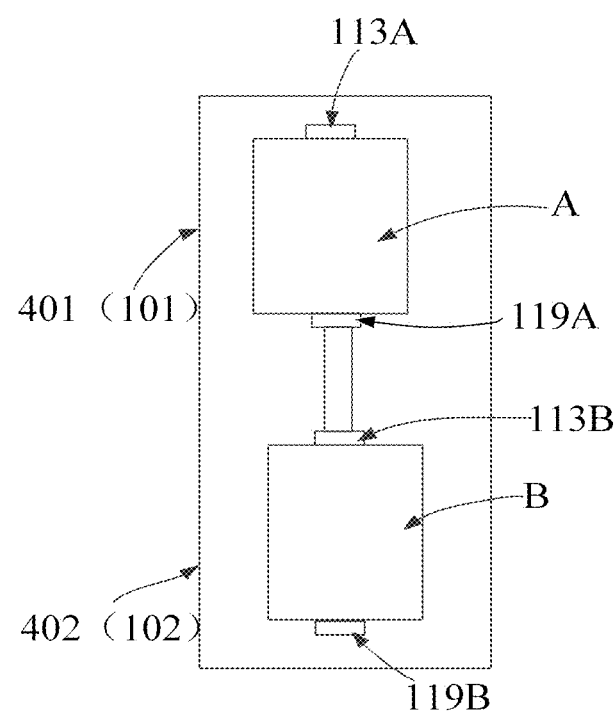
FIG. 25B is a schematic view of a moving apparatus according to another embodiment of the present disclosure.

For example, the more than one connected buoyancy cavities are connected to one another through the first injection port 113 and a second connection duct C thereon. For example, as illustrated in FIG. 25B, the buoyancy cavity 111 includes a first connected buoyancy cavity A and a second connected buoyancy cavity B. a first sub-injection port 113A and a first sub-discharging port 119A are provided at the first connected buoyancy cavity A, and a second sub-injection port 113B and a second sub-discharging port 119B are provided at the second connected buoyancy cavity B. The first connected buoyancy cavity A and the second connected buoyancy cavity B are connected with one another through the first sub-discharging port 119A and the second sub-injection port 113B. The first sub-discharging port 119A is connected to the second sub-injection port 113B through the second connection duct C. In response to liquid being injected into the second connected buoyancy cavity B through the second sub-discharging port 119B, the liquid further enters the first connected buoyancy cavity A through the second sub-injection port 113B, the second connection duct C, and the first sub-discharging port 119A in sequence.

In one embodiment, the first connected buoyancy cavity A is provided at the forward portion 101 of the moving apparatus 100 or the forward portion 401 of the cleaning device 400. The second connected buoyancy cavity B is provided at the rearward portion 102 of the moving apparatus 100 or the rearward portion 402 of the cleaning device 400. The first regulating member 112 is provided at the second connection duct C. As illustrated in FIG. 12, the second sub-discharging port 119B of the buoyancy cavity 111 is connected to the first fluid discharging port 105 provided on the bottom of the cleaning device 400, which enables the liquid in the buoyancy cavity 111 to be discharged outside of the cleaning device 400 through the second sub-discharging port 119B and the first fluid discharging port 105 in sequence. However, the liquid in the pool is injected into the buoyancy cavity 111 through the first fluid discharging port 105 and the second sub-discharging port 119B in sequence. Alternatively, a connection duct may be provided at the second sub-discharging port 119B, and the first regulating member 112 is provided at the connection duct and is not provided at the second connection duct C. The second sub-discharging port 119B of the buoyancy cavity 111 is connected to the first fluid discharging port 105 on the bottom of the cleaning device 400 through the first regulating member 112, which enables the liquid in the buoyancy cavity 111 to be discharged outside of the cleaning device 400 through the second sub-discharging port 119B, the first regulating member 112, and the first fluid discharging port 105 in sequence. However, the liquid in the pool is injected into the buoyancy cavity 111 through the first fluid discharging port 105, the first regulating member 112, and the second sub-discharging port 119B in sequence.

In the aforementioned embodiments, in a case that the moving apparatus 100 is in the second motion state or the first motion state, the first connected buoyancy cavity A and the second connected buoyancy cavity B are almost filled with liquid; alternatively, the second connected buoyancy cavity B is filled with liquid, most part of the first connected buoyancy cavity A is filled with liquid, and the rest of the first connected buoyancy cavity A is filled with gas. In a case that the moving apparatus 100 is in the third motion state, the first connected buoyancy cavity A and the second connected buoyancy cavity B are almost filled with gas; alternatively, the first connected buoyancy cavity A is filled with gas, most part of the second connected buoyancy cavity B is filled with gas, and the rest of the second connected buoyancy cavity B is filled with liquid. In a case that the moving apparatus 100 is switching from the second motion state to the third motion state, as illustrated in FIG. 16E, after the first sub-injection port 113A is at least partially exposed above the liquid surface 200, the first regulating member 112 is turned on. For example, in a case that the first regulating member 112 is a pump and an electric motor of the pump rotates in the positive direction, the external gas is injected into the first connected buoyancy cavity A through the first sub-injection port 113A, the liquid in the first connected buoyancy cavity A continuously flows into the second connected buoyancy cavity B and the liquid in the second connected buoyancy cavity B is continuously discharged outside of the buoyancy cavity 111 through the second sub-discharging port 119B. As the volume of gas in the first connected buoyancy cavity A continuously increases, the liquid in the first connected buoyancy cavity A is discharged earlier than the liquid in the second connected buoyancy cavity B. In other words, the first connected buoyancy cavity A is filled with gas earlier than the second connected buoyancy cavity B, which enables the buoyancy force applied on the first connected buoyancy cavity A to increase and further enables the buoyancy force applied on the forward portion 101 of the moving apparatus 100 or the forward portion 401 of the cleaning device 400 to increase. As illustrated in FIG. 16F, the moving apparatus 100 starts to rotate, the rearward portion 102 of the moving apparatus 100 rotates upward toward the liquid surface 200 until the moving apparatus 100 is switched to the third motion state. When the moving apparatus 100 is in the third motion state, the liquid in the second connected buoyancy cavity B may almost be discharged and the first connected buoyancy cavity A and the second connected buoyancy cavity B are filled with gas. In this case, the buoyancy force applied on the buoyancy cavity 111 is at maximum magnitude, which causes the buoyancy force applied on the moving apparatus 100 to be at maximum magnitude and further facilitates the moving apparatus 100 to remain in the third motion state. Alternatively, the first connected buoyancy cavity A is filled with gas, most part of the second connected buoyancy cavity B is filled with gas, and the rest of the second connected buoyancy cavity B is filled with liquid. In this case, the buoyancy force applied on the moving apparatus 100 due to the gas in the buoyancy cavity 111 may also enable the moving apparatus 100 or the cleaning device 400 to remain in the third motion state.

However, when the moving apparatus 100 needs to be switched from the third motion state to the second motion state, the first regulating member 112 is turned on. For example, in a case that the first regulating member 112 is a pump and an electrical motor of the pump rotates in the negative direction, the gas in the buoyancy cavity is discharged outside of the first connected buoyancy cavity A through the first sub-injection port 113A and liquid is injected into the second connected buoyancy cavity B through the second sub-discharging port 119B and the gas in the second connected buoyancy cavity B continuously flows into the first connected buoyancy cavity A, resulting in the gas in the second connected buoyancy cavity B to be discharged earlier than the gas in the first connected buoyancy cavity A. In other words, the second connected buoyancy cavity B is filled with liquid earlier than the first connected buoyancy cavity A. As the gas in the buoyancy cavity 111 is continuously discharged through the first sub-injection port 113A and the liquid is continuously injected into the buoyancy cavity 111 through the second sub-discharging port 119B, the gravity of the second connected buoyancy cavity B increases and the buoyancy force applied on the second connected buoyancy cavity B decreases, resulting in the gravity of the rearward portion 102 of the moving apparatus 100 or the rearward portion 402 of the cleaning device 400 to increase. As illustrated in FIG. 17B, the moving apparatus 100 starts to rotate, where the rearward portion 102 of the moving apparatus 100 moves downward earlier than the forward portion 101 of the moving apparatus 100, until the moving apparatus 100 switches to the second motion state. In a case that the moving apparatus 100 is in the second motion state, the first sub-injection port 113A continuously discharges the gas, which results in liquid to be continuously injected into the first connected buoyancy cavity A, thereby further increasing the gravity of the moving apparatus 100 to facilitate the moving apparatus 100 continuing to move downward. The moving apparatus 100 is driven by the moving mechanism to finish switching from the second motion state to the first motion state. In a case that the moving apparatus 100 is in the first motion state, the gas in the first connected buoyancy cavity A may be discharged and the first connected buoyancy cavity A and the second connected buoyancy cavity B are filled with liquid. In this case, the gravity of the moving apparatus 100 is at maximum magnitude, which enables the moving apparatus 100 to better abut against or touch the bottom 310. Alternatively, when the moving apparatus 100 is in the first motion state, the second connected buoyancy cavity B is filled with liquid, most part of the first connected buoyancy cavity A is filled with liquid, and the rest of the first connected buoyancy cavity A is filled with gas. In this case, the gravity of the moving apparatus 100 may also ensure the moving apparatus 100 to abut against or touch the bottom 310. Alternatively, the moving apparatus 100 may switch from the third motion state directly to the first motion state. In this case, after the first regulating member 112 is turned on, the gas in the second connected buoyancy cavity B is discharged earlier than the gas in the first connected buoyancy cavity A, and the second connected buoyancy cavity B is filled with liquid earlier than the first connected buoyancy cavity A, thereby enabling the moving apparatus 100 to rotate. As illustrated in FIG. 19B, the rearward portion 102 of the moving apparatus 100 moves downward earlier than the forward portion 101 of the moving apparatus 100, which enables the moving apparatus 100 to rotate from the third motion state to the tilting state. The moving apparatus 100 then continues to move downward under the tilting state until a rearward portion of the moving mechanism of the moving apparatus 100 abuts against or touches the bottom 310. Afterwards, the forward portion 101 of the moving apparatus 100 rotates until the forward portion 101 of the moving apparatus 100 touches or abuts against the bottom 310, which enables the moving apparatus 100 to finish being switched from the third motion state to the first motion state.

In some embodiments, when the buoyancy cavity is flexible, the volume of the buoyancy cavity varies with the volume of the gas in the buoyancy cavity. When the swimming pool robot is in the first motion state, the buoyancy cavity is in the empty or deflated state. When the swimming pool robot is in the third motion state, the buoyancy cavity is in an inflated state. When the swimming pool robot is in the second motion state, and the first injection port is located below the liquid surface, the buoyancy cavity is in the empty or deflated state. However, when the first injection port is at least partially exposed above the liquid surface, and the first regulating member drives external gas to enter the buoyancy cavity, the volume of the buoyancy cavity continuously increases as the volume of the gas in the buoyancy cavity increases, enabling the buoyancy cavity to be switched from the empty or deflated state to the inflated state. After the swimming pool robot is switched from the second motion state to the third motion state, the buoyancy cavity is in the inflated state, so that a buoyancy force applied to the swimming pool robot is greater than gravity of the swimming pool robot, enabling the swimming pool robot to float on the liquid surface. Specifically, when the buoyancy cavity is flexible, the first regulating member may be an air pump for driving the gas to enter the buoyancy cavity through the first injection port. Under an action of the air pump, the gas in the buoyancy cavity may be further discharged from the buoyancy cavity through the first injection port, enabling the buoyancy cavity to be switched from the inflated state to the empty or deflated state.

In some other embodiments, when the buoyancy cavity is rigid, the volume of the buoyancy cavity does not vary with the volume of the gas in the buoyancy cavity. The swimming pool robot further includes the discharging port. The first injection port is configured for the external gas to enter the buoyancy cavity and the gas in the buoyancy cavity to be discharged from the buoyancy cavity. The discharging port is configured for liquid to enter the buoyancy cavity and liquid in the buoyancy cavity to be discharged from the buoyancy cavity. When the swimming pool robot is in the first motion state, the buoyancy cavity is almost entirely filled with liquid or mostly filled with liquid and filled with a small amount of gas. When the swimming pool robot is in the third motion state, the buoyancy cavity is almost entirely filled with gas or mostly filled with gas and filled with a small amount of liquid. When the swimming pool robot is in the second motion state, and the first injection port is located below the liquid surface, the buoyancy cavity is almost entirely filled with liquid or mostly filled with liquid and filled with a small amount of gas. However, when the first injection port is at least partially exposed above the liquid surface, and under the action of the first regulating member, the external gas enters the buoyancy cavity through the first injection port, because the volume of the buoyancy cavity remains unchanged, the liquid in the buoyancy cavity is discharged from the buoyancy cavity through the discharging port as the gas continuously enters the buoyancy cavity, to increase the volume of the gas in the buoyancy cavity and reduce the volume of the liquid in the buoyancy cavity. In this way, the weight of the buoyancy cavity is reduced, and the buoyancy force applied to the swimming pool robot is greater than the gravity of the swimming pool robot, enabling the swimming pool robot to rotate from the second motion state to the third motion state.

Specifically, the first regulating member drives the external gas to enter the buoyancy cavity, to increase the volume of the gas in the buoyancy cavity, so that the liquid in the buoyancy cavity is forced to be discharged from the buoyancy cavity through the discharging port, or the first regulating member drives the liquid to be discharged from the buoyancy cavity through the discharging port, to reduce the volume of the liquid in the buoyancy cavity, so that the external gas is sucked into the buoyancy cavity, to increase the volume of the gas in the buoyancy cavity. In other words, when the swimming pool robot is in the second motion state, and the first injection port is at least partially exposed above the liquid surface, the first regulating member may drive gas and/or liquid to increase the volume of the gas in the buoyancy cavity. A final objective is to discharge the liquid from the buoyancy cavity and allow the external gas to enter the buoyancy cavity. For example, the first regulating member may be an air pump configured to drive gas, or the first regulating member may be a water pump configured to drive liquid.

In addition, under the action of the first regulating member, the gas in the buoyancy cavity is discharged from the buoyancy cavity through the first injection port to reduce the volume of the gas in the buoyancy cavity, and the liquid in the swimming pool enters the buoyancy cavity through the discharging port to increase the volume of the liquid in the buoyancy cavity, so that gravity of the buoyancy cavity is increased, enabling the gravity of the swimming pool robot to be greater than the buoyancy force applied to the swimming pool robot. In this way, the swimming pool robot is switched from the third motion state to the second motion state or directly to the first motion state.

After the swimming pool robot is switched from the second motion state to the third motion state, there is an appropriate amount of gas in the buoyancy cavity, enabling the buoyancy force applied to the swimming pool robot to be greater than the gravity of the swimming pool robot, so that the swimming pool robot can stably float on the liquid surface. In this case, the first regulating member may be turned off, so that the gas is not sucked into the buoyancy cavity to maintain the current amount of gas in the buoyancy cavity.

For example, when the swimming pool robot is in the second motion state, if the first injection port is at least partially exposed above the liquid surface or near the water line, a processor controls the first regulating member to be turned on. Under the action of the first regulating member, the external gas enters the buoyancy cavity to increase the volume of the gas in the buoyancy cavity until the swimming pool robot is switched from the second motion state to the third motion state. When the swimming pool robot is switched from the second motion state to the third motion state, the first regulating member is turned off. In this process, theoretical operation duration from turning-on to turning-off of the first regulating member is m minutes. However, to ensure that the swimming pool robot can stably float on or move on the liquid surface after the swimming pool robot is switched from the second motion state to the third motion state, preset operation duration from turning-on to turning-off of the first regulating member is n minutes during actual use of the swimming pool robot. The preset operation duration of the first regulating member is greater than the theoretical operation duration of the first regulating member. In other words, when the swimming pool robot is switched from the second motion state to the third motion state, the first regulating member is not turned off immediately but continues to operate, so that the external gas can continue to enter the buoyancy cavity. In a case where actual operation duration of the first regulating member reaches the preset operation duration, the processor controls the first regulating member to be turned off, to ensure that after the swimming pool robot is switched from the second motion state to the third motion state, there is an appropriate amount of gas in the buoyancy cavity, so that the swimming pool robot can stably move on, stay at, or float on the liquid surface.

Specifically, in a process of switching the swimming pool robot from the second motion state to the third motion state, the forward portion of the swimming pool robot touches or abuts against the side wall of the swimming pool, and the rearward portion of the swimming pool robot rotates toward the liquid surface. In this process, the second propeller and/or the main pump of a drive mechanism remains in operation. When the swimming pool robot is switched to the third motion state, the forward portion of the swimming pool robot still touches or abuts against the side wall of the swimming pool under an action of the second propeller. In this case, both the first regulating member and the second propeller continue to operate without being turned off, and the forward portion of the swimming pool robot keeps touching or abutting against the side wall of the swimming pool until the actual operation duration of the first regulating member reaches the preset operation duration. In a case where the actual operation duration of the first regulating member reaches the preset operation duration, the first regulating member is turned off. Before the first regulating member is turned off, the forward portion of the swimming pool robot keeps touching or abutting against the side wall of the swimming pool, and a posture of the swimming pool robot may be finely adjusted to ensure that the swimming pool robot can stably stay at or float at the water line. Under an action of the main pump of the drive mechanism, the liquid in the swimming pool enters the dust box through the first intake or the second intake and is filtered, and the filtered liquid passes through the main pump and is finally discharged from the swimming pool robot through a first fluid outlet (mentioned below). In the process of switching the swimming pool robot from the second motion state to the third motion state, the main pump remains in operation. When the swimming pool robot is switched to the third motion state, the main pump continues to operate. If the first fluid outlet tilts backward in the vertical direction, the liquid sprayed through the first fluid outlet applies a driving force to the swimming pool robot. A direction of the driving force is opposite to a direction in which the liquid is sprayed through the first fluid outlet, and the driving force has a component in the horizontal direction. The swimming pool robot can move forward under an action of the component, so that the forward portion of the swimming pool robot touches or abuts against the side wall of the swimming pool.

For another example, in another embodiment, in the process of switching the swimming pool robot from the second motion state to the third motion state, the preset operation duration of the first regulating member is equal to the theoretical operation duration. In other words, when the swimming pool robot is switched from the second motion state to the third motion state, the first regulating member is turned off.

Alternatively, in another embodiment, the swimming pool robot is provided with an inertial measurement unit (IMU). When the first injection port is at least partially exposed above the liquid surface, the first regulating member is turned on. If the inertial measurement unit detects that an angle between the overall direction of the swimming pool robot and the horizontal plane is less than a preset angle, it indicates that the swimming pool robot is in the substantially horizontal state. In this case, the processor controls, based on a detection result of the inertial measurement unit, the first regulating member to be turned off. Alternatively, when the first regulating member has been on for the preset operation duration, and the inertial measurement unit detects that the angle between the overall direction of the swimming pool robot and the horizontal plane is less than the preset angle, the processor controls the first regulating member to be turned off, to ensure that the swimming pool robot can stably float on the liquid surface in the third motion state. The preset angle may be 30°, 20°, or 15°.

In some embodiments, after the swimming pool robot is switched from the second motion state to the third motion state, the swimming pool robot floats on the liquid surface and can perform liquid surface cleaning, and after the swimming pool robot completes liquid surface cleaning, the swimming pool robot completely leaves the swimming pool (that is, the swimming pool robot completely leaves liquid in the swimming pool) or gets out of the swimming pool, or the swimming pool robot floats on the liquid surface without performing liquid surface cleaning and directly completely leaves the liquid in the swimming pool or gets out of the swimming pool. A user may manually lift the swimming pool robot out of the swimming pool, so that the swimming pool robot can completely leave the liquid in the swimming pool, or the swimming pool robot may automatically climb out of the swimming pool with the help of a bearing plate mounted on a side of the swimming pool, to automatically leave the swimming pool. In other words, the swimming pool robot finishes leaving the liquid or getting out of the swimming pool in the third motion state.

In some embodiments, the swimming pool robot finishes leaving the liquid or getting out of the swimming pool in the third motion state. If the buoyancy cavity is flexible, after the swimming pool robot completely leaves the liquid or gets out of the swimming pool, under the action of the first regulating member, the gas in the buoyancy cavity is discharged from the buoyancy cavity through the first injection port, enabling the buoyancy cavity to be in the empty or deflated state. Then, if the swimming pool robot needs to clean the liquid surface again, the swimming pool robot is placed into the swimming pool. Because the buoyancy cavity is in the empty or deflated state, the swimming pool robot cannot float on the liquid surface and therefore cannot directly perform liquid surface cleaning. Under an action of gravity of the swimming pool robot, the swimming pool robot first directly moves downward from the liquid surface to the bottom of the swimming pool, then is switched from the first motion state to the second motion state, and finally is switched from the second motion state to the third motion state before the swimming pool robot can clean the liquid surface. In other words, when the swimming pool robot does not enter the liquid, the swimming pool robot is in the first motion state, or the swimming pool robot is in the second motion state and the first injection port is located below the liquid surface, the buoyancy cavity is in the empty or deflated state; and when the swimming pool robot floats on or moves on the liquid surface, the buoyancy cavity contains an appropriate amount of gas and is in the inflated state.

In another embodiment, if the buoyancy cavity is flexible, after the swimming pool robot gets out of the swimming pool or leaves the liquid in the third motion state, the gas in the buoyancy cavity is not discharged temporarily, so that when the swimming pool robot subsequently enters the swimming pool (that is, enters the liquid) again, the swimming pool robot can directly float on the liquid surface and start liquid surface cleaning.

Alternatively, after the swimming pool robot gets out of the swimming pool, the gas in the buoyancy cavity is not discharged temporarily. Subsequently, if the user needs the swimming pool robot to clean the bottom of the swimming pool, the user places the swimming pool robot into the swimming pool. Because there is the gas in the buoyancy cavity, the swimming pool robot first floats on the liquid surface, and under the action of the first regulating member, the gas in the buoyancy cavity is discharged, to reduce the volume of the gas in the buoyancy cavity, so that the gravity of the swimming pool robot is greater than the buoyancy force generated by the gas in the buoyancy cavity, enabling the swimming pool robot to be directly switched from the third motion state to the first motion state. When the swimming pool robot is at the bottom of the swimming pool, the buoyancy cavity is in the empty or deflated state.

In another embodiment, if the buoyancy cavity is rigid, after the swimming pool robot gets out of the swimming pool or leaves the liquid in the third motion state, there is still liquid in the buoyancy cavity. In this case, the liquid in the buoyancy cavity is discharged under the action of the first regulating member (where the first regulating member is a pump that can drive gas or liquid), so that the buoyancy cavity is almost entirely filled with gas. This reduces the weight of the swimming pool robot. In this way, the user can conveniently carry the swimming pool robot on the side of the swimming pool. In other words, when the swimming pool robot is on the side of the swimming pool, the buoyancy cavity is almost entirely filled with the gas. In this case, if the swimming pool robot needs to enter the liquid from the side of the swimming pool, the user places the swimming pool robot into the swimming pool, and because the buoyancy cavity is almost entirely filled with the gas, the swimming pool robot floats on the liquid surface and can directly perform liquid surface cleaning, or if the swimming pool robot needs to clean the bottom of the swimming pool, after entering the liquid, the swimming pool robot first floats on the liquid surface and then under the action of the first regulating member, the gas in the buoyancy cavity is discharged and the liquid in the swimming pool enters the buoyancy cavity, to increase the weight of the buoyancy cavity, so that the gravity of the swimming pool robot is greater than the buoyancy force applied to the swimming pool robot, enabling the swimming pool robot to be directly switched from the third motion state to the first motion state.

In another embodiment, the swimming pool robot further includes a third sensor. The processor determines, based on a detection result of the third sensor, whether the swimming pool robot leaves the liquid completely or enters the liquid. The detection result may be represented as water pressure, a current, a distance, a difference between a receiving time and a sending time of a signal, or the like.

For example, the third sensor is a water pressure sensor configured to detect water pressure at a current position of the third sensor. The processor determines, based on a difference between the water pressure at the current position and atmospheric pressure of an environment in which the swimming pool is located, whether the swimming pool robot leaves the liquid completely or enters the liquid. In a case where the difference is greater than a preset value, it indicates that the swimming pool robot is on the liquid surface or in water, indicating that the swimming pool robot has entered the liquid or has not completely left the liquid. In a case where the difference is less than a preset value, it indicates that the swimming pool robot leaves the liquid in the swimming pool and is located in air, indicating that the swimming pool robot has left the liquid or has not entered the liquid.

For another example, the third sensor is a range sensor configured to detect a distance between the current position of the third sensor and the water line or the liquid surface. The processor determines, based on the distance, whether the swimming pool robot leaves the liquid completely or enters the liquid.

Alternatively, the third sensor is configured to detect whether the swimming pool robot leaves the liquid or enters the liquid. For example, the third sensor is a capacitive sensor and includes a first electrode and a second electrode. If both the first electrode and the second electrode are in water, the two electrodes are conductive through the liquid in the swimming pool, so that an electrical signal is generated, indicating that the swimming pool robot has not completely left the liquid or has already entered the liquid. If at least one of the first electrode and the second electrode is in air, the two electrodes cannot be conductive, and an electrical signal cannot be generated, indicating that the swimming pool robot has left the liquid or has not entered the liquid.

In the foregoing embodiment, if the buoyancy cavity is flexible, after the swimming pool robot leaves the liquid, the gas in the buoyancy cavity needs to be discharged. Specifically, when the third sensor detects that the swimming pool robot has completely left the liquid or the processor determines that the swimming pool robot has completely left the liquid, the processor controls the first regulating member to be turned on, so that the gas in the buoyancy cavity can be discharged. Similarly, if the buoyancy cavity is rigid, after the swimming pool robot leaves the liquid, the liquid in the buoyancy cavity needs to be discharged. Specifically, when the third sensor detects that the swimming pool robot has completely left the liquid or the processor determines that the swimming pool robot has completely left the liquid, the processor controls the first regulating member to be turned on, so that the liquid in the buoyancy cavity can be discharged.

Specifically, in some embodiments, the first injection port is connected to the first regulating member through a first duct, the first regulating member is connected to the buoyancy cavity through a second duct, and the first duct and/or the second duct are/is provided with a valve. Alternatively, in another embodiment, the first injection port is connected to the buoyancy cavity through the first duct, the buoyancy cavity is connected to the first regulating member through the second duct, and the first duct and/or the second duct are/is provided with a valve. When the third sensor detects that the swimming pool robot has completely left the liquid, or the processor determines that the swimming pool robot has completely left the liquid, the processor controls the valve and the first regulating member to be turned on. Under the action of the first regulating member, the gas in the flexible buoyancy cavity is discharged through the first injection port. When the first regulating member has operated for the preset operation duration, the gas in the buoyancy cavity has been completely discharged by default, and then the processor controls the valve and the first regulating member to be turned off. Alternatively, under the action of the first regulating member, the liquid in the rigid buoyancy cavity is discharged. When the first regulating member has operated for the preset operation duration, the liquid in the buoyancy cavity has been completely discharged by default, and then the processor controls the valve and the first regulating member to be turned off.

Alternatively, after the swimming pool robot has completely left the liquid, the gas in the buoyancy cavity is not discharged and remains in the buoyancy cavity. In a case where the user places the robot into the swimming pool again and needs the swimming pool robot to clean the bottom of the swimming pool, when the third sensor detects that the swimming pool robot has entered the liquid, or the processor determines that the swimming pool robot has entered the liquid, the processor controls the first regulating member and the valve to be turned on. Under the action of the first regulating member, the gas in the buoyancy cavity is discharged, enabling the swimming pool robot to be switched from the third motion state to the first motion state.

Alternatively, a first sensor or a second sensor (mentioned below) is further disposed on the swimming pool robot. In a case where the swimming pool robot is in the second motion state, when the processor determines, based on a detection result of the first sensor, that the first injection port is exposed above the liquid surface, the processor controls the valve and the first regulating member to be turned on for the external gas to enter the buoyancy cavity, to increase the volume of the gas in the buoyancy cavity, or when the second sensor detects that the first injection port is exposed above the liquid surface, the processor controls the valve and the first regulating member to be turned on for the external gas to enter the buoyancy cavity, to increase the volume of the gas in the buoyancy cavity, until the first regulating member operates for the preset operation duration or the inertial measurement unit detects that the swimming pool robot is in the substantially horizontal state, and then the processor controls the first regulating member and the valve to be turned off, so that there is an appropriate amount of gas in the buoyancy cavity to ensure that the swimming pool robot stably operates or floats on the liquid surface.

In addition, the first sensor and the third sensor may be a same sensor, or the second sensor and the third sensor may be a same sensor.

Figure 30A:
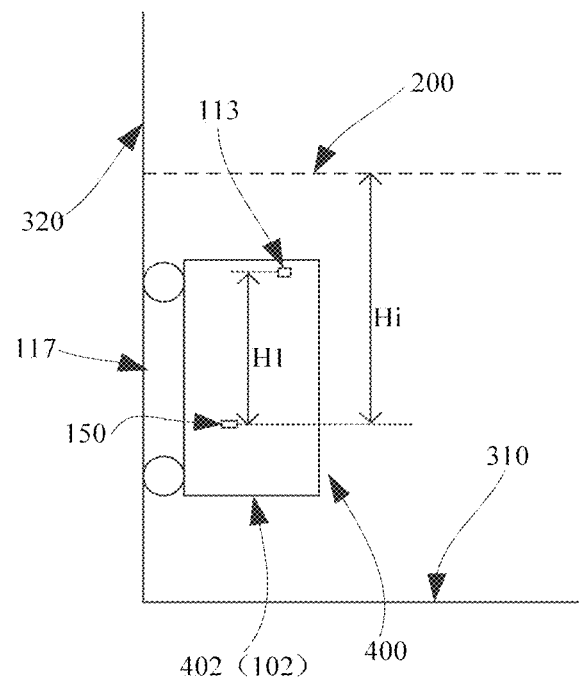
FIG. 30A is a schematic view of a state in which a cleaning device is located below a liquid surface in a second motion state according to an embodiment of the present disclosure.
Figure 30B:
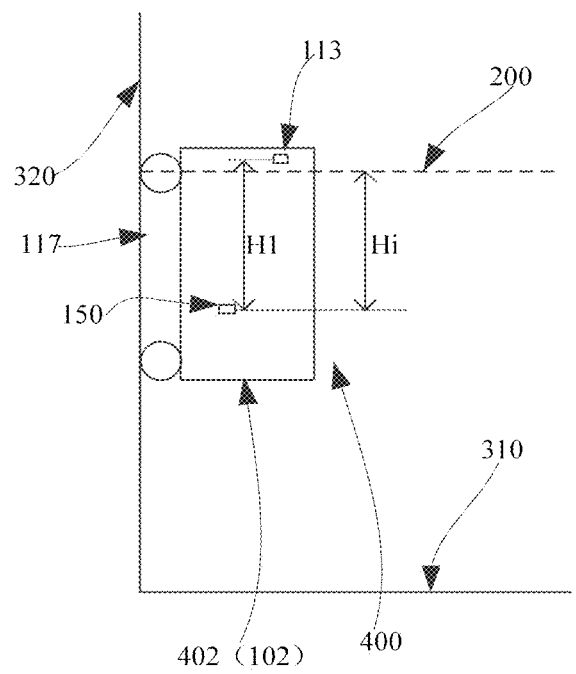
FIG. 30B is a schematic view of a state in which a cleaning device is in a second motion state and a first injection port is exposed above a liquid surface.

For example, the third sensor 150 is a water pressure sensor. In a case where a distance between the first injection port and the third sensor 150 in a forward direction of the swimming pool robot is a fixed value H1, when the swimming pool robot is underwater, water pressure detected by the third sensor 150 is P1. The processor obtains a distance Hi between a current position of the third sensor 150 and the liquid surface based on a difference between P1 and atmospheric pressure P0. If the swimming pool robot moves toward the liquid surface in the second motion state, the forward direction of the swimming pool robot (namely, the overall direction of the swimming pool robot) and a direction from the bottom of the swimming pool to the liquid surface (for example, a vertical direction) form an included angle θ. In a case where θ=0°, it indicates that the overall direction of the swimming pool robot is parallel to the vertical direction. As shown in FIG. 30A, if Hi>H1, it indicates that the first injection port is below the liquid surface. As shown in FIG. 30B, if Hi<H1, it indicates that the first injection port is above the liquid surface. Alternatively, θ is not equal to 0°, indicating that the overall direction of the swimming pool robot intersects with the vertical direction. In this case, the distance H1 needs to be converted into an actual distance H1 cos θ in the vertical direction. If Hi>H1 cos θ, it indicates that the first injection port is below the liquid surface. If Hi<H1 cos θ, it indicates that the first injection port is above the liquid surface. In other words, the third sensor 150 can be configured to detect whether the first injection port is above the liquid surface and whether the swimming pool robot leaves the liquid completely or enters the liquid.

Similarly, the third sensor is a range sensor configured to detect the distance Hi between the current position of the range sensor and the liquid surface. In a case where the distance between the first injection port and the third sensor in the forward direction of the swimming pool robot (namely, the overall direction of the swimming pool robot) is the fixed value H1, the processor determines, based on a difference between Hi and H1 cos θ, whether the first injection port is above the liquid surface, where θ may be 0° or another value. If Hi>H1 cos θ, it indicates that the first injection port is below the liquid surface. If Hi<H1 cos θ, it indicates that the first injection port is above the liquid surface.

Similarly, the third sensor may alternatively be other sensors, for example, an ultrasonic sensor or an optical sensor. The processor converts the detection result of the sensor into the distance Hi between the current position of the third sensor and the liquid surface. Then, the processor determines, based on a magnitude relationship between Hi and H1 cos θ, whether the first injection port is exposed above or located below the liquid surface.

The included angle θ formed between the forward direction of the swimming pool robot (namely, the overall direction of the swimming pool robot) and the vertical direction may be detected by an accelerometer and/or a gyroscope of the inertial measurement unit (IMU) disposed on the swimming pool robot. The inertial measurement unit detects an included angle α between the overall direction of the swimming pool robot and the horizontal plane, and θ=90°−α. In this way, θ can be obtained.

Alternatively, in another embodiment, the third sensor detects whether the first injection port is exposed above the liquid surface. Specifically, in the forward direction of the swimming pool robot, the third sensor and the first injection port are substantially located on a same plane of the swimming pool robot or at a same height. When the swimming pool robot is in the second motion state, the third sensor and the first injection port are substantially at the same height. When the third sensor detects that the third sensor is located above the liquid surface, it indicates that the first injection port is exposed above the liquid surface.

For example, the third sensor is an optical sensor. In a case where the swimming pool robot is below the liquid surface, the optical sensor sends a first signal and receives a feedback signal of the first signal, indicating that the third sensor is located below the liquid surface, that is, the first injection port is located below the liquid surface. In a case where the swimming pool robot moves toward the liquid surface in the second motion state, the third sensor is located above the liquid surface as the swimming pool robot continuously moves upward. In this case, the optical sensor sends the first signal but does not receive the feedback signal of the first signal, indicating that the third sensor is located above the liquid surface, that is, the first injection port is exposed above the liquid surface. The optical sensor may be also replaced with a capacitive sensor.

In another embodiment, the second sensor (or the first sensor) and the third sensor may be two independent sensors. For example, the third sensor may be a water pressure sensor, and the second sensor may be an optical sensor.

In some other embodiments, before the swimming pool robot enters the liquid, there is an appropriate amount of gas in the buoyancy cavity of the swimming pool robot. When the user places the swimming pool robot into the swimming pool, or the swimming pool robot automatically moves into the swimming pool with the help of the bearing plate on the side of the swimming pool, the swimming pool robot floats on the liquid surface under an action of the gas in the buoyancy cavity. In this case, the user may control the swimming pool robot to directly start to clean the liquid surface; the user may control the swimming pool robot to start to clean the bottom of the swimming pool, and the swimming pool robot is directly switched from the third motion state to the first motion state to clean the bottom of the swimming pool; or the user controls the swimming pool robot to clean the side wall of the swimming pool, and the swimming pool robot is directly switched from the third motion state to the second motion state to clean the side wall of the swimming pool, or the swimming pool robot is first switched from the third motion state to the first motion state and then is switched from the first motion state to the second motion state to clean the side wall of the swimming pool.

In other words, when the swimming pool robot having a liquid surface cleaning function is on the side of the swimming pool, there is an appropriate amount of gas in the buoyancy cavity. Therefore, after entering the liquid, the swimming pool robot can directly float on the liquid surface. In this case, the user may control a cleaning mode and switch cleaning modes of the swimming pool robot by using an electronic device (such as a mobile phone, a computer, or a tablet) or a remote control.

For example, the user directly switches the swimming pool robot from a liquid surface-floating mode or a liquid surface cleaning mode to a side wall cleaning mode or directly switches the swimming pool robot from the liquid surface-floating mode or the liquid surface cleaning mode to a bottom cleaning mode. For another example, the user suspends a current cleaning mode and switches the swimming pool robot from the current cleaning mode to another cleaning mode. In one embodiment, the current cleaning mode of the swimming pool robot is the liquid surface cleaning mode, and the another cleaning mode is the bottom cleaning mode or the side wall cleaning mode.

In some embodiments, the pool robot needs to be switched from the first motion state to the second motion state and then switched from the second motion state to the third motion state. In other words, in a process of returning from the bottom of the swimming pool to the liquid surface, the swimming pool robot does not clean the side wall of the swimming pool in the second motion state. When the swimming pool robot is switched from the first motion state to the second motion state, the second propeller is turned on to apply an upward thrust to the swimming pool robot, to assist the swimming pool robot in moving upward on the side wall of the swimming pool. The second propeller continuously operates in an entire process of switching the swimming pool robot from the second motion state to the third motion state. When the swimming pool robot is just in the third motion state, the forward portion of the swimming pool robot keeps touching or abutting against the side wall of the swimming pool under the action of the second propeller. If the swimming pool robot does not perform liquid surface cleaning, the second propeller continuously operates for preset duration (which is at least equal to or greater than the preset operation duration of the first regulating member) before being turned off, so that the user can conveniently retrieve the swimming pool robot from the side of the swimming pool before the second propeller is turned off. If the swimming pool robot needs to perform liquid surface cleaning, because one second propeller is disposed on each of a left side and a right side of the swimming pool robot, after the swimming pool robot can stably operate in the third motion state, the swimming pool robot can perform steering due to a speed difference between the two second propellers, enabling the swimming pool robot to be switched from a state in which the forward portion of the swimming pool robot touches or abuts against the side wall of the swimming pool to a state in which one side portion of the swimming pool robot is close to or abuts against the side wall of the swimming pool (namely, a state in which the swimming pool robot tends to move forward). Then, under driving of the two second propellers (which apply a forward thrust to the swimming pool robot), the swimming pool robot starts to clean an edge of the liquid surface along an edge of the swimming pool.

In another embodiment, in a case where the swimming pool robot is in the second motion state, if the second propeller is turned on, operating power of the second propeller is first power, and in a case where the swimming pool robot is in the third motion state, the operating power of the second propeller is second power. Usually, the first power is greater than the second power, so that the swimming pool robot can move on the side wall of the swimming pool. This prevents the swimming pool robot from falling off the side wall of the swimming pool. Similarly, in a case where the swimming pool robot cleans the bottom of the swimming pool, operating power of the main pump is first power; in a case where the swimming pool robot moves on the side wall of the swimming pool, the operating power of the main pump is second power; and in a case where the swimming pool robot cleans the liquid surface, the operating power of the main pump is third power. Usually, the second power is greater than the first power, and the second power is greater than the third power, to ensure that the swimming pool robot can move on the side wall of the swimming pool. Under an action of the third driving force generated by the main pump, the swimming pool robot can be tightly attached to the side wall of the swimming pool. This prevents the swimming pool robot from falling off the side wall of the swimming pool. For the first power and the third power, the first power is equal to the third power, the first power is less than the third power, or the first power is greater than the third power.

It should be noted that the first injection port is disposed at the forward portion of the swimming pool robot or the moving apparatus. When the swimming pool robot or the moving apparatus is in the second motion state, in the vertical direction, a portion of the swimming pool robot or the moving apparatus is close to the liquid surface, a portion of the swimming pool robot or the moving apparatus is away from the liquid surface, the portion close to the liquid surface is referred to as the forward portion, and the portion away from the liquid surface is referred to as the rearward portion; or when the swimming pool robot or the moving apparatus is in the second motion state, the forward portion of the swimming pool robot or the moving apparatus is higher than the rearward portion thereof in the vertical direction. In other words, when the swimming pool robot or the moving apparatus is in the second motion state, the swimming pool robot or the moving apparatus may move forward toward or move backward toward the liquid surface, so that the forward portion is earlier exposed above the liquid surface than the rearward portion, enabling the first injection port to be at least partially exposed above the liquid surface.

Figure 28:
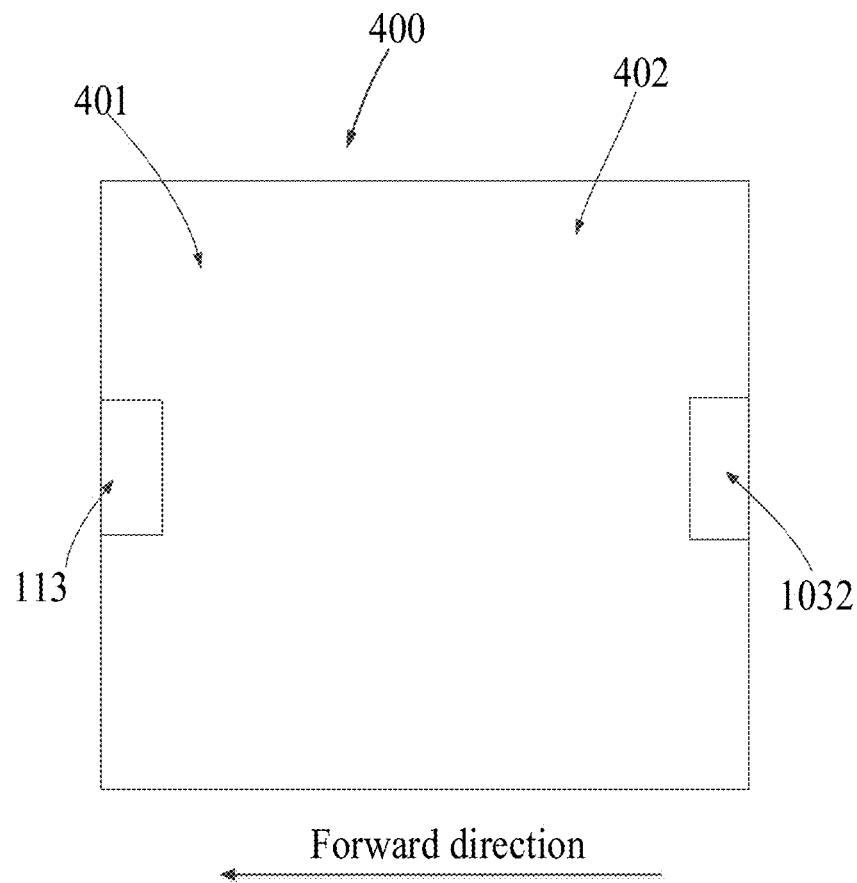
FIG. 28 is a schematic view of a cleaning device according to an embodiment of the present disclosure.

In one embodiment, as illustrated in FIG. 12, the second intake port (i.e., the second intake 1032) is provided at or on the forward portion 101 of the moving apparatus 100 or the forward portion 401 of the cleaning device 400. The at least one first injection port 113 is provided at or on the forward portion 101 of the moving apparatus 100 or the forward portion 401 of the cleaning device 400. When the moving apparatus 100 performs the bottom cleaning, the side wall cleaning, or the liquid surface cleaning, the moving apparatus 100 cleans the bottom 310, the side wall 320, or the liquid surface 200 in a forward direction. In another embodiment, as illustrated in FIG. 28, the second intake port is provided at or on the rearward portion 102 of the moving apparatus 100 or the rearward portion 402 of the cleaning device 400. The at least one first injection port 113 is provided at or on the forward portion 101 of the moving apparatus 100 or the forward portion 401 of the cleaning device 400. The moving apparatus 100 cleans the bottom 310 and the side wall 320 in the forward direction. However, in a case that the moving apparatus 100 cleans the liquid surface 200, since the second intake port is provided at or on the rearward portion 102 of the moving apparatus 100 or the rearward portion 402 of the cleaning device 400, the moving apparatus 100 moves backward on or above the liquid surface 200 (in a direction opposite to the forward direction mentioned above) so that garbage on the liquid surface 200 enters into the moving apparatus 100 along with liquid through the second intake port, thereby performing the liquid surface cleaning. In the two embodiments mentioned above, the moving apparatus 100 switches among the first motion state, the second motion state, and the third motion state in a similar way as the aforementioned embodiments, so more details can refer to the content above.

In one embodiment, at least one first docking assembly 403 is provided on or at the bottom of the cleaning device 400 or a side portion of the cleaning device 400. The side portion of the cleaning device 400 may include one or more of a front side, a back side, a left side, and a right side of the cleaning device 400. A base station (i.e., a supporting assembly) is provided on or at the side wall 320, the bottom 310, or an edge of the pool. The base station may at least include a supporting member 502 and at least one second docking assembly 501. The at least one second docking assembly 501 is provided on the supporting member 502. When the at least one first docking assembly 403 connects to the at least one second docking assembly 501, the cleaning device 400 returns to the base station and rests on the supporting member 502. When the at least one first docking assembly 403 and the at least one second docking assembly 501 disconnect, the cleaning device 400 may depart from the base station.

The cleaning device 400 or the moving apparatus 100 may need to return to the base station in the following cases, including but not limited to: a power of the cleaning device 400 or the moving apparatus 100 is less than a preset value and the cleaning device 400 or the moving apparatus 100 needs to be charged; or garbage in at least one dust box 121 of the cleaning device 400 needs to be discharged; or the at least one dust box 121 of the cleaning device 400 needs to be cleaned by the base station; or a cleaning member, e.g., a dust box roller brush assembly 1220 (please refer to content below), an underwater roller brush 410 (please refer to content below), a surface roller brush (please refer to content below), or a main roller brush (please refer to content below) and etc., needs to be cleaned or replaced by the base station; or after the cleaning device 400 finishes the cleaning task, the cleaning device 400 needs to be docked at the base station or landed, and etc. In cases that the cleaning device 400 or the moving apparatus 100 needs to return to the base station, the cleaning device 400 sends a returning signal to a control unit that is provided at the cleaning device 400 and/or the base station, then the control unit controls the moving apparatus 100 or the cleaning device 400 to return to the base station, thereby enabling the at least one first docking assembly 403 and the at least one second docking assembly 501 to be connected. After the cleaning device 400 returns to the base station, the base station may charge the cleaning device 400, gather the garbage discharged from the at least one dust box 121 therein, clean the at least one dust box 121 and the cleaning member, automatically replace the cleaning member, or perform other demands, etc.

In a case that the moving apparatus 100 needs to return to the base station while the moving apparatus 100 is not in the third motion state, the moving apparatus 100 has to switch to the third motion state from another motion state and the switching of the moving apparatus 100 can refer to the aforementioned embodiments. After the moving apparatus 100 is in the third motion state, a connection process between the at least one first docking assembly 403 of the moving apparatus 100 and the at least one second docking assembly 501 of the base station may be performed.

Figure 29A:
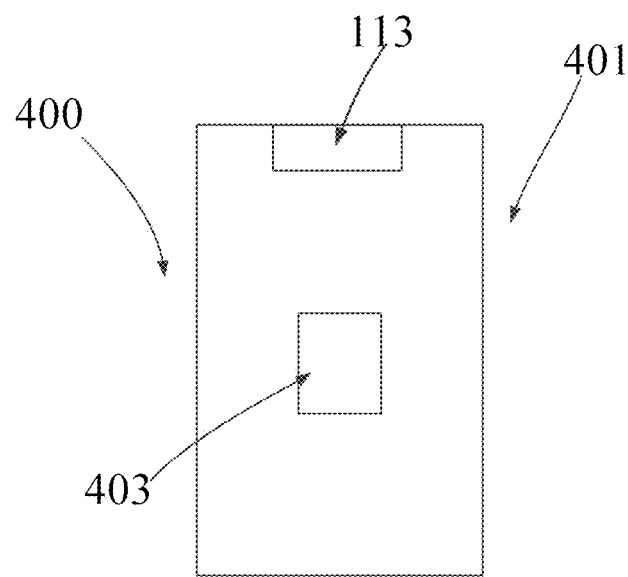
FIG. 29A is a front elevational view of a forward side surface of a forward portion of a cleaning device according to some embodiments of the present disclosure.
Figure 29B:
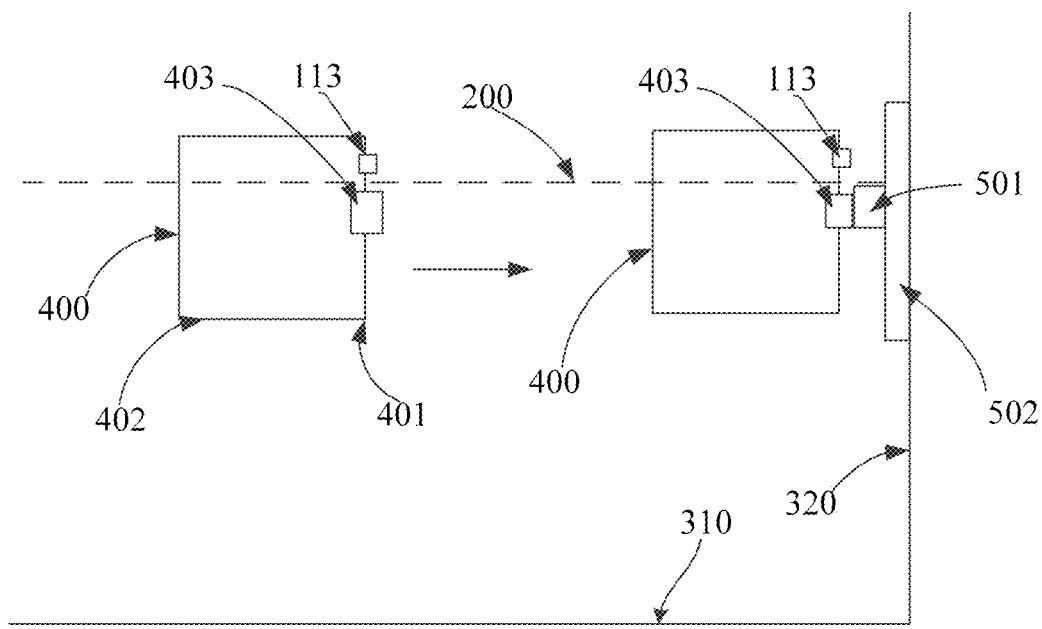
FIG. 29B is a side elevational view of a state of a cleaning device returning to a base station according to an embodiment of the present disclosure.

In one embodiment, as illustrated in FIG. 29B, the supporting member 502 is disposed on the side wall 320 in a direction substantially parallel to the side wall 320. In a case that the number of the second docking assembly 501 is one, the second docking assembly 501 is located near the liquid line 201 along the height direction of the side wall 320. Alternatively, in a case that the number of the second docking assembly 501 is more than one, the second docking assembly 501 may be sequentially provided at different heights along the side wall 320, which allows at least part of the second docking assembly 501 to remain near the liquid line 201 (i.e., a line where the liquid surface 200 contacts the side wall 320) when the height of the liquid surface 200 changes, thereby facilitating the connection between the at least one first docking assembly 403 and the at least one second docking assembly 501 when the moving apparatus 100 is near the liquid line 201.

For example, as illustrated in FIG. 29A, in a case that the at least one first docking assembly 403 is provided at or on a forward side surface of the forward portion 101 of the moving apparatus 100 or a forward side surface of the forward portion 401 of the cleaning device 400 and the moving apparatus 100 needs to return to the base station, the moving apparatus 100 has to be first in the third motion state. In this way, the moving apparatus 100 moves forward in a direction toward the at least one second docking assembly 501 on or above the liquid surface 200, thereby directly connecting the at least one first docking assembly 403 and the at least one second docking assembly 501 and allowing the moving apparatus 100 to successfully return to the base station.

For another example, in a case that the at least one first docking assembly 403 is provided at or on a rearward side surface of the rearward portion 102 of the moving apparatus 100 or a rearward side surface of the rearward portion 402 of the cleaning device 400 and the moving apparatus 100 needs to return to the base station, the moving apparatus 100 has to be first in the third motion state. In this way, the moving apparatus 100 moves backward in a direction toward the at least one second docking assembly 501 on or above the liquid surface 200, thereby enabling the at least one first docking assembly 403 and the at least one second docking assembly 501 to be connected to allow the moving apparatus 100 to successfully return to the base station. Alternatively, the moving apparatus 100 may first move forward in a direction toward the at least one second docking assembly 501 on or above the liquid surface 200, and then the moving apparatus 100 takes a turn to allow the at least one first docking assembly 403 to face toward the at least one second docking assembly 501. Afterward, the moving apparatus 100 moves backward to perform the connection between the at least one first docking assembly 403 and the at least one second docking assembly 501. Alternatively, the moving apparatus 100 may first take a turn on or above the liquid surface 200 to allow the at least one first docking assembly 403 to face toward the at least one second docking assembly 501, and then the moving apparatus 100 moves backward to perform the connection between the at least one first docking assembly 403 and the at least one second docking assembly 501.

For still another example, in a case that the at least one first docking assembly 403 is provided on or at the bottom of the cleaning device 400 or the bottom of the moving apparatus 100 and the moving apparatus 100 needs to return to the base station, the moving apparatus 100 has to be first in the third motion state. In this way, the moving apparatus 100 moves on or above the liquid surface 200 until the forward portion 101 of the moving apparatus 100 abuts against or touches the side wall 320 which the at least one second docking assembly 501 is located on. As illustrated in FIG. 17B, under the action of both the first regulating member 112 and the buoyancy cavity 111, the rearward portion 102 of the moving apparatus 100 rotates downward earlier than the forward portion 101 of the moving apparatus 100 and then the moving apparatus 100 switches to the second motion state. At this time, in a case that the at least one first docking assembly 403 and the at least one second docking assembly 501 are directly connected, the moving apparatus 100 finishes returning to the base station; or in a case that the at least one first docking assembly 403 and the at least one second docking assembly 501 are staggered in the height direction of the side wall 320, the moving apparatus 100 has to move up or down or toward the underwater on the side wall 320 so as to perform the connection between the at least one first docking assembly 403 and the at least one second docking assembly 501.

Figure 29C:
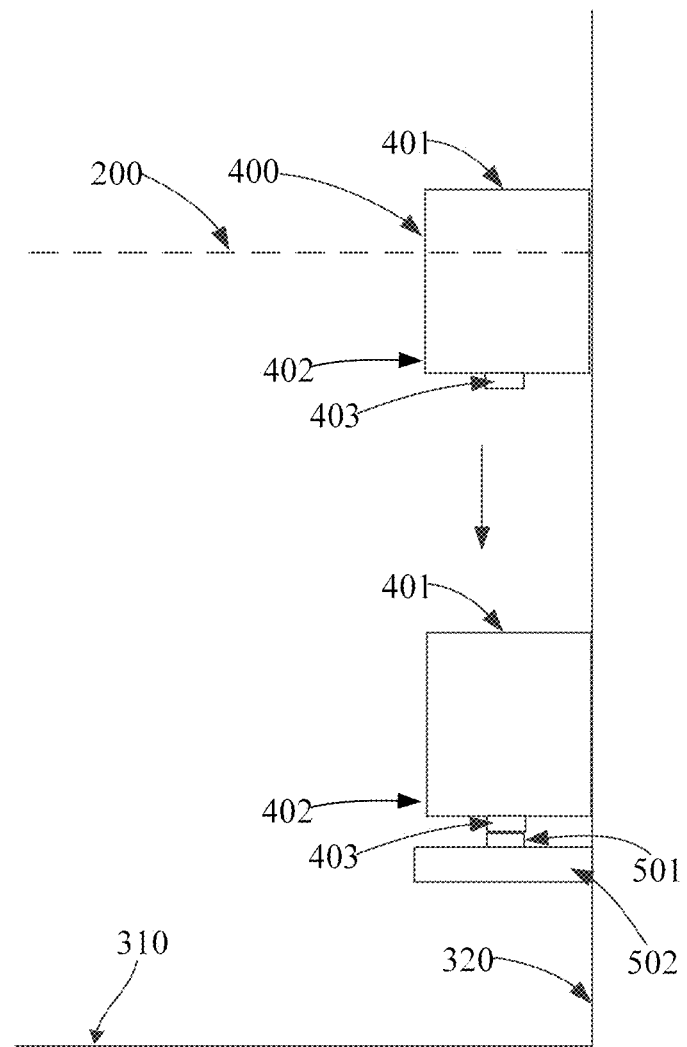
FIG. 29C is a side elevational view of a state of a cleaning device returning to a base station according to another embodiment of the present disclosure.

In one embodiment, as illustrated in FIG. 29C, the supporting member 502 is provided in the pool in a direction substantially parallel to the bottom 310 or in a direction substantially perpendicular to the side wall 320. In a case that the number of the second docking assembly 501 is one, the second docking assembly 501 is provided underwater. In a case that the number of the second docking assembly 501 is more than one, the second docking assembly 501 is sequentially provided in a substantially horizontal direction, thereby facilitating the moving apparatus 100 to perform the connection between the at least one first docking assembly 403 and the at least one second docking assembly 501 above or on the liquid surface 200 or underwater.

For example, as illustrated in FIG. 29C, in a case that the at least one first docking assembly 403 is provided at or on the rearward side surface of the rearward portion 102 of the moving apparatus 100 or the rearward side surface of the rearward portion 402 of the cleaning device 400 and the moving apparatus 100 needs to return to the base station, the moving apparatus 100 has to be first in the third motion state. In this way, the moving apparatus 100 moves on or above the liquid surface 200 until the forward portion 101 of the moving apparatus 100 abuts against or touches the side wall 320 which the supporting member 502 is provided on. As illustrated in FIG. 17B, under the action of both the first regulating member 112 and the buoyancy cavity 111, the rearward portion 102 of the moving apparatus 100 rotates downward earlier than the forward portion 101 of the moving apparatus 100 and then the moving apparatus 100 switches to the second motion state. Afterward, as illustrated in FIG. 17C, the moving apparatus 101 moves downward on the side wall 320 in the backward direction until the at least one first docking assembly 403 and the at least one second docking assembly 501 underwater are connected, thereby enabling the moving apparatus 100 to return to the base station.

For another example, in a case that the at least one first docking assembly 403 is provided on or at the bottom of the cleaning device 400 or the bottom of the moving apparatus 100 and the moving apparatus 100 needs to return to the base station, the moving apparatus 100 has to be first in the third motion state. In this way, the moving apparatus 100 moves on or above the liquid surface 200 until the forward portion 101 of the moving apparatus 100 abuts against or touches the side wall 320 which the at least one second docking assembly 501 is provided on. As illustrated in FIG. 17B, under the action of both the first regulating member 112 and the buoyancy cavity 111, the moving apparatus 100 switches to the second motion state. Afterward, as illustrated in FIG. 17C, the moving apparatus 100 moves downward on the side wall 320 in the backward direction. Then, the forward portion 101 of the moving apparatus 100 abuts against or touches the side wall 320, the rearward portion 102 of the moving apparatus 100 rotates downward earlier than the forward portion 101 of the moving apparatus 100. In this way, the rearward portion 102 of the moving apparatus 100 first abuts against or touches the supporting member 502 and then, the forward portion 101 of the moving apparatus 100 rotates downward to abut against or touch the supporting member 502. During the process of the moving apparatus 100 rotating, the at least one first docking assembly 403 and the at least one second docking assembly 501 are connected so that the moving apparatus 100 returns to the base station. In a case that the moving apparatus 100 is already located on the side wall 320 which the supporting member 502 is provided at when the moving apparatus 100 needs to return to the base station, the moving apparatus 100 does not need to switch to the third motion state and the moving apparatus 100 may directly move backward. During the process of the moving apparatus 100 rotating, the at least one first docking assembly 403 and the at least one second docking assembly 501 are connected so that the moving apparatus 100 returns to the base station.

To avoid an influence of the supporting member 502 on the moving or cleaning of the moving apparatus 101, when the moving apparatus 100 does not need to return to the base station or after the moving apparatus 100 departs from the base station, the supporting member 502 may switch from being in the substantially horizontal state to being in a direction substantially parallel to the side wall 320. For example, the supporting member 502 may be rotatably provided at the side wall 320 so that the supporting member 502 may rotate from being substantially perpendicular to the side wall 320 to being substantially parallel to the side wall 320, thereby allowing the supporting member 502 to be accommodated on the side wall 320. When the moving apparatus 100 needs to return to the base station, the supporting member 502 may then rotate from being substantially parallel to the side wall 320 to being in the substantially horizontal state. Alternatively, the supporting member 502 may be retractably provided at or on the side wall 320. For example, in a case that the supporting member 502 is retractably provided at or on the side wall 320 in a substantially horizontal direction or in a direction substantially perpendicular to the side wall 320, when the moving apparatus 100 needs to return to the base station, the supporting member 502 extends from an accommodating chamber provided at or on the side wall 320 to underwater in the substantially horizontal direction or in a direction substantially perpendicular to the side wall 320, thereby facilitating the moving apparatus 100 to return to the base station. After the moving apparatus 100 departs from the base station, the supporting member 502 retracts back to the accommodating chamber provided at or on the side wall 320 in the substantially horizontal direction or in a direction substantially perpendicular to the side wall 320. Alternatively, in a case that the supporting member 502 is retractably provided at or on the bottom 310 in a direction substantially parallel to the side wall 320 or in a direction substantially perpendicular to the bottom 310, when the moving apparatus 100 needs to return to the base station, the supporting member 502 extends from an accommodating chamber provided at or on the bottom 310 to underwater in a direction substantially parallel to the side wall 320 or in a direction substantially perpendicular to the bottom 310, thereby facilitating the moving apparatus 100 to return to the base station. After the moving apparatus 100 departs from the base station to perform the cleaning task, the supporting member 502 retracts back to the accommodating chamber provided at or on the bottom 310 in a direction substantially parallel to the side wall 320 or in a direction substantially perpendicular to the bottom 310.

In some embodiments, the moving apparatus 100 further includes a third connection duct (not shown in the figure). The third connection duct is configured to connect the first injection port 113 and the external environment. For example, the first sub-injection port 113A of the first connected buoyancy cavity A is connected to the third connection duct, which enables an inner chamber of the first connected buoyancy cavity A and an inner chamber of the second connected buoyancy cavity B to be connected to the external environment. In addition, gas may be discharged from or injected into both the first connected buoyancy cavity A and the second connected buoyancy cavity B through the first sub-injection port 113A and the third connection duct.

The third connection duct is connected to the second sub-discharging port 119B of the second connected buoyancy cavity B, which enables the inner chamber of the first connected buoyancy cavity A and the inner chamber of the second connected buoyancy cavity B to be connected to the external environment. In addition, liquid may be injected into or discharged from both the first connected buoyancy cavity A and the second connected buoyancy cavity B through the second sub-discharging port 119B and the third connection duct.

In one embodiment, the moving apparatus 100 further includes a processor (not shown in the figure). The processor is configured to perform a position switching control of the moving apparatus 100 and/or a posture switching control of the moving apparatus 100. The position switching control may be configured to control the first regulating member 112 to regulate the volume of gas/liquid in the buoyancy cavity 111, thereby changing the buoyancy force applied on the buoyancy cavity 111. The posture switching control is configured to determine the variable quantity of a target applied force of the buoyancy cavity 111 according to a current posture of the moving apparatus 100 and a target posture of the moving apparatus 100, and further control the first regulating member 112 to regulate at least one of the volume of gas and the volume of liquid in the buoyancy cavity 111 according to the variable quantity of a target applied force. The variable quantity of a target applied force is referred to as a change in forces applied on the buoyancy cavity 111 before and after the buoyancy cavity 111 is regulated. The moving apparatus 100 is switched from the current posture to the target posture in response to the change in forces applied on the buoyancy cavity 111.

The processor may be a micro-controller, an embedded processor, or an application specific integrated circuit (ASIC), and etc. The processor may obtain various data information of the moving apparatus 100 and perform a data analysis on the obtained data information, so as to control various components of the moving apparatus 100.

In one embodiment, when the moving apparatus 100 is required to be switched from being above the liquid surface 200 to below the liquid surface 200 or the moving apparatus 100 moves downward from a first underwater level to a second underwater level under the liquid surface 200, in response to an operation trigger condition being met, the processor may perform the position switching control as follows: controlling the first regulating member 112 to decrease the volume of gas in the buoyancy cavity 111 and/or increase the weight of liquid in the buoyancy cavity 111. In some embodiments, when the moving apparatus 100 is required to be switched from being above the liquid surface 200 to below the liquid surface 200 or the moving apparatus 100 moves downward from the first underwater level to the second underwater level under the liquid surface 200, in response to an operation trigger condition being met, the processor may perform the posture switching control to switch the moving apparatus 100 from the current posture to a wall climbing posture and then perform the position switching control to control the moving apparatus 100 to climb along the side wall 320 downward to below the liquid surface 200.

In another embodiment, when the moving apparatus 100 is required to be switched from being below the liquid surface 200 to above the liquid surface 200 or the moving apparatus 100 moves upward from a first underwater level to a second underwater level under the liquid surface 200, the processor may perform the position switching control as follows: controlling the regulating member 112 to increase the volume of gas in the buoyancy cavity 111 and/or decrease the weight of liquid in the buoyancy cavity 111. In some embodiments, in a case where the moving apparatus 100 is required to be switched from being below the liquid surface 200 to above the liquid surface 200 or the moving apparatus 100 moves upward from the first underwater level to the second underwater level below the liquid surface 200, the processor may perform the position switching control firstly to control the moving apparatus 100 to climb along the side wall 320 from the below of the liquid surface 200 upward to the second underwater level or to an interface between liquid and air. Then the processor may perform the posture switching control to switch from the wall climbing posture to a preset posture.

In one embodiment, the moving apparatus 100 may further include a propeller. The moving apparatus 100 may be driven by a driving force generated by the propeller to move upward directly from being below the liquid surface 200 to above the liquid surface 200, or to move upward from the first underwater level to the second underwater level under the liquid surface 200. Alternatively, the moving apparatus 100 may also be driven by a driving force generated by the propeller to move upward obliquely from being below the liquid surface 200 to above the liquid surface 200, or to move upward from the first underwater level to the second underwater level below the liquid surface 200.

In another embodiment, when the moving apparatus 100 is required to be switched from a first surface posture to a second surface posture or to be switched from a first underwater posture to a second underwater posture, the posture switching control is performed to switch the moving apparatus 100 from the first surface posture to the second surface posture or to switch the moving apparatus 100 from the first underwater posture to the second underwater posture. One of the first surface posture and the second surface posture is referred to as a surface operation posture and the other one of the first surface posture and the second surface posture is referred to as a posture of the moving apparatus moving along a liquid line. One of the first underwater posture and the second underwater posture is referred to as a bottom operation posture and the other one of the first underwater posture and the second underwater posture is referred to as the wall climbing posture.

In one embodiment, the moving apparatus 100 further includes a sensor (not shown in the figure). The sensor includes at least one of a first sensor and a second sensor. The first sensor is configured to detect a location of the moving apparatus 100. The second sensor is configured to detect whether the first injection port 113 of the buoyancy cavity 111 is exposed above the liquid surface 200. The processor is further configured to, when the moving apparatus 100 is required to be switched from being below the liquid surface 200 to above the liquid surface 200, obtain information detected by the sensor, and further, in response to the information detected by the sensor fulfilling a preset condition, determine that the trigger condition is met. When the information detected by the sensor includes the location of the moving apparatus 100, the preset condition includes that the location of the moving apparatus 100 needs to fulfill a preset location condition. When the information detected by the sensor includes a detection result of whether the first injection port 113 of the buoyancy cavity 111 is exposed above the liquid surface 200, the preset condition includes that the first injection port 113 of the buoyancy cavity 111 is exposed above the liquid surface 200.

In other words, the first sensor may be configured to detect the position of the moving apparatus 100 in real time. The position may include a vertical position (or referred to as a depth) of the moving apparatus 100 in the liquid. The first sensor may be, but is not limited to, a pressure sensor, an ultrasonic sensor, or an optical sensor. The moving apparatus 100 may further include the processor. The processor may obtain the position of the moving apparatus 100 in real time from the first sensor. In a case where the position of the moving apparatus 100 meets the preset condition, the processor may control the first regulating member to increase the volume of the gas in the buoyancy cavity. The preset condition may include a condition that the position of the moving apparatus 100 is higher than a preset height. When the depth of the liquid in the target region 300 is fixed, the processor may determine whether the position of the moving apparatus 100 meets the preset condition to determine whether an air inlet (namely, the first injection port) of the moving apparatus 100 is exposed above the liquid surface 200. In a case where the processor determines that the first injection port of the moving apparatus 100 is exposed above the liquid surface, the processor may control a buoyancy cavity pump (namely, the first regulating member) to draw the external gas into the buoyancy cavity through the first injection port. In other words, the first sensor is configured to detect the position of the swimming pool robot, and the processor determines, based on a detection result of the first sensor, whether the first injection port is exposed above the liquid surface. In a case where the processor determines that the first injection port is exposed above the liquid surface, the processor controls the first regulating member (for example, a pump) to be turned on, and under an action of the pump, the external gas enters the buoyancy cavity through the first injection port.

The second sensor may be configured to detect in real time whether the air inlet (namely, the first injection port) of the buoyancy cavity is located in air. For example, the second sensor may be an ultrasonic sensor. The second sensor may be disposed at the air inlet of the buoyancy cavity. In some embodiments, the second sensor may alternatively be disposed at other positions on the moving apparatus 100. In this case, a position of the second sensor is used to represent the position of the air inlet based on a distance difference between the second sensor and the air inlet, so that a detection result of whether the air inlet is located in air is obtained. In some embodiments, when the moving apparatus 100 needs to be switched from below the liquid surface to above the liquid surface, the processor may obtain a detection result of the second sensor. In a case where the detection result indicates that the air inlet is located in air, the processor controls the first regulating member to increase the volume of the gas in the buoyancy cavity, enabling the moving apparatus 100 to be switched from below the liquid surface to above the liquid surface. In other words, the second sensor is configured to detect whether the first injection port is exposed above the liquid surface. In a case where the second sensor detects that the first injection port is exposed above the liquid surface, the processor controls the first regulating member (for example, the pump) to be turned on, and under the action of the pump, the external gas enters the buoyancy cavity through the first injection port.

The mode switching member 110 is arranged to regulate the magnitude of the buoyancy force applied on the moving apparatus 100, which enables the moving apparatus 100 to perform the posture switching among the first motion state, the second motion state, and the third motion state, thereby flexibly switching the moving apparatus 100 between being above the liquid surface 200 and below the liquid surface 200 and improving the working efficiency and the reliability of the moving apparatus 100 in the liquid environment. The first sensor and the second sensor are arranged to enable the moving apparatus 100 to automatically determine the environment where the first injection port 113 is located and improve the working efficiency of the moving apparatus 100.

A positioning and a type of the first sensor are not limited herein. In some embodiments, the first sensor may be provided at the center of the moving apparatus 100. That is, the location of the moving apparatus 100 detected by the first sensor is referred to as a depth of the center of the moving apparatus 100 in the liquid. The first sensor may be, including but limited to, a pressure sensor, an ultrasonic sensor, or an optical sensor, and etc. When the first sensor is the pressure sensor, the first sensor may be disposed on a particular region of the moving apparatus 100. The region is affected by a relatively small flow fluctuation or is less affected by other factors, so as to improve the accuracy of detection. In addition, a positioning and a type of the second sensor are not limited herein. In some embodiments, the second sensor may be an ultrasonic sensor, an outlet sensor, an air sensor or a depth sensor, and etc. The second sensor may be provided at one of the at least one first injection port 113 of the buoyancy cavity 111. The second sensor may also be provided at other positions of the moving apparatus 100 and then, through the subsequent position switching, obtain the detection result of whether the first injection port 113 of the buoyancy cavity 111 is exposed to the air.

In some embodiments, the force applied on the moving apparatus 100 in the vertical direction may include a first driving force applied on the moving apparatus 100 in the vertical direction. The mode switching member 110 includes a force regulation assembly. The force regulation assembly is configured to regulation the first driving force applied on the moving apparatus 100 in the vertical direction. A structure of the force regulation assembly is not limited herein. The force regulation assembly may have any structure that is able to provide the driving force. For example, the force regulation assembly may be a screw propeller. The screw propeller may be provided on the moving apparatus 100 along a vertical direction, which enables the moving apparatus 100 to obtain the first driving force along a substantially vertical direction. The first driving force along a substantially vertical direction may be either upward or downward. In response to the first driving force, the moving apparatus 100 may move upward or downward along a vertical direction, or may also suspend somewhere in the liquid. In this case, the mode switching member 110 is configured to regulate the first driving force applied on the moving apparatus 100 in the vertical direction through the force regulation assembly, thereby realizing the position-and-posture switching of the moving apparatus 100 above or below the liquid surface 200. However, the mode switching assembly 110 provided in the aforementioned embodiments performs the position-and-posture switching of the moving apparatus 100 above or below the liquid surface 200 by means of regulating the volume of the liquid or gas in the buoyancy cavity 111, which changes the buoyancy force applied on the buoyancy cavity 111 and further changes the buoyancy force applied on the moving apparatus 100 in the vertical direction. In one embodiment, the moving apparatus 100 or the cleaning device 400 may include the mode switching member 110 in both ways mentioned above, or may include the mode switching member 110 in any one of the two ways mentioned above.

Figure 8:
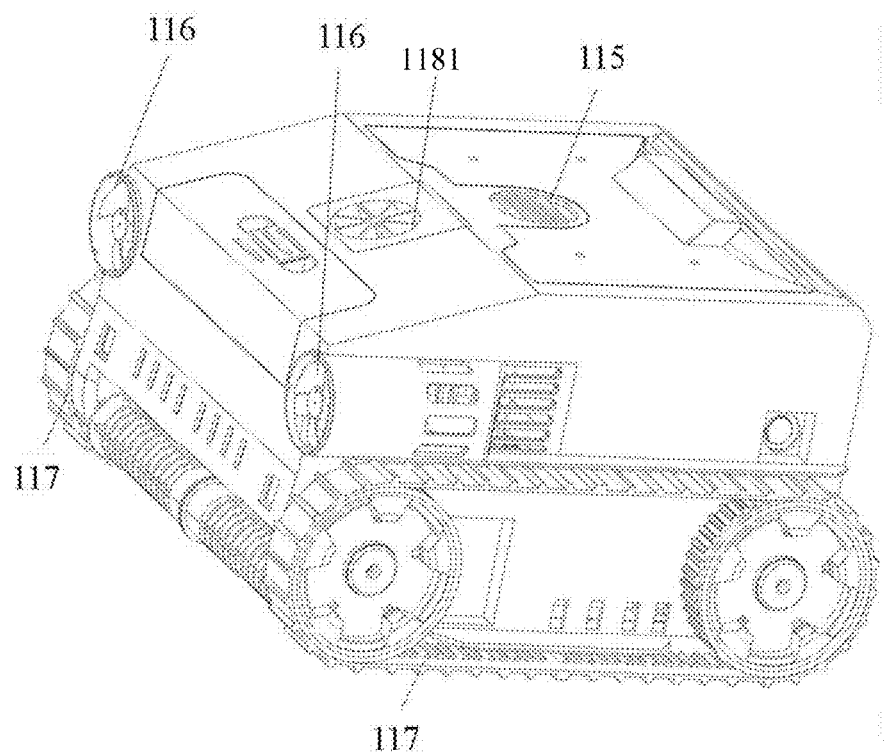
FIG. 8 is a second front elevational view of a moving apparatus used in liquid according to some embodiments of the present disclosure.

In some embodiments, as illustrated in FIG. 8, a second front elevational view of the moving apparatus used in liquid is provided. The force regulation assembly includes at least one of a first propeller 115 and a second propeller 116. The first propeller 115 is configured to propel liquid to flow in a first preset direction. When the liquid flows in the first preset direction, the first driving force is applied on the moving apparatus 100 along a vertical direction. The magnitude of the first driving force is positively correlated with both the speed and the volume of flow of the liquid that flows in the first preset direction. The second propeller 116 is configured to propel liquid to flow in a second preset direction. When the liquid flows in the second preset direction, a second driving force is applied on the moving apparatus 100 along a horizontal direction. The magnitude of the second driving force is positively correlated with both the speed and the volume of flow of the liquid that flows in the second preset direction. The second propeller 116 is arranged to realize the position switching of the moving apparatus 100 along a horizontal direction, for example, moving straight or swerving along a horizontal direction, so as to expand the functionality of the moving apparatus 100 to allow the moving apparatus 100 to be applied to more scenes. The first propeller 115 is configured to promptly or conveniently perform the position switching of the moving apparatus 100 above or below the liquid surface 200.

Figure 9:
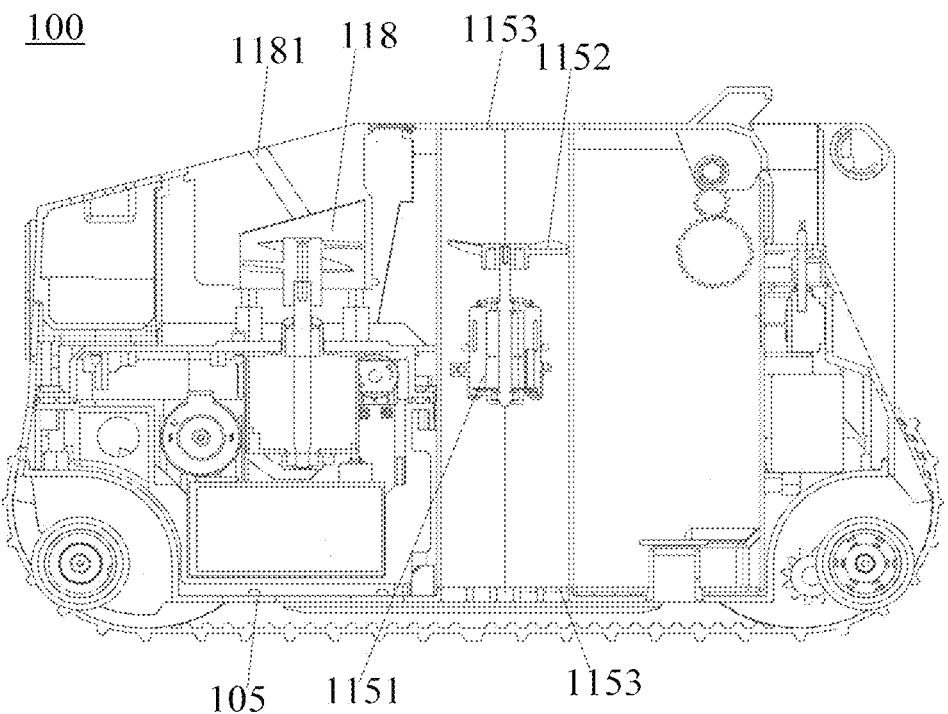
FIG. 9 is a first cross-sectional view of a moving apparatus used in liquid according to some embodiments of the present disclosure.
Figure 11:
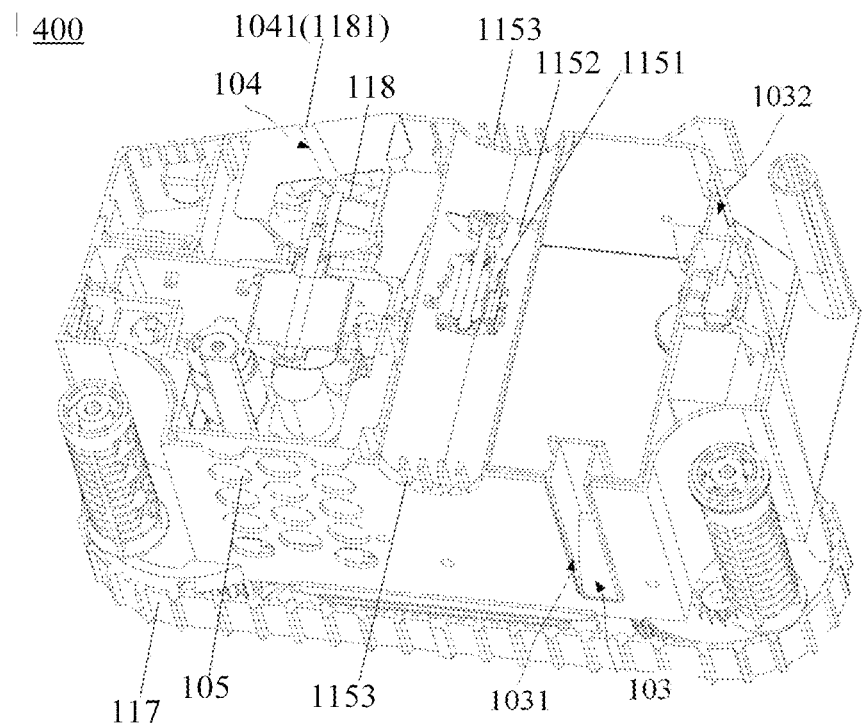
FIG. 11 is a first bottom plan view of a moving apparatus used in liquid according to some embodiments of the present disclosure.
Figure 27B:
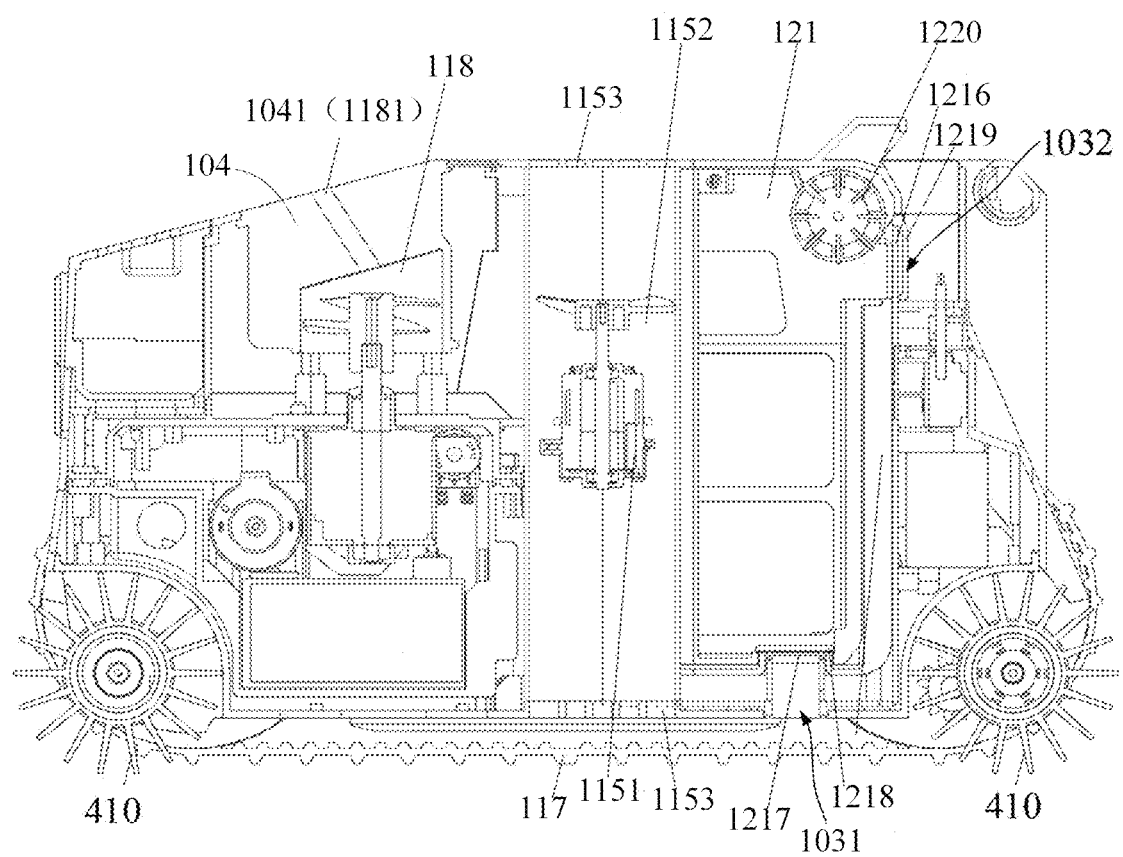
FIG. 27B is a sectional view of a cleaning device according to an embodiment of the present disclosure.

Specifically, as illustrated in FIG. 9 or FIG. 11 or FIG. 27B, the first propeller 115 includes a first propeller impeller 1152 and a first propeller motor 1151. The first propeller 1152 may rotate to drive liquid to move in the first preset direction. When the liquid moves in the first preset direction, the first driving force is applied on the moving apparatus 100 in the vertical direction. The first propeller 115 in the moving apparatus 100 may include two first propeller openings 1153. One of the first propeller openings 1153 may be provided at the top portion of the moving apparatus 100, while the other first propeller opening 1153 may be located at the bottom of the moving apparatus 100. The first propeller impeller 1152 may be driven by the first propeller motor 1151 to enable liquid to be intaken through one of the two first propeller openings 1153 and then to be discharged through the other one of the two first propeller openings 1153, allowing the first driving force to be applied on the moving apparatus 100 in the vertical direction. When the moving apparatus 100 is underwater, the moving apparatus 100 may further regulate the first preset direction through changing a rotation direction of the first propeller impeller 1152 (e.g., a forward or reverse rotation of an electric motor), thereby further regulating a direction of the first driving force and enabling the moving apparatus 100 to perform the position-and-posture switching above or below the liquid surface 200. In other words, the moving apparatus 100 may be switched between the first motion state and the third motion state without through the second motion state, which enables the moving apparatus 100 to move directly up and down underwater, thereby allowing the moving apparatus 100 to quickly and conveniently perform the position-and-posture switching above or below the liquid surface 200.

In one embodiment, as illustrated in FIG. 8 and FIG. 9, the moving apparatus 100 may be configured to move within the target region 300 that contains liquid. The target region 300 includes the bottom 310 and the side wall 320. The moving apparatus 100 further includes at least one of a track 117, a main pump 118, and a processor. The track 117 is configured to drive the moving apparatus 100 to move and switch a moving region of the moving apparatus 100 from the bottom 310 to the side wall 320. The main pump 118 is configured to drive the moving apparatus 100 to first suction liquid into the moving apparatus 100 through the first intake 1031, then suction the liquid into the main pump 118 through a main pump inlet, and finally discharge the liquid through a main pump outlet 1181 (i.e., a first fluid outlet 1041), so as to drive the moving apparatus 100 to abut against the side wall 320. The processor is configured to, in response to the mode switching member 110 finishing the position-and-posture switching of moving apparatus 100 from being below the liquid surface 200 to above the liquid surface 200, control the moving apparatus 100 to perform at least one of the following: cleaning, charging, filter cleaning, and landing.

The main pump 118 is configured to drive the moving apparatus 100 to first suction liquid into the moving apparatus 100 through the first intake 1031, then suction the liquid into the main pump 118 through the main pump inlet, and finally discharge the liquid from the main pump outlet 1181. The cleaning device 400 may include at least one inlet for the liquid to enter an interior of the moving apparatus 100. As illustrated in FIG. 11, a first bottom plan view of the moving apparatus used in liquid is provided. Each of the first intake 1031 and the second intake 1032 of the moving apparatus 100 is referred to as the inlet for the liquid to enter the interior of the moving apparatus 100. The main pump outlet 1181 may include at least one outlet for the liquid to leave the interior of the moving apparatus 100 and enter the target region 300. As illustrated in FIG. 11, the main pump outlet 1181 of the moving apparatus 100 may be referred to as the outlet for the liquid in the interior of the moving apparatus 100 to leave the moving apparatus 100 and enter the target region 300, i.e., the first fluid outlet 1041.

When the moving apparatus 100 is located on the side wall 320, the first fluid outlet 1041 (e.g., the main pump outlet 1181) may at least face the target region 300 in a direction parallel to the horizontal direction or tilted downward in the vertical direction, so as to ensure that during the operation of the main pump 118, in response to the liquid being discharged through the main pump outlet 1181, a third driving force is applied on the moving apparatus 100 to drive the moving apparatus 100 to abut against the side wall 320. The third driving force may be referred to as a counter force applied on the moving apparatus 100 in response to the main pump 118 discharging the liquid through the main pump outlet 1181.

For example, the first intake 1031 may be provided at the bottom of the moving apparatus 100. When the moving apparatus 100 needs to move on the side wall 320, the main pump 118 is configured to suction the liquid through the first intake 1031, which enables the third driving force to be applied on the moving apparatus 100 to drive the moving apparatus 100 to abut against the side wall 320. The third driving force may be referred to as a suction force generated by the main pump 118 suctioning water through the first intake 1031. The suction force may drive the moving apparatus 100 to abut against the side wall 320. Similarly, when the moving apparatus 100 moves on the bottom 310, liquid is injected into the moving apparatus 100 through the first intake 1031 and is then discharged through the main pump inlet 1181 of the main pump 118, which also allows the third driving force to be applied on the moving apparatus 100, thereby enabling the moving apparatus 100 to closely abut against or touch the bottom 310. That is, as long as the main pump 118 is turned on so that liquid is injected through the first intake 1031 and then is discharged through the first fluid outlet 1041, the third driving force may be applied on the moving apparatus 100.

When the moving apparatus 100 needs to move on the side wall 320, the main pump 118 of the moving apparatus 100 may drive the moving apparatus 100 to abut against the side wall 320. At least one of the track 117, the second propeller 116, and the main pump 118 in the moving apparatus 100 may provide an upward driving force along a vertical direction to drive the moving apparatus 100 to move upward on the side wall 320. At least one of the track 117 and the second propeller 116 in the moving apparatus 100 may further provide a downward driving force along a vertical direction to drive the moving apparatus 100 to move downward on the side wall 320.

The main pump 118 is arranged to enable the moving apparatus 100 to abut against the side wall 320, which limits the moving apparatus 100 and facilitate the moving apparatus 100 to move on the side wall 320, thereby cleaning the side wall 320 and performing the position switching of the moving apparatus 100 from being below the liquid surface 200 to above the liquid surface 200.

In one embodiment, the moving apparatus 100 further includes a moving mechanism and a propulsion mechanism. The moving mechanism is generally configured to drive the moving apparatus 100 to move in the first motion state or the second motion state. The propulsion mechanism is generally configured to drive the moving apparatus 100 to move in the third motion state. The moving mechanism is provided at the bottom of the moving apparatus 100. The moving mechanism is configured to drive the moving apparatus 100 to move on the to-be-cleaned surface. The moving mechanism may include a wheel, both a wheel and the track 117, and etc. The propulsion mechanism is configured to drive the cleaning device 400 or the moving apparatus 100 to move away from the to-be-cleaned surface. The propulsion mechanism may include the first propeller 115 and/or the second propeller 116. Obviously, the main pump 118 in a drive mechanism may also provide a partial force to drive the cleaning device 400 or the moving apparatus 100 to move on the to-be-cleaned surface or to move away from the to-be-cleaned surface. The to-be-cleaned surface may be the bottom 310 of the target region 300, or the side wall 320 of the target region 300, and etc.

FIG. 12 is a schematic structural view of a cleaning device according to some embodiments of the present disclosure. The cleaning device 400 includes a forward portion 401 and a rearward portion 402. The cleaning device 400 further includes the mode switching member 110. The mode switching member 110 includes the buoyancy cavity 111, the first regulating member 112, the at least one first injection port 113, and a cleaning member. The buoyancy cavity 111 is configured to accommodate liquid or gas. The first regulating member 112 is configured to regulate the volume of gas or liquid in the buoyancy cavity 111. The at least one first injection port 113 is provided on the forward portion 401 of the cleaning device 400 and is connected to the buoyancy cavity 111 to allow external gas or external liquid to enter the buoyancy cavity 111. In response to the first injection port 113 of the cleaning device 400 being exposed above the liquid surface 200, the first regulating member 112 is turned on to enable the gas to be injected into the buoyancy cavity 111 through the first injection port 113 so that the rearward portion 402 of the cleaning device 400 moves toward the liquid surface 200, thereby enabling the cleaning device 400 to be switched from the second motion state to the third motion state.

Therefore, the mode switching member 110 is arranged on the cleaning device 400 to enable the cleaning device 400 to switch the position-and-posture among the first motion state, the second motion state, and the third motion state, thereby realizing the position-and-posture switching of the cleaning device 400 above or below the liquid surface 200. When the cleaning device 400 is below the liquid surface 200, the cleaning device 400 may clean the underwater, the side wall 320, the bottom 310, and etc. When the cleaning device 400 is above the liquid surface 200, the cleaning device 400 may clean the liquid surface 200. The mode switching member 110 is arranged on the cleaning device 400 to enable the cleaning device 400 to perform the position-and-posture switching below or above the liquid surface 200, thereby allowing the cleaning device 400 to clean the liquid environment in the all-round way, improving the application scope and the working efficiency of cleaning in the liquid environment, and reducing the costs of cleaning the liquid environment.

The cleaning device 400 further includes the cleaning member. The cleaning member includes a filter mechanism. The filter mechanism is configured to filter the cleaning device. The filter mechanism is at least partially located in the cleaning device and is configured to collect stains and suspended matter from the target region 300, filter the liquid, and etc. In one embodiment, as illustrated in FIG. 11, the cleaning device 400 includes a liquid intake portion 103 and a liquid outlet portion 104. The liquid intake portion 103 is configured to allow liquid to enter an interior of a cleaning device body. The liquid intake portion 103 at least includes a first intake 1031. The first intake 1031 is provided at the cleaning device body. That is, the liquid enters the interior of the cleaning device body through the first intake 1031. The liquid outlet portion 104 is configured to discharge the liquid that has passed through the filter mechanism in cleaning device body. The liquid outlet portion 104 at least includes the first fluid outlet 1041. The first fluid outlet 1041 is provided at the cleaning device body. That is, the liquid is discharged from the cleaning device body through the first fluid outlet 1041. The first intake 1031, the filter mechanism, the drive mechanism, and the first fluid outlet 1041 are connected to one another in sequence to form a first liquid path. Through a guidance of the drive mechanism, liquid enters the interior of the cleaning device body through the first intake 1031, flows toward the filter mechanism and the drive mechanism, and then discharges through the first fluid outlet 1041. In an actual scenario or use, the liquid may flow in a reverse direction, i.e., the liquid flows through the first fluid outlet 1041, the drive mechanism, the filter mechanism, the first intake 1031, and etc. in sequence. The process of the liquid flowing in the reverse direction may be referred to as a self-cleaning process of the filter mechanism. That is, the flow enters an interior of the filter mechanism through an outlet of the filter mechanism (e.g., an outer surface of a filtering screen of the filter mechanism), exits the filter mechanism through an inlet of the filter mechanism, and then exits the cleaning device 400 through the first intake 1031, thereby discharging particles or objects adhered to an inner surface of the filtering screen of the filter mechanism and garbage inside the filter mechanism from the filter mechanism.

In one embodiment, the liquid intake portion 103 includes a first intake 1031. The first intake 1031 is located at a forward portion of the lower portion of the cleaning device body or a forward portion of the bottom of the cleaning device. The first intake 1031 is configured to perform both underwater cleaning and liquid surface cleaning. When the cleaning device 400 is performing the underwater cleaning, the first intake 1031 is located below the liquid surface 200 and can intake garbage below the liquid surface 200. When the cleaning device 400 is performing the liquid surface cleaning, the first intake 1031 is at least partially exposed above or immediately adjacent to the liquid surface 200 and can intake garbage floating on the liquid surface 200. That is, the cleaning device body can achieve the underwater cleaning and the liquid surface cleaning through the first intake 1031 and by means of the mode switching member 110 regulating a posture of the cleaning device 400 in the target region 300, such that the cleaning efficiency is improved. The liquid flows sequentially through the first intake 1031, the first inlet, the filter mechanism, the outlet, the drive mechanism, and the liquid outlet portion 104, which forms a first flowing path adapted to perform a cleaning operation. In the above embodiments, when the cleaning device 400 is performing the underwater cleaning, the posture of the cleaning device 400 is in a normal state.

When the cleaning device 400 is performing the liquid surface cleaning, a forward portion 401 of the cleaning device 400 is lifted upwardly to be exposed from the liquid surface 200, such that the first intake 1031 is at least partially exposed above the liquid surface 200.

In other embodiments, as illustrated in FIG. 12, the liquid intake portion 103 includes the first intake 1031. The first intake 1031 is located at the bottom of the cleaning device body. The first intake 1031 is used for both underwater cleaning and liquid surface cleaning. When the cleaning device 400 is performing the underwater cleaning, the first intake 1031 is located below the liquid surface 200 and faces towards a to-be-cleaned surface. When the cleaning device 400 is performing the liquid surface cleaning, the first intake 1031 is located below the liquid surface 200 but near the liquid surface 200 and faces toward the liquid surface 200. When the cleaning device 400 reaches the liquid surface 200, the cleaning device 400 is entirely flipped. That is, the cleaning device body can realize the underwater cleaning and the liquid surface cleaning work by means of the first intake 1031 and by regulating the posture of the cleaning device 400 in the target region 300, such that the cleaning efficiency is improved. The liquid flows sequentially through the first intake 1031, the filter mechanism, the outlet, the drive mechanism, and the liquid outlet portion 104. In the above embodiment, when the cleaning device 400 is performing the underwater cleaning, the posture of the cleaning device 400 is in the normal state. When the cleaning device 400 is performing the liquid surface cleaning, the cleaning device 400 can be flipped, i.e., the bottom of the cleaning device 400 faces upwards. When the bottom of the cleaning device 400 is facing upwards, the filter mechanism is in a closed state, reducing a risk of the garbage being leaked out of the filter mechanism.

In one embodiment, the liquid intake portion 103 at least includes the first intake 1031 and the second intake 1032. As illustrated in FIG. 11 or FIG. 12, or FIG. 27A, the first intake 1031 is located at the bottom of the cleaning device body. When the cleaning device 400 is cleaning the bottom or the wall of the pool, the first intake 1031 is located near the bottom or the wall of the pool to suction the liquid into the interior of the cleaning device 400. As illustrated in FIG. 11 or FIG. 12, or FIG. 15, the liquid intake portion 103 includes the second intake 1032. That is, the liquid enters the cleaning device body through the second intake 1032. The second intake 1032 is located at a side of the forward portion of the cleaning device body. When the cleaning device 400 is performing the liquid surface cleaning, the second intake 1032 is at least partially exposed above the liquid surface 200 and can intake the garbage floating on the liquid surface 200, thereby forming a third flowing path adapted to perform the cleaning operation in the third motion state. The second intake 1032 enables the cleaning device 400 to achieve the liquid surface cleaning. In addition, the first intake 1031 and the second intake 1032 may operate cooperatively to improve the cleaning efficiency of the cleaning device 400.

In one embodiment, the liquid intake portion 103 includes the first intake 1031 and the second intake 1032. Besides being located at the forward portion of the lower portion of the cleaning device body, the first intake 1031 may also be located at the near rearward portion of the lower portion of the cleaning device body or at the side of the cleaning device body. To be noted that, the location at which the liquid intake portion 103 is provided is related to a location at which the filter mechanism is provided. When the filter mechanism is provided at the forward portion 401 of the cleaning device 400, the liquid intake portion 103 is provided at the forward portion 401 of the cleaning device 400. When the filter mechanism is provided at a rear portion of the cleaning device 400, the liquid intake portion 103 is provided at the rear portion of the cleaning device 400.

In one embodiment, the filter mechanism includes the filter assembly 120. The filter assembly 120 has the filtering function. The filter assembly 120 includes a first inlet. The first intake 1031 and/or the second intake 1032 are connected to the first inlet of the filter assembly 120. Under the action of the drive mechanism, at least a portion of the liquid sequentially flows through the first intake 1031, the first inlet, the interior of the filter assembly 120, the drive mechanism, and the liquid outlet portion 104. In other words, the first intake 1031, the first inlet, the interior of the filter assembly 120, the drive mechanism, and the liquid outlet portion 104 are sequentially connected to form the first flowing path. At least a portion of the liquid sequentially flows through the second intake 1032, the first inlet, the interior of the filter assembly 120, the drive mechanism, and the liquid outlet portion 104. In other words, the second intake 1032, the first inlet, the interior of the filter assembly 120, the drive mechanism, and the liquid outlet portion 104 are sequentially connected to form the third flowing path. Since the first intake 1031 and the second intake 1032 are respectively connected to the first inlet, the cleaning efficiency of the cleaning device 400 is improved. The second intake 1032 and the first inlet may be connected to each other by a duct or the like; and/or, the first intake 1031 and the first inlet may be connected to each other by a duct or the like.

The filter mechanism may include one, two, three or more filter assemblies. The number of the filter assemblies may be determined according to actual demands. When two, three, or more filter assemblies are arranged, adjacent filter assemblies may be connected to each other in series or in parallel. Connection therebetween may be determined according to usage demands of the cleaning device 400, which will not be limited herein.

In one embodiment, the filter mechanism includes one filter assembly 120. The filter assembly 120 includes the first inlet and the second inlet. The first intake 1031 is connected to the first inlet of the filter assembly 120. The second inlet and the first inlet are located on different faces of the filter mechanism. That is, at least a portion of the liquid flows sequentially through the first intake 1031, the first inlet, the interior of the filter assembly 120, the drive mechanism, and the liquid outlet portion 104. The second intake 1032 is connected to the second inlet of the filter assembly 120. That is, at least a portion of the liquid flows sequentially through the second intake 1032, the second inlet, the filter assembly 120, the drive mechanism, and the liquid outlet portion 104. The first intake 1031 is connected to the first inlet, and the second intake 1032 is connected to the second inlet, such that more flowing paths are provided, satisfying demands of at least two operations: the underwater cleaning and the liquid surface cleaning. Therefore, various usage demands are met.

In one embodiment, the filter mechanism includes two filter assemblies. The two filter assemblies include a first filter assembly and a second filter assembly. The first filter assembly is provided with a first inlet. The second filter assembly is provided with a second inlet. The first intake 1031 is connected to the first inlet of the first filter assembly. That is, at least a portion of the liquid sequentially flows through the first intake 1031, the first inlet, the interior of the first filter assembly, the drive mechanism, and the liquid outlet portion 104. In other words, the first intake 1031, the first inlet, the interior of the first filter assembly, the drive mechanism, and the liquid outlet portion 104 are sequentially connected to form the first flowing path. The second intake 1032 is connected to the second inlet of the second filter assembly. That is, at least a portion of the liquid sequentially flows through the second intake 1032, the second inlet, the interior of the second filter assembly, the drive mechanism, and the liquid outlet portion 104. In other words, the second intake 1032, the second inlet, the interior of the second filter assembly, the drive mechanism, and the liquid outlet portion 104 are sequentially connected to form the third flowing path. The two filter assemblies are configured to achieve different flowing paths to improve the cleaning efficiency of the cleaning device 400.

In one embodiment, the liquid intake portion 103 includes the first intake 1031 and the second intake 1032. The filter mechanism includes a first filter assembly and a second filter assembly. The second filter assembly is sleeved within the first filter assembly. The first intake 1031 is connected to the first inlet of the first filter assembly. The first intake 1031 is configured to guide the liquid to flow through the first inlet to enter the first filter assembly. The second intake 1032 is connected to the second inlet of the second filter assembly. The second intake 1032 is configured to guide the liquid to flow through the second inlet to enter the second filter assemble. When the cleaning device 400 is performing the underwater cleaning, the liquid flows through the first intake 1031, the first inlet, the first filter assembly, and the main pump 118 sequentially to allow the cleaning device 400 to achieve the underwater cleaning. When the cleaning device 400 is performing the liquid surface cleaning, the liquid flows through the second intake 1032, the second inlet, the second filter assembly, the first filter assembly, and the main pump 118 sequentially to allow the cleaning device 400 to achieve the liquid surface cleaning. When the cleaning device 400 is performing the liquid surface cleaning, the liquid flows through the double layered dust box, such that the cleaning efficiency of the liquid surface cleaning is improved.

By connecting the two filter assemblies in series to each other, the first intake 1031 is connected to the first inlet of the first filter assembly, and the second intake 1032 is connected to the second inlet of the second filter assembly. The cleaning device 400 can perform the underwater cleaning and the liquid surface cleaning. Therefore, the cleaning device 400 can be applied to more application scenes, and the usage experience is improved. The structures of the first filter assembly and the second filter assembly may be substantially the same with or different from each other, which are not limited herein.

When the cleaning device 400 is performing the underwater cleaning, the second intake 1032 or the second inlet may be closed, so as to prevent the second intake 1032, the second filter assembly, and the main pump 118 from diverting the liquid and to ensure a fluid intaking effect at the first intake 1031 and the first inlet. In other words, after the cleaning device 400 is switched from the second motion state to the third motion state, a second flowing path (please refer to the content below) is closed. In practice, when a power of the main pump 118 is sufficiently high, the second intake 1032 or the second inlet may also not be closed. Similarly, when the cleaning device 400 is performing the liquid surface cleaning, the first intake 1031 or the first inlet may be closed, so as to prevent the first intake 1031, the first filter assembly, and the main pump 118 from diverting the liquid and to ensure the fluid intaking effect at the second intake 1032 and the second inlet. In practice, when the power of the main pump 118 is sufficiently high, the first intake 1031 or the first inlet may also not be closed.

In one embodiment, the cleaning device 400 may include a control member. The control member of the cleaning device 400 controls the cleaning device 400 to switch positions below or above the surface of the pool, so as to perform the liquid surface cleaning or the underwater cleaning.

In some embodiments, the filter mechanism includes a dust box 121. The dust box is configured to perform the liquid surface cleaning and the underwater cleaning of the pool. The dust box may include a dust box inlet portion. The dust box inlet portion is connected to the liquid intake portion 103. The dust box inlet portion is provided as an inlet for garbage or other impurities in the pool to enter the cleaning device 400.

As illustrated in FIG. 27B, the dust box 121 may include the dust box inlet portion. The dust box inlet portion may include a dust box opening for underwater cleaning 1217. The dust box opening for underwater cleaning 1217 may be provided as an inlet for garbage or impurities in the liquid of the target region 300 to enter into the dust box 121. The dust box opening for underwater cleaning 1217 may be provided below a floating position of the cleaning device 400 on or above the liquid surface 200. For example, the dust box opening for underwater cleaning 1217 may be provided at the bottom of the cleaning device 400. For another example, the dust box opening for underwater cleaning 1217 may be alternatively provided at a side of the cleaning device 400 below the floating position of the cleaning device 400 on or above the liquid surface 200. The first intake 1031 is disposed at a position corresponding to a position which the dust box opening for underwater cleaning 1217 is located at. The first intake 1031 and the dust box opening for underwater cleaning 1217 are connected. In this way, the liquid in the target region 300 enters into the dust box 121 through the first intake 1031 and the dust box opening for underwater cleaning 1217 in sequence.

As illustrated in FIG. 27B, in one embodiment, the dust box inlet portion may further include a dust box opening for liquid surface cleaning 1216. The dust box opening for liquid surface cleaning 1216 is connected to the second intake 1032. The dust box opening for liquid surface cleaning 1216 may be provided as an inlet for garbage or impurities on the liquid surface 200 of the target region 300 to enter into the dust box 121. The dust box opening for liquid surface cleaning 1216 may be provided at a side (e.g., front side) of the cleaning device 400 or at the top portion of the cleaning device 400 or at the bottom of the cleaning device 400. The dust box opening for liquid surface cleaning 1216 covers the floating position of the cleaning device 400 when the cleaning device 400 floats on the liquid surface 200, allowing garbage or other impurities on the liquid surface 200 to enter into the dust box 121 along with the liquid through the dust box opening for liquid surface cleaning 1216. The second intake 1032 is disposed at a position corresponding to a position which the dust box opening for liquid surface cleaning 1216 is located at. In this way, the garbage or other impurities on the liquid surface 200 enter into the dust box 121 along with the liquid through the second intake 1032 and the dust box opening for liquid surface cleaning 1216.

As illustrated in FIG. 27B, in one embodiment, the dust box 121 may further include a dust box opening cover plate for liquid surface cleaning 1219 and a dust box opening cover plate for underwater cleaning 1218. A regulating member for liquid surface cleaning may include the dust box opening cover plate for liquid surface cleaning 1219. A regulating member for underwater cleaning may include the dust box opening cover plate for underwater cleaning 1218. The dust box opening cover plate for liquid surface cleaning 1219 is configured to switch the dust box opening for liquid surface cleaning 1216 between an open state and a closed state. In a case that the dust box opening for liquid surface cleaning 1216 is in the opened state, liquid at the liquid surface 200 may enter the dust box 121 through the dust box opening for liquid surface cleaning 1216. In a case that the dust box opening for liquid surface cleaning 1216 is in the closed state, liquid at the liquid surface 200 may not enter the dust box 121 through the dust box opening for liquid surface cleaning 1216. The dust box opening cover plate for liquid surface cleaning 1219 is disposed above the dust box opening for liquid surface cleaning 1216, or in the dust box opening for liquid surface cleaning 1216, or at an inner side of the dust box opening for liquid surface cleaning 1216, or at an outer side of the dust box opening for liquid surface cleaning 1216. Similar to the dust box opening cover plate for liquid surface cleaning 1219, the dust box opening cover plate for underwater cleaning 1218 is configured to switch the dust box opening for underwater cleaning 1217 between an open state and a closed state. The dust box opening cover plate for underwater cleaning 1218 is disposed above the dust box opening for underwater cleaning 1217, or in the dust box opening for underwater cleaning 1217, or at an inner side of the dust box opening for underwater cleaning 1217, or at an outer side of the dust box opening for underwater cleaning 1217. In this way, in a case that the cleaning device 400 or the moving apparatus 100 performs the liquid surface cleaning, the dust box opening for liquid surface cleaning 1216 is switched to the open state through the dust box opening cover plate for liquid surface cleaning 1219, and the dust box opening for underwater cleaning 1217 is preferably in the closed state. In a case that the cleaning device 400 or the moving apparatus 100 performs the side wall cleaning or the bottom cleaning, the dust box opening for underwater cleaning 1217 is switched to the open state through the dust box opening cover plate for underwater cleaning 1218, and the dust box opening for liquid surface cleaning 1216 is preferably in the closed state.

Figure 26A:
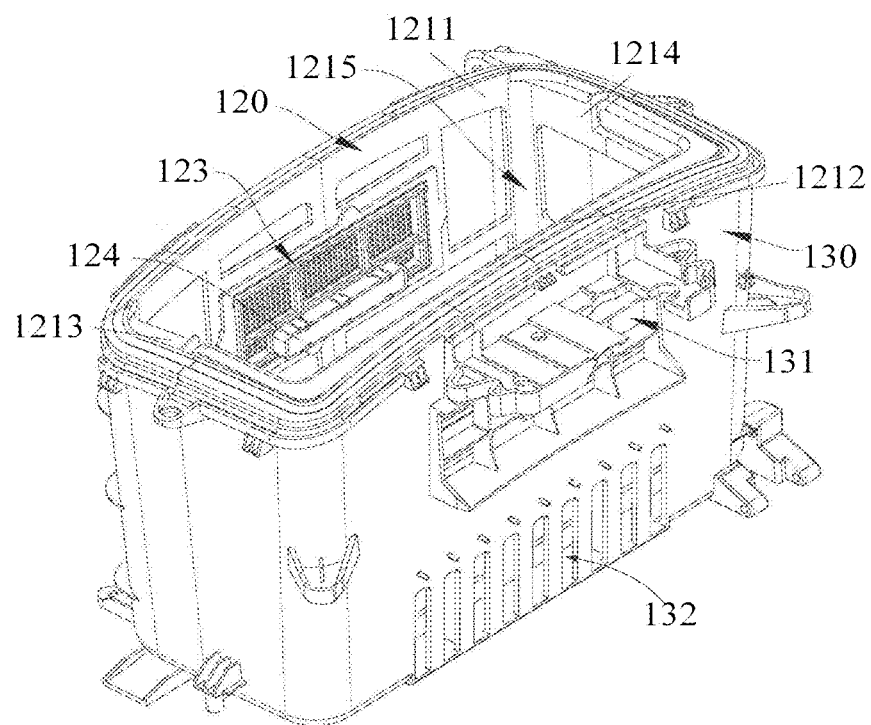
FIG. 26A is a schematic view of a portion of a cleaning device according to an embodiment of the present disclosure.

In one embodiment, as illustrated in FIG. 26A, at least one second fluid discharging port 132 is provided at or on a side wall of a dust box chamber 130. The second fluid discharging port 132 is connected to the first fluid discharging port 105. That is, the second fluid discharging port 132 is provided inside the cleaning device 400 so that the second fluid discharging port 132 is connected to the first fluid discharging port 105. A water barrier (not shown in the figure) may be provided at or on an outer side wall of the second fluid discharging port 132. When the cleaning device 400 is performing cleaning or in operation underwater or above or on the liquid surface 200 and the main pump 118 is turned on, the main pump 118 creates a negative pressure in the first chamber 1215 of the dust box 121 and the second chamber 131 of the dust box chamber 130. Liquid from underwater or the liquid surface 200 enters into the cleaning device 400 through the first fluid discharging port 105 and then applies a first pressure to the water barrier on the outer side wall of the dust box chamber 130 in a direction toward an interior of the dust box chamber 130. The first pressure is greater than a second pressure applied by the liquid in the dust box chamber 130 to the water barrier outward. Due to a pressure difference between the first pressure and the second pressure, the water barrier is enabled to tightly cover or close or block or seal the second fluid discharging port 132, which avoids the liquid in the dust box chamber 130 from being discharged through the second fluid discharging port 132, and consequently, from exiting the cleaning device 400 through the first fluid discharging port 105. When the cleaning device 400 is about to get out of the liquid (i.e., leaving the liquid surface 200), the main pump 118 is turned off so that the negative pressure created by the main pump 118 in the dust box chamber 130 and the dust box 121 is cancelled. During a process of the cleaning device 400 getting out of the liquid or after the cleaning device 400 gets out of the liquid, since the cleaning device 400 is lifted out of the liquid, the liquid outside of the dust box chamber 130 is discharged outside of the cleaning device 400 through the first fluid discharging port 105, thereby cancelling the first pressure applied on the dust box chamber 130. The liquid in the second chamber 131 of the dust box chamber 130 enables the water barrier to move in a direction away from the second fluid discharging port 132 under the force of gravity (especially when the cleaning device 400 is lifted at an angle), thereby exposing the second fluid discharging port 132. In this way, the liquid in the dust box chamber 130 and the dust box 121 quickly exits the cleaning device 400 sequentially through the second fluid discharging port 132 and first fluid discharging port 105, thereby accelerating a process of the cleaning device 400 discharging liquid, quickly reducing the weight of the cleaning device 400, and facilitating an improvement of the user experience. That is, the second fluid discharging port 132 and the first fluid discharging port 105 are connected to form a fourth flowing path for liquid flowing. However, during a process of the cleaning device 400 entering into liquid surface 200, liquid from underwater or the liquid surface 200 enters into the cleaning device 400 through the first fluid discharging port 105, which facilitates a rapid increase in the gravity of the cleaning device 400 to enable the cleaning device 400 to submerge quickly. During the process of the cleaning device 400 entering into the liquid surface 200, since the main pump 118 is turned on, the water barrier remains to cover or close or block or seal the second fluid discharging port 132. That is, the water barrier has a non-discharging state that covers or closes or blocks or seals the second fluid discharging port 132 and a discharging state that exposes the second fluid discharging port 132.

As for the water barrier, in one embodiment, the water barrier is made of a flexible waterproof material. One end of the flexible waterproof material is fixed to the outer side wall of the dust box chamber 130, while the other end of the flexible waterproof material is suspended and, under the pressure difference between the first pressure and the second pressure, remains to cover or seal or block or close the second fluid discharging port 132. During a process of the cleaning device 400 getting out of the liquid, the gravity of the liquid in the dust box chamber 130 causes the water barrier to rotate away from the second fluid discharging port 132, thereby exposing the second fluid discharging port 132. In another embodiment, the water barrier is movably provided on or at the outer side wall of the dust box chamber 130 through an elastic member. When the cleaning device 400 is underwater or at or above the liquid surface 200, the elastic member enables the water barrier to cover or block or seal the second fluid discharging port 132. During a process of cleaning device 400 getting out of the liquid, the gravity of the liquid in the dust box chamber 130 counteracts the force of the elastic member, enabling the water barrier to move away from the second fluid discharging port 132 to expose the second fluid discharging port 132. Alternatively, when the cleaning device 400 is underwater or on or above the liquid surface 200, the pressure difference between the first pressure and the second pressure stores energy in the elastic member, enabling the water barrier to cover or block or seal the second fluid discharging port 132. When the cleaning device 400 is getting out of the liquid, once the first pressure is cancelled, the elastic member discharges the stored energy, thereby enabling the water barrier to move away from the second fluid discharging port 132 to expose the second fluid discharging port 132.

When the cleaning device 400 is in the first motion state, the second motion state, or the third motion state, or when the cleaning device 400 is in a process of switching between the second motion state and the third motion state, since the main pump 118 is turned on, the water barrier covers or seals or blocks the second fluid discharging port 132. During a process of the cleaning device 400 switching between the first motion state and the second motion state, when the main pump 118 is not turned off, the water barrier remains to cover or block or seal the second fluid discharging port 132; or in order to allow the forward portion 401 of the cleaning device 400 to rotate upward or the rearward portion 402 of the cleaning device 400 to rotate downward, the main pump 118 may temporarily be turned off. However, since the main pump 118 is only turned off for a very short duration, the water barrier may still in the state that covers or blocks or seals the second fluid discharging port 132 due to the first pressure being greater than the second pressure.

In other words, the water barrier exposes the second fluid discharging port 132 only when the cleaning device 400 is getting out of the liquid. When the cleaning device 400 is in other states, the water barrier remains in a state that covers or blocks or seals the second fluid discharging port 132.

In one embodiment, as illustrated in FIG. 27B, the dust box 121 may further include the dust box roller brush assembly 1220. The dust box may include one or more dust box roller brush assemblies 1220. The dust box roller brush assembly 1220 is configured to, during performing the liquid surface cleaning, draw the garbage or other impurities in the pool into the dust box 121, so as to improve the efficiency of the liquid surface cleaning. The dust box roller brush assembly 1220 may be provided in a dust box opening for liquid surface cleaning 1216 or may be provided on an inside of the dust box opening for liquid surface cleaning 1216.

In one embodiment, the dust box roller brush assembly 1220 may also be provided outside of the dust box opening for liquid surface cleaning 1216 or may be provided on the dust box opening for liquid surface cleaning 1216.

The control member may be configured to control the cleaning device 400 to perform the liquid surface cleaning or the underwater cleaning for the pool. In one embodiment, the control member may obtain a target task for cleaning a target pool. The target task includes the liquid surface cleaning and the underwater cleaning. The control member determines a regulating parameter of the cleaning device 400 according to the target task and a current location of the cleaning device 400. Based on the regulating parameter, the control member controls the moving apparatus 100 to drive the cleaning device 400 to move to a target location to perform the target task.

The cleaning device 400 that is provided with the moving apparatus 100 may perform the cleaning to the bottom, the underwater, the liquid surface, and etc., of the pool in the all-round way, so as to ensure a comprehensive pool cleaning.

In one embodiment, as illustrated in FIG. 27A, the cleaning device 400 may further include the underwater roller brush 410. The underwater roller brush 410 may be configured to clean the target bottom 310 and/or the target side wall 320 of the pool. The cleaning device 400 may include one or more underwater roller brushes 410. The underwater roller brush 410 may be provided at the bottom of and/or on the side of the cleaning device 400. When the cleaning device 400 is moving on the bottom of the pool, the underwater roller brush 410 can clean the bottom of the pool (for example, clean impurities or algae). When the cleaning device 400 is moving on the side wall of the pool, the underwater roller brush 410 may further clean the side wall of the pool.

It should be noted that the above description of the cleaning device 400 and the individual components thereof is for descriptive convenience only and does not limit the present disclosure to the scope of the embodiments cited. It can be understood that it is possible for a person skilled in the art, with an understanding of the principle of the device, to make any combination of the individual members or to form subcomponents to connect to other members without departing from this principle.

Figure 26B:
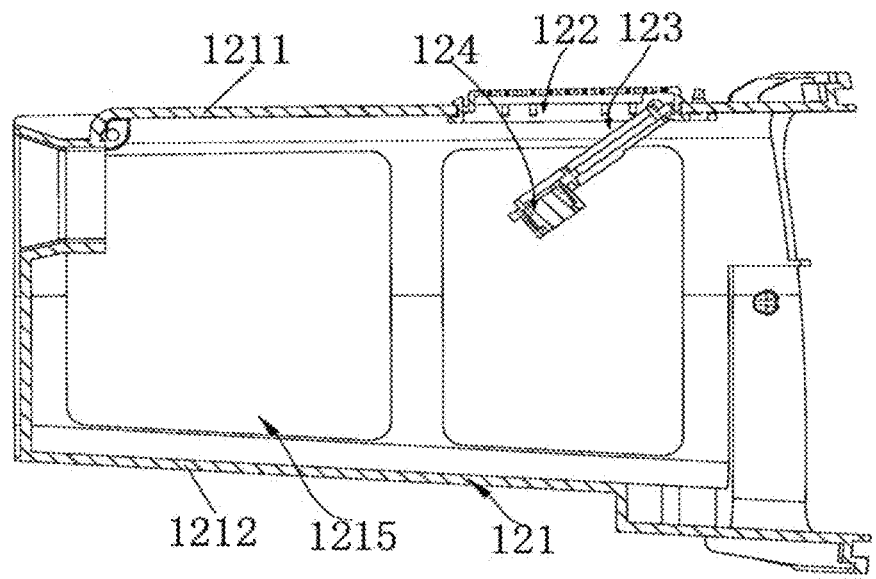
FIG. 26B is a sectional view of a dust box of a cleaning device according to an embodiment of the present disclosure.

In one embodiment, as illustrated in FIGS. 26A and 26B, the cleaning device body includes at least one dust box chamber 130. The filter mechanism includes at least one filter assembly 120. The filter assembly 120 includes the at least one dust box 121, a first filter layer, at least one fluid guiding opening 122, and a cover member 123. The dust box 121 includes a first chamber 1215. The dust box 121 is at least partially fixedly provided in the cleaning device 400. Due to the cleaning device 400 moving, the dust box 121 at least includes the first motion state and the second motion state. The first filter layer is provided at least on a side wall of the dust box 121. The first filter layer is connected to the first chamber 1215. The fluid guiding opening 122 is provided in the dust box 121 and/or the first filter layer. For example, the fluid guiding opening 122 may be provided in the dust box 121; or, the fluid guiding opening 122 may be provided in the first filter layer; or, the fluid guiding opening 122 may be provided in both the dust box 121 and the first filter layer. When the dust box 121 is in the first motion state, the cover member 123 seals and covers the fluid guiding opening 122. When the dust box 121 is in the second motion state, the cover member 123 is opened to expose the fluid guiding opening 122. It is understood that opening the fluid guiding opening 122 indicates that at least some water can flow out of the dust box from the fluid guiding opening 122. When the cleaning device 400 is in operation, since the dust box is fixedly provided in the exterior of the cleaning device 400, the first motion state, the second motion state, and the third motion state of the cleaning device 400 may further be referred to as a first motion state, a second motion state, and a third motion state of the dust box 121.

A dust box inlet portion of the dust box 121 is configured to allow water to enter the first chamber 1215. The first filter layer is configured for filtering. The water flows through the dust box inlet portion to enter the first chamber 1215 of the dust box 121, and the first filter layer filters impurities from the water. The filtered water enters the dust box chamber 130 of the filter assembly 120 and flows through the dust box chamber 130 to discharge from the cleaning device 400 through the main pump 118.

The first motion state or the third motion state described above may be a state of the filter assembly when the cleaning device 400 cleans an underwater bottom 310 or a liquid surface 200. In the first motion state or the third motion state, the filter assembly is in a normal state, the cover member 123 covers the fluid guiding opening 122. A thrust of the water normally flowing through the filter assembly is not sufficient to cause the cover member 123 to open the fluid guiding opening 122. The second motion state is a state of the filter assembly when the cleaning device 400 climbs a slope or an underwater wall or when the first filter layer is blocked. In the second motion state, the filter assembly is tilted or inverted or in an operating state along with the cleaning device 400, and the cover member 123 is opened to expose the fluid guiding opening 122, under the influence of a gravity of the cover member 123 and/or an external force, such as the thrust generated by water flowing. Both the third motion state and the first motion state are different from the second motion state.

When the dust box 121 is in the first motion state or the third motion state, the cover member 123 covers the fluid guiding opening 122, and the water in the first chamber 1215 flows out through the first filter layer of the dust box, such that an influence in a cleaning effect of the cleaning device 400 is reduced, enabling the cleaning device 400 to achieve the cleaning function appropriately.

When the filter assembly 120 is in the second motion state, the cover member 123 gradually is opened to expose the fluid guiding opening 122. At least a portion of the water in the first chamber 1215 flows out directly through the fluid guiding opening 122, increasing the amount of water discharged from the dust box. In this way, when the cleaning device 400 is climbing the wall or the slope or when the first filter layer is blocked to a certain extent, requirements for the amount of water intaken into the main pump 118 can always be satisfied. Therefore, the cleaning device 400 can climbing the wall or the slope or operate stably, such that the cleaning device 400 can be applied to more situations, such as underwater cleaning or liquid surface cleaning, and etc.

For example, in a case when the filter assembly 120 is operating in the first motion state or the third motion state, when stains on the first filter layer has not blocked the first filter layer to a certain extent, the filter assembly operates normally. When the cleaning device 400 is climbing the wall or the slope, the cover member 123 is moved or opened, by the gravity of the cover member 123 or by an external force, to expose the fluid guiding opening 122, allowing the cleaning device 400 to stably climb the wall or the slope.

In the case when the filter assembly 120 is operating in the first motion state or third motion state, when stains on the first filter layer has blocked the first filter layer to a certain extent, the filter assembly cannot operate normally. In this case, the cover member 123 is opened to expose the fluid guiding opening 122, such that demands of the amount of water intaken into the main pump 118 are increased, allowing the cleaning device 400 to operate stably, and subsequently, to operate to climb the slope or the wall.

When the cleaning device 400 is climbing the slope, the cover member 123 is moved or opened, by the gravity of the cover member 123 or by the external force, to expose the fluid guiding opening 122, allowing the cleaning device 400 to stably climb the wall or the slope.

Therefore, the first chamber 1215, the fluid guiding opening 122, and the cover member 123 of the dust box cooperate with each other, such that when the dust box is in the first motion state or the third motion state, the cover member 123 covers the fluid guiding opening 122 to reduce an influence on the cleaning effect of the cleaning device 400. When the dust box 121 is in the second motion state, the cover member 123 exposes the fluid guiding opening 122, increasing the amount of water output from the first chamber 1215 and increasing the amount of water intaken into the main pump 118. In this way, the thrust of the cleaning device 400 is improved, such that wall climbing or slope climbing or operating performance of the cleaning device 400 is improved, and the usage experience is improved.

The above-described fluid guiding opening 122 includes one fluid guiding sub-opening. The fluid guiding opening 122 may also include more than two fluid guiding sub-openings, such as two fluid guiding sub-openings, three fluid guiding sub-openings, a plurality of fluid guiding sub-opening, and etc. The number of the fluid guiding sub-opening can be determined according to the actual situations. When the number of the fluid guiding sub-opening is more than one, the amount of water output from the fluid guiding opening 122 formed by the more than one fluid guiding sub-openings needs to be substantially equal to the amount of water output from the fluid guiding opening 122 formed by one fluid guiding sub-opening. In this way, the amount of water output from the fluid guiding opening 122 is consistent. Therefore, the requirements for the amount of water intaken into the main pump 118 can always be satisfied when the cleaning device 400 is climbing the wall or the slope or when the first filter layer is blocked to a certain extent, such that the wall climbing or slope climbing or operating performance of the cleaning device 400 is maintained stably.

The number of the fluid guiding opening 122 may be one, two, three, or four, and etc., which is not limited herein. A peripheral side of the dust box is hollowed. The first filter layer is disposed at a hollowed region. The fluid guiding opening 122 may be provided at the hollowed region of the dust box or at other locations of the dust box other than the hollowed regions. The fluid guiding opening 122 may also be provided on the first filter layer. When the fluid guiding opening 122 is provided on the first filter layer, a periphery of the fluid guiding opening 122 is provided by the dust box, such that the cover member 123 covers or exposes the fluid guiding opening 122 more stably.

In some embodiments, the above-mentioned cover member may be driven by a drive assembly. The drive assembly is connected to the cover member 123 to allow the cover member 123 to cover and open to expose the fluid guiding opening 122. The drive assembly may include a drive motor. The drive motor is connected to the cover member 123 to control a movement of the cover member 123. A related structure may also be arranged on the cover member 123, so that the cover member 123 is driven by the cooperation of the cover member 123 and the related structure to allow the cover member 123 to cover and open to expose the fluid guiding opening 122. In other embodiments, the cover member 123 may cover and open to expose the fluid guiding opening 122 by other means, which is not limited herein. The cover member 123 may be a cover plate, or a flipping plate, and etc.

The above-described cover part may be mounted on the dust box. The cover member 123 may be mounted to the dust box 121, by pivoting, telescoping, or hinging, and etc., to cover or expose the fluid guiding opening 122.

In one embodiment, the cover member 123 is pivotally connected to the dust box 121. When the cover member 123 is pivotally connected to the dust box 121, the cover member 123 is enabled to be driven by a reduced driving force to cover and expose the fluid guiding opening 122. The filter assembly 120 further includes a second regulating member 124 mounted to the cover member 123. The second regulating member 124 is disposed away from a pivotal connection between the cover member 123 and the dust box 121. A mounting position of the second regulating member 124 is located away from the pivotal connection between the cover member 123 and the dust box 121. The second regulating member 124 assists in enabling the cover member 123 to cover or expose the fluid guiding opening 122.

In the first motion state or the third motion state, a pivot point that the cover member 123 rotates around the dust box 121 is located on an acting line of a sum of the gravity and the buoyancy force applied on the cover member 123 and the second regulating member 124. That is, a rotation moment of the cover member 123 rotating around the dust box 121 is zero. Therefore, the cover member 123 does not pivot but remains in a substantially vertical state, such that the cover member 123 properly covers the fluid guiding opening 122.

In the second motion state, the filter assembly 120 is tilted or inverted upside down, and the pivot point that the cover member 123 rotates around the dust box 121 deviates from the acting line of the sum of the gravity and the buoyancy force applied on the cover member 123 and the second regulating member 124. That is, the rotation moment of the cover member 123 rotating around the dust box 121 is not zero, such that the cover member 123 is forced by the rotation moment to rotate and expose the fluid guiding opening 122. The second regulating member 124 may have different densities, as long as the second regulating member 124 can assist in driving the cover member 123 to move. A specific structure of the second regulating member 124 is not limited herein. In another second motion state, when the first filter layer of the filter assembly 120 is blocked and the filter assembly 120 is not obviously tilted or inverted upside down, a pumping action of the main pump 118 generates a large pressure difference between the dust box chamber 130 and the first chamber 1215. The cover member 123, which is adapted for responding to the pressure difference, can be driven to expose the fluid guiding opening 122 to balance the above pressure difference.

Through arranging the above-described second regulating member 124 and positioning the second regulating member 124 on the cover member 123, the cover member 123 is enabled to cover or expose the fluid guiding opening 122 more quickly, and furthermore, the amount of water discharged from the first chamber 1215 is increased, such that the amount of water intaken into the main pump 118 is increased. In this way, the wall climbing or slope climbing or operating performance of the cleaning device 400 are improved. In addition, the cover member 123 is enabled to be switched autonomously between the first motion state or the third motion state and the second motion state, therefore, the drive assembly are less used, and costs are saved.

Specifically, the cover member 123 includes a first end and a second end opposite to the first end. When the filter assembly 120 is in the first motion state or the second motion state, the first end is located at an uppermost end of the cover member 123, and the second end is located at a lowermost end of the cover member 123. Both the first end and the second end may be configured to be pivotally connected to the dust box 121. However, since the first end and the second end are disposed at different positions, a force applied on the cover member 123 when the first end is pivotally connected to the dust box 121, is different from a force applied on the cover member 123 when the second end is pivotally connected to the dust box. In order to allow the fluid guiding opening 122 to be covered in the first motion state or the third motion state and to be exposed in the second motion state, when the first end or the second end is pivotally connected to the dust box 121, the arrangement of the second regulating member 124 needs to be regulated in order to facilitate the force applied on the cover member 123.

It is understood that the cover member 123 of the filter assembly 120 in some embodiments of the present disclosure is further provided with a second filter layer. When the cover member 123 is not opened, the second filter layer filters impurities to avoid the second filter layer from affecting the normal operation of the cleaning device 400 due to the arrangement of the cover member 123. A position at which the second filter layer is arranged needs to avoid the position at which the second regulating member 124 is arranged. A specific position and a form of the second filter layer are not limited herein.

The cover member 123 may be movably connected to the cleaning device 400. For example, the cover member 123 may be mounted on a component of the cleaning device 400 other than the dust box 121 by pivoting, telescoping, hinging, and etc. the cover member 123 is configured to cover or expose the fluid guiding opening 122. A structure of the cover member 123 that is pivotally connected to the cleaning device 400 is the same as the structure of the cover member 123 that is pivotally connected to the dust box 121 as described above, which will not be repeated herein. That is, the cover member 123 may be provided at various positions, which is determined based on actual situations.

In some embodiments, the cleaning device 400 includes a filter assembly, which is the filter assembly 120 described in the above embodiments, which will not be repeated herein. Through arranging the above-described filter assembly 120, the influence to the cleaning effect of the cleaning device 400 is reduced the amount of water intaken into the main pump 118 is increased, thus the thrust of the cleaning device 400 is increased. Therefore, the wall climbing or slope climbing or operating performance of the cleaning device 400 are improved, and the usage experience is improved.

In one embodiment, a dust box inlet portion is formed in the dust box 121. The dust box inlet portion is connected to the first chamber 1215. That is, the water flows through the dust box inlet to enter the first chamber 1215. The cleaning device 400 further includes the main pump 118. The main pump 118 is disposed outside the dust box 121. The main pump 118 is connected to the first chamber 1215 of the dust box 121. The main pump 118 provides a driving force to drive the water to flow and guides a flowing direction of the water.

When the filter assembly 120 is in the first motion state or the third motion state, the cover member 123 covers the fluid guiding opening 122. The main pump 118 is configured to guide the water to flow through the dust box inlet portion, the first chamber 1215, and the first filter layer, sequentially, to further enter the main pump 118. That is, the main pump 118 is configured to guide the water in the pool to flow through the dust box inlet portion to enter the first chamber 1215. The water in the first chamber 1215 flows through the first filter layer of the dust box 121 to enter the main pump 118. In other words, in a case that the moving apparatus 100 is in the first motion state, the first intake 1031, the dust box inlet portion (i.e., the dust box opening for underwater cleaning 1217), the first chamber 1215, the first filter layer, and the main pump 118 are sequentially connected to form the first path. In a case that the moving apparatus 100 is in the third motion state, the second intake 1032, the dust box inlet portion (i.e., the dust box opening for liquid surface cleaning 1216), the first chamber 1215, the first filter layer, and the main pump 118 are sequentially connected to form the third flowing path.

When the filter assembly is in the second motion state, the cover member 123 being opened exposes the fluid guiding opening 122. The main pump 118 is configured to guide at least a portion of the water to flow through the dust box inlet portion, the first chamber 1215, and the fluid guiding opening 122, sequentially, to further enter the main pump 118. In other words, the first intake 1031, the dust box inlet portion (i.e., the dust box opening for underwater cleaning 1217), the first chamber 1215, the fluid guiding opening 122, and the main pump 118 are sequentially connected to form the second flowing path. That is, the main pump 118 is configured to guide the water in the pool to flow through the dust box inlet portion to enter the first chamber 1215. At least a portion of the water in the first chamber 1215 flows directly into the main pump 118 through the fluid guiding opening 122. Another portion of the water flows through the first filter layer to enter the main pump 118.

Therefore, the main pump 118 provides a driving force to drive the water to flow and limits the flowing direction of the water, and demands for the amount of water intaken into the main pump 118 can always be satisfied. Therefore, the wall climbing or slope climbing or operating performance of the cleaning device 400 can be maintained stably.

In one embodiment, as illustrated in FIG. 26A, the cleaning device 400 includes the dust box chamber 130. The dust box chamber 130 is provided with a second chamber 131. The filter assembly 120 is provided in the second chamber 131. The second chamber 131 is connected to the first chamber 1215 of the dust box 121 in the filter assembly 120. For example, the second chamber 131 may be connected to the first chamber 1215 through the first filter layer and the fluid guiding opening 122. The main pump 118 is disposed outside the dust box chamber 130. The dust box inlet portion is formed between the dust box 121 and the dust box chamber 130. The dust box inlet portion is connected to the first chamber 1215. That is, water flows through the dust box inlet portion to enter the first chamber 1215. A location and an arrangement of the dust box inlet portion are not limited herein, as long as the water can directly enter the first chamber 1215 through the dust box inlet portion.

When the cleaning device 400 is placed into the pool, the main pump 118 is configured to guide water in the pool to flow through the dust box inlet portion to enter into the first chamber 1215, and subsequently, the water is guided to be filtered by the first filter layer to further flow into the second chamber 131. Furthermore, the water flows through the second chamber 131 to enter the main pump 118.

When the filter assembly 120 is in the first motion state or the third motion state, the cover member 123 covers the fluid guiding opening 122. The main pump 118 is configured to guide water to flow through the dust box inlet portion, the first chamber 1215, the first filter layer, and the second chamber 131, sequentially, to further enter the main pump 118. That is, the main pump 118 is configured to guide the water in the pool to flow from the dust box inlet portion into the first chamber 1215. The water in the first chamber 1215 flows through the first filter layer of the dust box 121 to enter the second chamber 131, and subsequently, the water flows through the second chamber 131 to enter the main pump 118. The first motion state or the third motion state is a state of the dust box 121 when the cleaning device 400 is moving along a direction substantially perpendicular to a direction of the gravity. The first motion state or the third motion state may also be a state in which the cleaning device 400 is disposed at a certain tilting angle that fails to enable the cover member 123 to be moved, by the gravity of the cover member 123 or by any external force, to expose the fluid guiding opening 122.

When the dust box 121 of the filter assembly 120 is in the second motion state, the cover member 123 is opened to expose the fluid guiding opening 122. The main pump 118 is configured to guide at least a portion of the water to flow through the dust box inlet portion, the first chamber 1215, the fluid guiding opening 122, and the second chamber 131, sequentially, to further enter the main pump 118. In other words, the first intake 1031, the dust box inlet portion, the first chamber 1215, the fluid guiding opening 122, the second chamber 131, and the main pump 118 are sequentially connected to form the second flowing path. That is, the main pump 118 is configured to guide the water in the pool to flow from the dust box inlet portion into the first chamber 1215. At least a portion of the water in the first chamber 1215 flows through the fluid guiding opening 122 to directly enter the second chamber 131. Another portion of the water in the first chamber 1215 flows through the first filter layer to enter the second chamber 131. Then, the water in the second chamber 131 enters the main pump 118.

Through disposing the dust box chamber 130 in the cleaning device 400, the water can be concentrated in the second chamber 131 and concentratedly flows into the main pump 118, improving the demand of the amount of water intaken into the main pump 118 and further improving the wall climbing or slope climbing or operating performance of the cleaning device 400. The dust box chamber 130 is provided with a water outlet. The water outlet is connected to the main pump 118. The water outlet may be provided on a side wall of the dust box chamber 130 near the main pump 118. The water outlet may also be provided at other locations of the dust box chamber 130. The location of the water outlet is not limited herein.

In one embodiment, the cover member 123 is pivotally connected to the dust box chamber 130. A structure of the cover member 123 pivotally connected to the dust box chamber 130 is the same as a structure of the cover member 123 pivotally connected to the dust box 121, which will not be described herein. Through providing the cover member 123 on the dust box chamber 130, a resistance that is applied by the cover member 123 against the water flow may be reduced, thereby enabling the water to flow out of the dust box 121 more smoothly. For example, the cover member 123 may be provided on the side wall of the dust box chamber 130 to cover or expose the fluid guiding opening 122.

In a case that the cover member 123 is opened to expose the fluid guiding opening 122, during a process of the cleaning device 400 switching from the second motion state to the first motion state, the cover member 123, due to its own structural, can be automatically reset to cover the fluid guiding opening 122. Obviously, a reset assembly may be disposed between the cover member 123 and the dust box 121 or between the cover member 123 and the dust box chamber 130. Resetting can be achieved quickly by the reset assembly. The reset assembly may be a torsion spring, a spring, or a tension spring, and etc., which is not limited herein.

In one embodiment, the cleaning device 400 further includes a flipping cover member. The dust box chamber 130 is provided with an opening. The flipping cover member is disposed to cover the opening to seal the dust box chamber 130. The flipping cover member is disposed on a top portion of the dust box chamber 130. The fluid guiding opening 122 is located at a top portion of the dust box 121. In this case, the dust box 121 is partially hollowed and provides with the fluid guiding opening 122. The cover member 123 is movably connected to the flipping cover member to cover or expose the fluid guiding opening 122 of the dust box 121.

That is, besides being provided on the dust box chamber 130. The cover member 123 may be also provided on the flipping cover member.

In other embodiments, the dust box 121 is provided in a cubic form. In this case, the dust box 121 includes a first side 1a, a second side 1b, a third side 1c, and a fourth side 1d. The first side 1a and the second side 1b are provided in opposite. The third side 1c and the fourth side 1d are provided in opposite. When the top portion of the dust box 121 further includes a fifth side, the cover member 123 may be movably mounted to a top cover housing of the cleaning device 400. The top cover housing is an outermost housing of the cleaning device 400. When the top cover housing is opened, the filter assembly 120 can be removed from the cleaning device 400 to be cleaned or replaced. the cover member 123 is configured to cover or expose the fluid guiding opening 122 provided on the fifth side.

In another embodiment, the fifth side is provided with the fluid guiding opening 122. The cover member 123 may be movably mounted to the fifth side to cover or expose the fluid guiding opening 122.

In one embodiment, the cover member 123 is further provided with the second filter layer. The second filter layer is connected to the first chamber 1215 and the second chamber 131. The second filter layer is configured for filtering. When the filter assembly 120 is in the first motion state or the third motion state, the cover member 123 covers the fluid guiding opening 122. The water in the pool may flow through the dust box inlet portion to enter the first chamber 1215. The water in the first chamber 1215 flows through the first filter layer on the dust box 121 or the second filter layer on the cover member 123 to enter the second chamber 131. Subsequently, the water flows through the second chamber 131 to enter the main pump 118. Therefore, through providing the second filter layer on the cover member 123, the cleaning efficiency of the cleaning device 400 is improved. A structure of the second filter layer may be the same as or different from the structure of the first filter layer, which is not limited herein.

Since a size of the garbage on the liquid surface 200 is larger than a size of the garbage under the liquid surface 200, a size of a filter hole of the first filter layer of the filter assembly 120 when the cleaning device 400 is performing the liquid surface cleaning is larger than a size of a filter hole of the first filter layer of the filter assembly when the cleaning device 400 is performing the underwater cleaning. In some embodiments, the dust box may be provided with two or more first filter layers. The cover member 123 is configured to cover or expose the fluid guiding opening 122 provided on the filter assembly 120. When the cleaning device 400 is performing underwater cleaning, the cover member 123 covers the fluid guiding opening 122. The plurality of first filter layers are stacked to perform the filtering, such that a filtering efficiency of the underwater cleaning is increased. When the cleaning device 400 is performing the liquid surface cleaning, the cover member 123 at least partially exposes the fluid guiding opening 122. The fluid guiding opening 122 reduces the number of the first filter layers. In this way, larger-sized garbage on the liquid surface 200 can be filtered easily, thereby reducing the likelihood of the larger-sized garbage blocking the plurality of first filter layers. A structure, an arrangement, and a position of the cover member 123 are the same as those as described in the above, which are not repeated herein.

In some embodiments, the cleaning device 400 includes a moving propulsion mechanism and a cleaning mechanism. The moving propulsion mechanism includes a transmission assembly. The transmission assembly includes a moving drive member, a first driven member, and a second driven member. The cleaning mechanism includes a first cleaning member and a second cleaning member. The first cleaning member is configured to draw garbage below the liquid surface 200 into the filter mechanism. The second cleaning member is configured to draw garbage on the liquid surface 200 into the filter mechanism. For example, in the present embodiment, the first cleaning member is an underwater roller brush and the second cleaning member is the surface roller brush.

Through arranging the moving drive part, the first driven part, and the second driven part, the moving drive part may be enabled to drive the wheel, the first cleaning member, and the second cleaning member, realizing a simply driving structure and a low manufacturing cost. The wheel is driven by the moving drive member to rotate and move forward or backward. The first driven member and the second driven member may be driven to rotate along with the wheel, enabling the first cleaning member and the second cleaning member to be, respectively, further driven by the first driven member and the second driven member to rotate, thereby realizing the operation of different cleaning members and diversify the cleaning function of the cleaning device 400. For example, the transmission assembly drives the wheel to rotate, and then the underwater roller brush 410 and the surface roller brush are further driven by the wheel to rotate, thereby diversify the cleaning function of the cleaning device 400. In one embodiment, the underwater roller brush and the surface roller brush rotate in a same direction. In some embodiments, the wheel includes a first wheel, a second wheel, and a track. The first wheel and the second wheel are connected in transmission through the track. The first wheel is connected to and driven by an output end of the moving drive member. Specifically, two first wheels and two second wheels are provided in the present embodiment. The two first wheels are provided at the forward portion of the cleaning device body and the two second wheels are provided at the rearward portion of the cleaning device body.

For example, the moving drive member in the present embodiment includes a moving drive motor. The transmission assembly further includes a first gear. The output end of the moving drive member is connected to the first gear. The first gear engages with the first wheel, which enables the first gear to drive the first wheel to rotate. Alternatively, the moving drive member may be realized by any other component that can provide an energy of motion, which is not limited herein.

Furthermore, the cleaning device 400 in the present embodiment includes two transmission assemblies, two first wheels, and two second wheels. Each transmission assembly includes at least one first driven member, at least one moving drive member, and at least one second driven member The cleaning device body further includes the liquid intake portion 103. The at least one cleaning member is configured to broaden the cleaning range of liquid intake portion 103. The cleaning member may be a side brush. The liquid intake portion 103 is configured to draw water flows, or stains, and etc., into the cleaning device body. The side brush is provided on a side wall or the bottom of the cleaning device body. When the cleaning device 400 is moving along an edge of the pool, the cleaning device 400 may clean the edge of the pool or an area at the edge of the pool. A cleaning material is provided on the side brush. The side brush is moved by a self-rotating or reciprocating motion to clean a to-be-cleaned object. The stains may include garbage floating on the pool, scale or black stains accumulated in the pool, and etc. The cleaning range of the liquid intake portion 103 is a range in which the liquid intake portion 103 may affect the water flow and the stains when the liquid intake portion 103 is in the state of drawing in the water flow and the stains. The liquid intake portion 103 may be provided on a front wall of the cleaning device body. Along an opening direction of the liquid intake portion 103, at least one cleaning member is arranged in front of the liquid intake portion 103. For example, the at least one cleaning member is provided on a left side wall and/or a right side wall of the cleaning device body and extends toward the front wall. Moreover, the cleaning member is inclined towards the liquid intake portion 103. The self-rotating direction of the cleaning member is in a direction toward the liquid intake portion 103, such that the cleaning member can stir the water flow and the stains outside the cleaning range of the liquid intake portion 103 to guide the water flow and the stains to the liquid intake portion 103.

In one embodiment, the cleaning device 400 further includes a position detection mechanism for detecting placement of the dust box. The position detection mechanism is configured to detect whether the dust box is mounted in place properly on the cleaning device body, which ensures the cleaning device 400 to operate normally only after the dust box is mounted in place properly. In this way, any user misoperation, any ineffective cleaning, or a reduced cleaning effect are avoided and an intelligence of the cleaning device 400 is improved.

While ensuring the cleaning effect of the cleaning device 400, the position detection mechanism is disposed to further avoid rigid impurities from being intaken into a main pump impeller, such that the main pump impeller is avoided from being broken or entangled, and the cleaning device 400 is avoided from being malfunctioned. Safety of the cleaning device 400 is improved, and a service life of the cleaning device 400 is extended. The position detection mechanism includes at least one of a sensing assembly, an inductive assembly, and a switch assembly, which may be determined based on actual situations.

In some embodiments, the position detection mechanism further includes an alarm member. The alarm member may provide an alarm when the dust box is not mounted in place, reminding the user to check a position of the dust box in time to avoid malfunction.

As mentioned above, the cleaning device 400 may realize the cleaning of the pool in various circumstances, such as the bottom cleaning, the side wall cleaning, the surface cleaning, the liquid line cleaning, a water treatment at a predetermined depth of the pool, and the like.

When the cleaning device 400 is performing the bottom cleaning or the side wall cleaning, water flow with dust is drawn through the first intake 1031 at the bottom of the cleaning device 400 to the dust box opening for underwater cleaning 1217 of the filter mechanism and enters the interior of the filter mechanism to be filtered. Subsequently, the water flow is discharged outside the cleaning device body through the liquid outlet portion 104. In addition, the at least one first cleaning member located at the bottom of the cleaning device 400 cleans the bottom or the side wall of the pool. When the cleaning device 400 is performing the liquid line cleaning, the at least one first cleaning member of the cleaning device 400 brushes the liquid line along the side wall. In this way, the stains adhering to the liquid line are brushed off from the liquid line and fall to the bottom of the pool or are partially drawn into the filter mechanism of the cleaning device 400 through the first intake 1031.

When the cleaning device 400 is cleaning the liquid surface 200, through providing at least one dust box opening for liquid surface cleaning 1216 (may be the same as the dust box opening for underwater cleaning 1217) on the cleaning device 400, garbage floating on the surface is drawn into the filter mechanism of the cleaning device 400. In addition, due to the influence of wind on the surface, garbage may be blown to the side wall or corner of the pool. Due to the limitation of the structure, when the cleaning device 400 is performing the cleaning, the garbage at the side wall or corner of the pool, may likely not be cleaned. In this case, a nozzle may be provided on the cleaning device 400 to blow the garbage away from the side wall or corner of the pool to the cleaning range of the dust box opening for liquid surface cleaning 1216, thereby improving the cleaning efficiency.

In a case that the filter mechanism has a mesh screen structure, the filter mechanism may likely be blocked by garbage, floating algae, and etc., in the water during operation, resulting in a lack of water flow, thereby affecting the amount of water discharged from the cleaning device 400. When the cleaning device 400 is moving at the bottom or the side wall of the pool, the discharged water provides a counterthrust for the cleaning device 400 to closely abut against or touch the bottom 310 or the side wall 320 and to move along the bottom 310 or the side wall 320. Especially when the cleaning device 400 is operating along the side wall of the pool, due to an insufficient counterthrust, the cleaning device 400 may be likely to be tumbled. Therefore, the second flowing path may be provided on the filter mechanism, so as to respond to the blocking of the mesh screen structure in the filter mechanism and ensure the cleaning device 400 to remain operating stably along the side wall 320.

In some cases, since the first cleaning part is limited by the structure of the cleaning device 400 and the effective cleaning range of the cleaning device 400, some specific regions are difficult to be cleaned, such as a certain range within the intersection between the bottom and the side wall of the pool, a certain range within the intersection between side walls of the pool, and etc. In this case, the cleaning of the above specific regions can be realized by providing at least one rotating brush on the cleaning device 400. In order to ensure that during the normal operation of the cleaning device 400, disposing the rotating brush may not affect the operation of the cleaning device 400, the rotating brush may be disposed in a retractable manner. For example, the rotating brush may be controlled to extend when the rotating brush is needed to clean. The rotating brush may be controlled to retract back into the cleaning device 400 when the rotating brush finishes cleaning. In one embodiment, the cleaning device 400 may further include the main roller brush. The main roller brush is configured to clean the bottom 310 and/or the side wall 320 of the pool. The cleaning device 400 can include one or more main roller brushes. The main roller brush may be provided on the bottom and/or sides of the cleaning device 400. One main roller brush may be provided at each of a front end and a rear end of the bottom of the cleaning device 400. The main roller brush may clean the bottom 310 of the pool (e.g., brushing away impurities or algae) when the cleaning device 400 moves on the bottom 310 of the pool. The main roller clean may further clean the side wall 320 of the pool when the cleaning device 400 moves on the side wall 320 of the pool.

FIG. 13 is a flowchart of a cleaning device control method according to some embodiments of the present disclosure. The cleaning device 400 includes a forward portion 401 and a rearward portion 402. The cleaning device 400 is adapted to operate in the water. The cleaning device 400 at least includes an intake port, a mode switching member 110, a control system, a moving mechanism, and a propulsion mechanism. The mode switching member 110 includes a buoyancy cavity 111, a first regulating member 112, and a first injection port 113. The control system is respectively connected to the first regulating member 112, the moving mechanism, and the propulsion mechanism through a signal connection. The intake port is configured to perform the cleaning operation of the cleaning device in the third motion state. The method of the present embodiment includes the following operations.

At operation S131, controlling a cleaning device to operate in a second motion state until a first injection port is at least partially located above a liquid surface.

At operation S132, controlling a first regulating member to be turned on to enable gas to be injected into a buoyancy cavity so that a rearward portion of the cleaning device moves toward the liquid surface until the cleaning device finishes to be switched from the second motion state to a third motion state.

In the present embodiment, the first regulating member 112 is controlled to be turned on to enable gas to be injected into the buoyancy cavity 111 and the rearward portion 402 of the cleaning device 400 is controlled to move toward the liquid surface 200 of the water until the cleaning device 400 finishes to be switched from the second motion state to the third motion state. The second motion state includes a state where the cleaning device 400 is moving on the side wall 320. The third motion state includes a state where the intake port of the cleaning device 400 is at least partially located above or near the liquid surface 200. The cleaning device 400 climbs upward along the side wall 320 or in a direction substantially parallel to the side wall 320 to the liquid line 201. In this way, the first injection port 113 of the cleaning device 400 is exposed above the liquid surface 200, the first regulating member 112 regulates the volume of gas to be injected into the buoyancy cavity 111 through the first injection port 113. Since the volume of the gas in the buoyancy cavity 111 increases, the buoyancy force applied on the cleaning device 400 increases. Since the forward portion 401 of the cleaning device 400 has already been at least partially exposed above the liquid surface 200. In this case, the rearward portion 402 of the cleaning device 400 floats upward and the cleaning device 400 begins moving from the vertical state to the substantially horizontal state, until the rearward portion 402 of the cleaning device 400 is at least partially located above the liquid surface 200 or the rearward portion 402 at least moves a certain in a distance toward the liquid surface 200 with respect to a position which the rearward portion 402 of the cleaning device 400 is located on when the cleaning device 400 is in the second motion state and the cleaning device 400 is in the third motion state.

In one embodiment, as illustrated in FIG. 14, a structural block view of a computer-readable storage medium according to some embodiments of the present disclosure is provided.

The computer-readable storage medium 140 stores a program instruction 141. When the program instruction 141 is executed by a processor, the processor is caused to perform the operations according to any one of the method embodiments above.

The computer-readable storage medium 140 may specifically be a medium that can store a computer program, such as a USB flash drive, a removable hard disk, a read-only memory (ROM), a random access memory (RAM), a magnetic disk, or a CD-ROM, or may also be a server that stores the computer program. The server may send the stored computer program to other devices to be executed or may also execute the stored computer program itself.

When the technical solution provided by the present disclosure involves personal information, any product applying the disclosed technical solution shall clearly inform individuals of the rules for handling personal information and obtain their consent before processing such information. When the disclosed technical solution involves sensitive personal information, the product shall obtain the individual's consent before processing the sensitive personal information and meet the requirement for "explicit consent". For example, a clear and prominent sign needs to be placed at a personal information collection device, such as, a camera, to inform individuals that they are entering an area where personal information will be collected. When an individual voluntarily enters such area, it is considered as a consent to the collection of their personal information. The consent may also be obtained through a pop-up message or by asking individuals to upload their personal information themselves, provided that the rules for processing personal information are clearly communicated, such as details on the personal information processor, the purpose of processing, the processing method, and the types of personal information being processed.

The above description describes only implementations of the present disclosure and is not intended to limit the scope of the present disclosure. Any equivalent structure or equivalent process transformation performed based on the contents of the specification and the accompanying drawings of the present disclosure, applied directly or indirectly in other related technical fields, shall all be equivalently included in the scope of the present disclosure.

What is claimed is:

1. A swimming pool robot, comprising:
  a liquid intake portion, comprising at least a first intake, wherein the first intake is located at a bottom of the swimming pool robot, and the first intake is configured for liquid to enter the swimming pool robot for the swimming pool robot to clean a bottom or a side wall of a swimming pool; and
  a mode switching member, wherein the mode switching member comprises:
    a buoyancy cavity configured to accommodate at least gas;
    a first regulating member configured to regulate a volume of the gas in the buoyancy cavity; and
    a first injection port communicating with the buoyancy cavity to at least allow external gas to enter the buoyancy cavity,
  wherein the first injection port is provided on or at a forward portion of the swimming pool robot; during a process of switching the swimming pool robot from a first motion state to a third motion state, the swimming pool robot is first switched from the first motion state to a second motion state and subsequently switched from the second motion state to the third motion state; and no matter whether when the swimming pool robot is in the first motion state or when the swimming pool robot is in the third motion state, the first intake faces the bottom of the swimming pool,
  wherein a process of switching the swimming pool robot from the second motion state to the third motion state at least comprises a process in which the external gas enters the buoyancy cavity through the first injection port under an action of the first regulating member to increase the volume of the gas in the buoyancy cavity, and a rearward portion of the swimming pool robot rotates toward a liquid surface, wherein the first motion state is defined as a state where the swimming pool robot moves on the bottom of the swimming pool, the second motion state is defined as a state where the swimming pool robot touches or abuts against the side wall of the swimming pool, and the third motion state is defined as a state where the swimming pool robot floats on the liquid surface.

2. The swimming pool robot according to claim 1, wherein there are at least two buoyancy cavities, wherein at least one buoyancy cavity is disposed at the forward portion of the swimming pool robot, and at least one buoyancy cavity is disposed at the rearward portion of the swimming pool robot.

3. The swimming pool robot according to claim 1, wherein the first injection port is located inside the forward portion of the swimming pool robot, a connecting port is provided at a front side wall of the swimming pool robot, and the connecting port is configured for an external environment to communicate with the first injection port.

4. The swimming pool robot according to claim 1, wherein the buoyancy cavity is flexible, and the first regulating member comprises a pump, wherein when the swimming pool robot is in the second motion state, the buoyancy cavity is in an empty or deflated state, and when the swimming pool robot is in the third motion state, the volume of the gas in the buoyancy cavity is increased.

5. The swimming pool robot according to claim 1, wherein the buoyancy cavity is rigid, the first regulating member comprises a pump, and the swimming pool robot further comprises a discharging port, wherein when the first injection port is exposed above the liquid surface, under an action of the pump, the external gas enters the buoyancy cavity through the first injection port and liquid in the buoyancy cavity is discharged from the buoyancy cavity through the discharging port.

6. The swimming pool robot according to claim 1, wherein the first injection port is further configured for the gas in the buoyancy cavity to be discharged.

7. The swimming pool robot according to claim 1, wherein the liquid intake portion further comprises a second intake, wherein the second intake is located at a front side wall of the swimming pool robot, and the second intake is configured for liquid to enter the swimming pool robot for the swimming pool robot to clean the liquid surface, wherein when the swimming pool robot cleans the liquid surface, the second intake is at least partially exposed above the liquid surface.

8. The swimming pool robot according to claim 1, further comprising:

a moving mechanism at least configured for the swimming pool robot to move in the first motion state and/or the second motion state; and a propulsion mechanism configured to at least drive the swimming pool robot to move on the liquid surface.

9. The swimming pool robot according to claim 1, further comprising:

a filter assembly configured to filter liquid and at least partially disposed inside the swimming pool robot;

a first fluid outlet; and a main pump disposed inside the swimming pool robot, wherein the buoyancy cavity is disposed inside the swimming pool robot; and the liquid intake portion further comprises a second intake, wherein the second intake is located at a side wall of the swimming pool robot, and the second intake is configured for liquid to enter the swimming pool robot for the swimming pool robot to clean the liquid surface, wherein the main pump drives the liquid to enter the filter assembly through the first intake or the second intake and be filtered and filtered liquid to be discharged from the swimming pool robot through the first fluid outlet.

10. A method for controlling a swimming pool robot, wherein the swimming pool robot comprises a mode switching member, and the mode switching member comprises:

a buoyancy cavity configured to accommodate at least gas;

a pump at least configured for external gas to enter the buoyancy cavity, to increase a volume of the gas in the buoyancy cavity; and a first injection port communicating with the buoyancy cavity to at least allow the external gas to enter the buoyancy cavity, wherein the method comprises at least the following:

controlling the swimming pool robot to be switched from a bottom operation posture to a wall climbing posture;

controlling the swimming pool robot to move on a side wall of a swimming pool in the wall climbing posture, enabling the first injection port to be exposed above a liquid surface; and controlling the pump to operate, wherein the external gas enters the buoyancy cavity through the first injection port under an action of the pump, to increase the volume of the gas in the buoyancy cavity, enabling the swimming pool robot to rotate to be in a surface operation posture; wherein the bottom operation posture of the swimming pool robot is substantially identical to the surface operation posture of the swimming pool robot.

11. The method according to claim 10, wherein the swimming pool robot further comprises:

a processor; and a first sensor configured to detect a position of the swimming pool robot, wherein the processor determines, based on a detection result of the first sensor, whether the first injection port is exposed above the liquid surface, and at least in a case where the processor determines that the first injection port is exposed above the liquid surface, the processor controls the pump to drive the external gas to enter the buoyancy cavity through the first injection port; and/or a second sensor configured to detect whether the first injection port is exposed above the liquid surface, wherein at least in a case where the second sensor detects that the first injection port is exposed above the liquid surface, the processor controls the pump to drive the external gas to enter the buoyancy cavity through the first injection port.

12. A swimming pool robot, comprising:

a first intake disposed at a bottom of the swimming pool robot;

a second intake disposed on a side wall of the swimming pool robot;

a dust box disposed inside the swimming pool robot, wherein the dust box is configured to filter liquid entering the dust box;

a drive mechanism comprising a main pump, wherein the main pump is disposed inside the swimming pool robot;

at least one first fluid outlet disposed on the swimming pool robot, wherein the first intake, the dust box, the main pump, and the at least one first fluid outlet are in fluid communication with one another in sequence to form a first liquid path used for cleaning a bottom or a side wall of a swimming pool, and the second intake, the dust box, the main pump, and the at least one first fluid outlet are in fluid communication with one another in sequence to form a third liquid path used for cleaning a liquid surface;

a buoyancy cavity configured to accommodate at least gas;

a first injection port disposed at a forward portion of the swimming pool robot and communicating with the buoyancy cavity, wherein the swimming pool robot moves on the side wall of the swimming pool, enabling the first injection port to be exposed above the liquid surface; and a pump configured to at least regulate a volume of the gas in the buoyancy cavity, wherein external gas is driven by the pump to enter the buoyancy cavity through the first injection port to increase the volume of the gas in the buoyancy cavity, enabling the swimming pool robot to float on the liquid surface, wherein the first intake faces the bottom of the swimming pool when the swimming pool robot is on the bottom of the swimming pool, and the first intake faces the bottom of the swimming pool when the swimming pool robot floats on the liquid surface.

13. The swimming pool robot according to claim 12, wherein the first injection port is disposed inside the forward portion of the swimming pool robot, at least one connecting port is provided on the forward portion of the swimming pool robot, and the at least one connecting port is configured to allow the external gas to enter the swimming pool robot, wherein after entering the swimming pool robot, the external gas enters the buoyancy cavity through the first injection port.

14. The swimming pool robot according to claim 12, wherein there are at least two buoyancy cavities, wherein at least one buoyancy cavity is disposed at the forward portion of the swimming pool robot, and at least one buoyancy cavity is disposed at a rearward portion of the swimming pool robot.

15. The swimming pool robot according to claim 12, wherein the buoyancy cavity is connected to the pump through a first connection duct, and the pump is connected to the first injection port through a first connection duct.

16. The swimming pool robot according to claim 12, wherein the buoyancy cavity is flexible, wherein when the swimming pool robot is on the bottom of the swimming pool, the buoyancy cavity is in an empty or deflated state, and when the swimming pool robot floats on the liquid surface, the buoyancy cavity accommodates gas; or the buoyancy cavity is rigid, wherein when the swimming pool robot is on the bottom of the swimming pool, the buoyancy cavity accommodates at least liquid, and when the swimming pool robot floats on the liquid surface, the buoyancy cavity accommodates at least gas.

17. The swimming pool robot according to claim 12, wherein the first injection port is further configured for the gas in the buoyancy cavity to be discharged; and/or when the swimming pool robot cleans the liquid surface, the second intake is partially exposed above the liquid surface and partially located below the liquid surface.

18. The swimming pool robot according to claim 12, wherein the pump drives the gas in the buoyancy cavity to be discharged from the buoyancy cavity through the first injection port, enabling the swimming pool robot to be switched from floating on the liquid surface to being on the bottom of the swimming pool.

19. The swimming pool robot according to claim 12, wherein the swimming pool robot further comprises a dust box opening for underwater cleaning and a dust box opening for liquid surface cleaning, wherein the dust box opening for underwater cleaning and the dust box opening for liquid surface cleaning are disposed on the same dust box, the first intake is in fluid communication with the dust box opening for underwater cleaning, and the second intake is in fluid communication with the dust box opening for liquid surface cleaning.

20. The swimming pool robot according to claim 12, wherein liquid in the swimming pool is driven by the same drive mechanism to selectively flow through the first liquid path or the third liquid path to be cleaned.

21. The swimming pool robot according to claim 20, wherein the first liquid path and the third liquid path pass through the same dust box, and both the buoyancy cavity and the pump are disposed inside the swimming pool robot.

22. The swimming pool robot according to claim 12, wherein a process in which the swimming pool robot is switched from being on the bottom of the swimming pool to floating on the liquid surface comprises at least a process in which the swimming pool robot is switched from moving on the bottom of the swimming pool to touching or abutting against the side wall of the swimming pool and then switched from touching or abutting against the side wall of the swimming pool to floating on the liquid surface, wherein a process in which the swimming pool robot is switched from touching or abutting against the side wall of the swimming pool to floating on the liquid surface comprises at least a process in which the pump drives the external gas to enter the buoyancy cavity through the first injection port, enabling a rearward portion of the swimming pool robot to rotate toward the liquid surface.

23. The swimming pool robot according to claim 12, further comprising a first sensor and/or a second sensor configured to detect whether the first injection port is exposed above the liquid surface.

24. A method for controlling a swimming pool robot, wherein the swimming pool robot comprises a first intake, and the first intake is located at a bottom of the swimming pool robot;

wherein the method comprises at least the following:

controlling the swimming pool robot to move from a bottom of a swimming pool to a side wall of the swimming pool;

controlling the swimming pool robot to move on the side wall of the swimming pool, enabling the swimming pool robot to be at least partially exposed above a liquid surface; and when the swimming pool robot is at least partially exposed above the liquid surface, controlling the swimming pool robot to be switched from touching or abutting against the side wall of the swimming pool to floating on the liquid surface, wherein the first intake faces the bottom of the swimming pool when the swimming pool robot is on the bottom of the swimming pool, and the first intake faces the bottom of the swimming pool when the swimming pool robot floats on the liquid surface.

25. The method according to claim 24, wherein the swimming pool robot comprises:
   a buoyancy cavity configured to accommodate at least gas;
   a pump at least configured for external gas to enter the buoyancy cavity, to increase a volume of the gas in the buoyancy cavity; and
   a first injection port communicating with the buoyancy cavity to at least allow the external gas to enter the buoyancy cavity.

26. The method according to claim 25, wherein the controlling the swimming pool robot to be switched from touching or abutting against the side wall of the swimming pool to floating on the liquid surface comprises:
   controlling the pump to increase the volume of the gas in the buoyancy cavity, enabling the swimming pool robot to float on the liquid surface.

27. The method according to claim 26, wherein the controlling the pump to increase the volume of the gas in the buoyancy cavity comprises:
   controlling the pump to be turned on, enabling the external gas to enter the buoyancy cavity under an action of the pump, to increase the volume of the gas in the buoyancy cavity.

28. The method according to claim 25, wherein the controlling the swimming pool robot to move on the side wall of the swimming pool, enabling the swimming pool robot to be at least partially exposed above a liquid surface comprises:
   controlling the swimming pool robot to move on the side wall of the swimming pool, enabling the first injection port to be exposed above the liquid surface.

29. The method according to claim 28, wherein the controlling the swimming pool robot to move on the side wall of the swimming pool, enabling the first injection port to be exposed above the liquid surface comprises:
   controlling the swimming pool robot to move on the side wall of the swimming pool toward a water line, wherein when the swimming pool robot reaches the water line, the first injection port is exposed above the liquid surface.

30. The method according to claim 28, wherein the controlling the swimming pool robot to be switched from touching or abutting against the side wall of the swimming pool to floating on the liquid surface comprises:
   controlling the pump to increase the volume of the gas in the buoyancy cavity, enabling a rearward portion of the swimming pool robot to rotate toward the liquid surface and the swimming pool robot to subsequently float on the liquid surface.

31. The method according to claim 30, wherein the swimming pool robot comprises:
   a processor; and
   a first sensor configured to detect a position of the swimming pool robot, wherein the processor determines, based on a detection result of the first sensor, whether the first injection port is exposed above the liquid surface, and at least in a case where the processor determines that the first injection port is exposed above the liquid surface, the processor controls the pump to drive the external gas to enter the buoyancy cavity through the first injection port; and/or
   a second sensor configured to detect whether the first injection port is exposed above the liquid surface, wherein at least in a case where the second sensor detects that the first injection port is exposed above the liquid surface, the processor controls the pump to drive the external gas to enter the buoyancy cavity through the first injection port.

32. A method for controlling a swimming pool robot, wherein the swimming pool robot comprises a mode switching member and a first intake, and the first intake is located at a bottom of the swimming pool robot, wherein
   the mode switching member comprises:
      a buoyancy cavity configured to accommodate at least gas;
      a pump at least configured for external gas to enter the buoyancy cavity, to increase a volume of the gas in the buoyancy cavity; and
      a first injection port communicating with the buoyancy cavity to at least allow the external gas to enter the buoyancy cavity, wherein
   the method comprises at least the following:
   controlling the swimming pool robot to be switched from a bottom operation posture to a wall climbing posture;
   controlling the swimming pool robot to move on a side wall of a swimming pool in the wall climbing posture, enabling the first injection port to be exposed above a liquid surface; and
   controlling the pump to operate, wherein the external gas enters the buoyancy cavity through the first injection port under an action of the pump, to increase the volume of the gas in the buoyancy cavity, enabling the swimming pool robot to rotate to be in a surface operation posture, wherein
   the first intake faces the bottom of the swimming pool when the swimming pool robot is in the bottom operation posture, and the first intake faces the bottom of the swimming pool when the swimming pool robot is in the surface operation posture.

* * * * *